US010789918B2

(12) United States Patent
Guyre

(10) Patent No.: US 10,789,918 B2
(45) Date of Patent: Sep. 29, 2020

(54) DRUM PEDAL

(71) Applicant: Matthew Guyre, Bellevue, ID (US)

(72) Inventor: Matthew Guyre, Bellevue, ID (US)

( * ) Notice: Subject to any disclaimer, the term of this patent is extended or adjusted under 35 U.S.C. 154(b) by 0 days.

(21) Appl. No.: 16/401,049

(22) Filed: May 1, 2019

(65) Prior Publication Data

US 2019/0259358 A1 Aug. 22, 2019

Related U.S. Application Data

(63) Continuation-in-part of application No. 29/643,358, filed on Apr. 6, 2018, which is a continuation-in-part of application No. PCT/US2017/059463, filed on Nov. 1, 2017, application No. 16/401,049, which is a continuation-in-part of application No. PCT/US2017/059463, said application No. 29/643,358 is a continuation-in-part of application No. 29/602,088, filed on Apr. 28, 2017, now Pat. No. Des. 836,710, and a continuation-in-part of
(Continued)

(51) Int. Cl.
*G10D 13/11* (2020.01)
(52) U.S. Cl.
CPC .................................. *G10D 13/11* (2020.02)
(58) Field of Classification Search
CPC ............................ G10D 13/006; G10D 13/11
See application file for complete search history.

(56) References Cited

U.S. PATENT DOCUMENTS 846,391 A 3/1907 Bower
852,881 A 5/1907 Kendis
(Continued)

FOREIGN PATENT DOCUMENTS

CN 3340657 6/2003
CN 2627614 Y 7/2004
(Continued)

OTHER PUBLICATIONS

Web article entitled "Drum Workshop: MDD Pedals" by John Nyman, published Apr. 24, 2015, downloaded by the undersigned representative for Applicant on Oct. 10, 2016 from http://www.drummagazine.com/gear/post/drum-workshop-mdd-pedals/.
(Continued)

*Primary Examiner* — Robert W Horn
(74) *Attorney, Agent, or Firm* — JTT Patent Services, LLC; Gerald T. Peters; Seiko Brown

(57) ABSTRACT

A pedal assembly for a drum or other foot-actuated device may comprise a curved pedal and an adjustable pedal return spring tensioner mechanism. An actuatable region disposed at a top surface of the pedal preferably comprises a first concavity disposed more or less centrally in a pedal length direction between a first convexity and a second convexity. The tensioner mechanism preferably comprises a vertical lead screw parallel to the pedal return spring and coupled by way of a nut to a lower end of the pedal return spring. The lead screw may be slidingly coupled to a vertical post. By causing the lead screw to be adjustable from above and have an efficiency low enough to prevent backdriving, a drummer or other such operator can conveniently adjust tension without the need for disassembly and without the need to loosen a locknut or other such locking means.

34 Claims, 54 Drawing Sheets

Related U.S. Application Data application No. 15/530,680, filed on Nov. 1, 2016, now Pat. No. 10,311,840, said application No. 29/602,088 is a continuation-in-part of application No. 15/530,680, said application PCT/US2017/059463 is a continuation-in-part of application No. 15/530,680, application No. 16/401,049, which is a continuation-in-part of application No. 15/530,680.

(56) References Cited

U.S. PATENT DOCUMENTS

| | | | |
|---|---|---|---|
| 1,042,919 A | 10/1912 | Hughes | |
| 1,092,276 A | 4/1914 | Ludwig | |
| 1,209,804 A | 12/1916 | BessInger | |
| 1,319,994 A | 10/1919 | Dorn | |
| D55,365 S | 6/1920 | Champane | |
| D59,788 S | 11/1921 | Schwartz | |
| 2,132,211 A | 10/1938 | Hueckstead | |
| D116,141 S | 8/1939 | Marciano | |
| 2,540,051 A * | 1/1951 | Ludwig | G10D 13/11 84/422.1 |
| 2,628,507 A | 2/1953 | Juergens | |
| 2,680,384 A | 6/1954 | Horrocks | |
| 2,893,284 A | 7/1959 | Lamar | |
| D199,951 S | 12/1964 | Golden | |
| 3,592,076 A | 7/1971 | Baginski | |
| 4,198,894 A | 4/1980 | Della-Porta | |
| 4,310,064 A | 1/1982 | Kazarian, Jr. | |
| 4,313,352 A | 2/1982 | Okajima | |
| 4,335,628 A | 6/1982 | Shimano | |
| 4,691,613 A | 9/1987 | Jacobson | |
| D299,222 S | 1/1989 | Feamster, III et al. | |
| D311,989 S * | 11/1990 | Parker | D2/947 |
| D320,369 S | 10/1991 | Feamster, III et al. | |
| D326,557 S | 6/1992 | Gardner | |
| 5,423,231 A | 6/1995 | Helfrich | |
| D390,253 S | 2/1998 | Bacco | |
| 5,773,736 A | 6/1998 | Hsieh | |
| 6,002,076 A | 12/1999 | Karn | |
| D439,270 S | 3/2001 | Marcinkiewicz | |
| 6,201,173 B1 | 3/2001 | Black | |
| 6,361,476 B1 | 3/2002 | Eschenbach | |
| 6,417,433 B1 | 7/2002 | Milla | |
| 6,541,686 B2 | 4/2003 | O'Donnell | |
| 6,571,662 B1 * | 6/2003 | Mendis | B60K 23/02 307/10.1 |
| 6,593,518 B2 | 7/2003 | Hsieh | |
| 6,647,826 B2 | 11/2003 | Okajima | |
| 6,684,734 B2 | 2/2004 | Gatzen | |
| 6,710,237 B2 | 3/2004 | Adams | |
| D510,965 S * | 10/2005 | Clark | B62M 3/08 D12/125 |
| 7,197,957 B2 | 4/2007 | Gatzen | |
| D561,236 S | 2/2008 | Muir | |
| D574,210 S | 8/2008 | Packard | |
| D588,269 S | 3/2009 | Wall | |
| 7,921,748 B2 | 4/2011 | Kim | |
| 7,956,268 B1 * | 6/2011 | Liao | G10D 13/006 84/422.1 |
| 8,026,434 B2 | 9/2011 | Luo | |
| 8,455,746 B2 | 6/2013 | Johnston | |
| 8,642,868 B1 | 2/2014 | Darrell Johnston | |
| 8,674,203 B2 | 3/2014 | Simon | |
| 8,686,265 B2 | 4/2014 | Johnston | |
| 8,927,844 B2 | 1/2015 | Kitching | |
| 8,993,865 B2 * | 3/2015 | Liao | G10D 13/006 84/422.1 |
| D729,482 S | 5/2015 | Lentine | |
| 9,075,427 B2 | 7/2015 | Muraji | |
| 9,236,038 B1 * | 1/2016 | Hirasawa | G10D 13/006 |
| 9,472,174 B2 * | 10/2016 | Sikra | G10D 13/006 |
| 9,785,183 B2 | 10/2017 | Kaijala | |
| 9,840,243 B2 | 12/2017 | Saito | |
| 9,928,815 B2 * | 3/2018 | Sikra | G10D 13/006 |
| 9,981,638 B2 | 5/2018 | Kawazu | |
| 10,152,955 B2 * | 12/2018 | Sikra | G10D 13/065 |
| 10,311,840 B2 * | 6/2019 | Guyre | G10D 13/006 |
| 2002/0152872 A1 | 10/2002 | O'Donnell | |
| 2003/0154846 A1 | 8/2003 | Adams | |
| 2003/0213329 A1 | 11/2003 | Gatzen | |
| 2004/0025667 A1 | 2/2004 | Hampton, Jr. | |
| 2004/0144198 A1 | 7/2004 | Gatzen | |
| 2005/0082786 A1 | 4/2005 | Clark | |
| 2007/0137419 A1 | 6/2007 | Chen | |
| 2011/0271818 A1 | 11/2011 | Simon | |
| 2012/0144976 A1 | 6/2012 | Johnston | |
| 2012/0198984 A1 | 8/2012 | Johnston | |
| 2014/0090543 A1 | 4/2014 | Kitching | |
| 2014/0109399 A1 | 4/2014 | Merlin | |
| 2014/0116192 A1 | 5/2014 | Hemmege Venkatappa | |
| 2018/0122342 A1 | 5/2018 | Guyre | |
| 2019/0259358 A1 * | 8/2019 | Guyre | G10D 13/11 |

FOREIGN PATENT DOCUMENTS

| | | |
|---|---|---|
| CN | 100367346 C | 2/2008 |
| CN | 205428469 U | 8/2016 |
| CN | 201630460652 | 8/2016 |
| DE | 3819379 A1 | 12/1989 |
| EP | 1112565 A1 | 7/2001 |
| GB | 2234045 A | 1/1991 |
| JP | 2005173274 A | 6/2005 |
| JP | 2010243799 A | 10/2010 |
| WO | 9704440 A1 | 2/1997 |
| WO | 2002086858 A1 | 10/2002 |
| WO | 2018/085341 A1 | 5/2018 |

OTHER PUBLICATIONS

Reverb, All About that Bass Drum Pedal, posted on Mar. 4, 2015, [online], [site visited on Jan. 23, 2018]. Available from Internet, <URL: https://reverb.comlnews/all-about-that-bass-drum-pedal> (Year: 2015).

Applicant brings to the attention of the Examiner the existence of related U.S. Appl. No. 29/602,088, filed Apr. 28, 2017 by the same inventor/Applicant as in the present case, and which issued as U.S. Design Patent No. D836710 on Dec. 25, 2018.

Applicant brings to the attention of the Examiner the existence of related copending U.S. Appl. No. 15/530,680, filed Nov. 1, 2017 by the same inventor/Applicant as in the present case, which was published on May 3, 2018 as U.S. 2018 0122342 A1, and which is expected to issue as U.S. Pat. No. 10,311,840 dated Jun. 4, 2019.

Applicant brings to the attention of the Examiner the existence of related copending U.S. Appl. No. 29/643,358, filed Apr. 6, 2018 by the same inventor/Applicant as in the present case.

* cited by examiner

DRUM PEDAL

BENEFIT CLAIMS AND INCORPORATION BY REFERENCE

This application is a continuation-in-part of U.S. patent application Ser. No. 15/530,680 for a Curved Pedal, filed 1 Nov. 2016, and is also a continuation-in-part of International Application No. PCT/US17/59463 for a Drum Pedal, filed 1 Nov. 2017, and is also a continuation-in-part of U.S. patent application Ser. No. 29/643,358 for a Curved Pedal, filed 6 Apr. 2018, the content of all of which applications are hereby incorporated herein by reference in their entireties.

FIELD OF THE INVENTION

The present invention relates to a pedal assembly for a drum or other foot-actuated device, and further relates to a curved pedal and to an easily adjustable pedal return spring tensioner mechanism for such a pedal assembly.

BACKGROUND

Many devices employ pedals for foot-actuated operation. Among the many devices capable of foot-actuated operation by way of pedal(s) are automobiles, helicopters, airplanes, backhoes and other such vehicles and heavy equipment, looms, sewing machines, treadles, knitting machines, mills, lathes, pumps, and other such industrial apparatuses, to name just a few examples.

Another category of device which may employ pedal(s) for foot-actuated operation is musical instruments such as organs, pianos, and other keyboard instruments, as well as drums, cymbals, and other such percussion instruments.

Drum pedals have been used for playing drums for more than a century. Many improvements on the drum pedal have been made, allowing better operability and facilitating various performance styles.

One factor still in need of improvement with pedals currently on the market is comfort. Repeated multiple beats, e.g., doublets, triplets, etc., provide an attractive performance but can be difficult and tiring for many players. Many players find that their foot becomes fatigued after performing for an extended period of time, especially when generating repeated multiple beats in rapid succession.

Another factor still in need of improvement with pedals currently on the market is ability to accommodate various techniques.

To generate a doublet, i.e., two repeated beats, a player might simply repeat the same foot movement twice in rapid succession, or for improved comfort and greater degrees of freedom during playing a player might, for example, employ a sliding technique or a heel-toe technique.

In a sliding technique for producing a doublet, a player might first depress one location of the drum pedal with his or her toe to generate a first stroke, slide the foot along the pedal toward the toe or the heel end of the pedal, and then depress a second location of the pedal to generate a second stroke. However, with a conventional flat pedal, many players find foot positioning difficult and find the sliding motion difficult to control or uncomfortable.

In a heel-toe technique for producing a doublet, a player might first depress the pedal with his or her heel to generate a first stroke, and then tilt the toe down to depress the pedal with his or her toe to generate a second stroke. This technique can cause fatigue of the ankle when playing for an extended period.

Similar techniques may also be employed for producing a triplet, i.e., three repeated beats, which is generally even more difficult than a doublet.

Conventional pedals are typically flat, or where such conventional pedals deviate from planar, they may have spiky protrusions, and may employ joggled or stepped surfaces.

With a flat drum pedal, techniques such as the sliding technique and the heel-toe technique are tiring and are difficult to master. A flat pedal is generally devoid of features that might assist the player in locating the foot during playing. Unless a player can quickly and reliably locate his or her foot by the "feel" of the pedal, it will be difficult to develop the dexterity required for advanced sliding and heel-toe techniques.

Furthermore, a flat pedal is a poor match for the shape of the foot, and a flat pedal requires considerably more movement of the foot and/or ankle than would be necessary if the pedal were a better match for the shape of the foot.

Moreover, when using the heel-toe technique with a flat pedal, the heel and/or toe tend to strike the pedal surface at a glancing angle. A pedal shape that would permit the foot—and in particular the heel of the foot and/or the ball of the foot (note that the term "toe" as used herein may include the ball of the foot)—to strike the pedal at an angle more nearly perpendicular to the pedal surface would improve the leverage or efficiency with which force is transferred from the player's foot to the drum pedal, permitting stronger and/or less tiring performance.

Furthermore, a pedal surface that is interrupted by spiky protrusions or sharply stepped surfaces is not conducive to techniques that utilize sliding motion of the foot across the pedal surface. Moreover, a pedal having a smoothly varying contour would be especially desirable for a player who employs bare feet or who wears socks but no shoes or who wears thin shoes or other such foot coverings for improved comfort and sensitivity in locating the foot on a pedal.

In addition, whereas conventional pedals tend to be only slightly longer than the foot of the player, a pedal that is substantially longer than the foot of the player would not only increase leverage about the fulcrum of the heel hinge, permitting more powerful and/or less tiring playing, but would also facilitate more sustained sliding along the length direction of the pedal. A pedal substantially longer than the foot of the player may also accommodate multiple striking locations beyond the basic heel-toe striking positions employed conventionally.

There is therefore a need for an improved pedal that addresses at least one of the foregoing issues.

Where the pedal is employed in a pedal assembly that has a return spring that tends to cause the pedal to return to its undepressed position after the pedal has been depressed, it is furthermore often the case that a player will want to adjust the tension of the pedal return spring to better accommodate the player's style of playing. For example, a proficient player who wants to take full advantage of the benefits of an improved pedal that overcomes one or more of the issues described above will likely find it advantageous to be able to adjust tension of the pedal return spring in a convenient and precise manner.

However, conventional pedal return spring tension adjustment mechanisms have typically been adjusted from below and have typically employed a locknut or other such locking means that must be loosened before adjustment is possible. Where the pedal is a drum pedal, this typically requires that the player get off the throne, get down on one knee, and use a wrench or other tool(s) to free a locknut before carrying out adjustment of tension by way of a wingnut or the like. Following adjustment, tool(s) must again be used to tighten the locknut or other locking means and hold the adjustment in place. It is also often necessary during the conventional tension adjustment procedure to move other parts and otherwise disturb the drum kit so as to gain access to the pedal return spring tension adjustment mechanism.

Because a drummer has conventionally been unable to conveniently adjust tension while seated on the throne, conventional adjustment of tension has therefore been a trial-and-error process that has often been frustrating and imprecise. Not only are conventional tension adjustment mechanisms imprecise because they do not permit adjustment from above, e.g., by a drummer seated on the throne who can actuate the pedal to test tension as it is adjusted, but conventional tension adjustment mechanisms are also often imprecise by design, having imprecise mechanical linkages and employing locknuts or similar locking means that disturb the tension adjustment when the locknut or other locking means is tightened or loosened. This being the case, precise adjustment of spring tension after setup has usually not been attempted conventionally.

It would therefore be advantageous if the operator of the pedal were able to adjust the tension of the pedal return spring conveniently and without the need to disassemble the pedal assembly.

It would also be desirable for the operator to be able to adjust the tension of the pedal return spring without the need for the operator to move from the position from which the operator normally operates the pedal; for example, a drummer seated on a drum throne may find it desirable to be able to adjust pedal return spring tension while seated on the throne.

It would furthermore be desirable if pedal return spring tension could be easily adjusted without the need to loosen a locknut or other locking means, and that once adjusted, if the tension adjustment could be maintained without the need to tighten a locknut or other locking means.

There is therefore a need for an improved pedal return spring tension adjustment mechanism that addresses at least one of the foregoing issues.

There is moreover a need for a drum pedal assembly that employs such an improved pedal and such an improved pedal return spring tension adjustment mechanism.

SUMMARY OF INVENTION

One aspect of the present invention is a curved pedal. Another aspect of the present invention is a tensioner mechanism for a return spring that tends to cause a pedal, e.g., the curved pedal, to return to an undepressed state after the pedal has been depressed. Yet another aspect of the present invention is a pedal assembly or other device employing such a curved pedal. One embodiment of the present invention is a curved pedal for a drum or other foot-operated device where dexterity, responsiveness, and/or comfort when operating for an extended period of time are desired.

In accordance with one embodiment, a curved pedal may have a pedal reference plane, width direction, and length direction.

The curved pedal may comprise an actuatable region for actuation by a foot. The actuatable region may be disposed at a top surface of the curved pedal.

The curved pedal may comprise at least one curvature profile in the length direction within at least a portion of the actuatable region and/or within substantially the entire actuatable region.

Slope at the top surface of the curved pedal relative to the pedal reference plane may vary smoothly within at least a portion of the actuatable region and/or within substantially the entire actuatable region.

Slope at the top surface of the curved pedal relative to the pedal reference plane may vary smoothly through an angle of at least 5° within at least a portion of the actuatable region and/or within substantially the entire actuatable region.

Change in slope as a function of position in the length direction, i.e., the second spatial derivative with respect to position in the length direction, within at least a portion of the actuatable region and/or within substantially the entire actuatable region might, for example, be not greater than 30° per inch and/or might be 11.25° per inch±75%.

Radius of curvature of the top surface of the curved pedal within at least a portion of the actuatable region and/or within substantially the entire actuatable region may, for example, be not less than one-half of the length of the actuatable region, might be not less than 3", and/or might be 8"±75%.

The at least one curvature profile might be more or less sinusoidal with wavelength 10"±50% and amplitude 0.30"±75%.

The at least one curvature profile might be more or less elliptically arcuate with radius of curvature 8"±75% and have an extremum of height 0.30"±75% as measured from the pedal reference plane.

The at least one curvature profile might be more or less circularly arcuate with radius of curvature 8"±75% and have an extremum of height 0.30"±75% as measured from the pedal reference plane.

The at least one curvature profile might be approximated by a polynomial curve of order not less than three with radius of curvature 8"±75% and have an extremum of height 0.30"±75% as measured from the pedal reference plane.

The actuatable region and/or the top surface may comprise at least one first convexity, at least one first concavity, at least one second convexity, and/or at least one flat portion.

Any of the at least one first convexity, at least one first concavity, at least one second convexity, and/or at least one flat portion may extend for not less than substantially one-third of the actuatable region and/or the top surface in the length direction. In the alternative, any of the at least one first convexity, at least one first concavity, at least one second convexity, and/or at least one flat portion may extend for not more than substantially one-third of the actuatable region and/or the top surface in the length direction.

Where a convexity and a concavity are present, the convexity may be continuous with the concavity by way of an intervening inflection point at a transition between the concavity and the convexity, and slope of the top surface relative to the pedal reference plane may vary smoothly throughout the transition.

Where at least one first convexity, at least one first concavity, and at least one second convexity are present, the at least one first concavity may be disposed centrally in the length direction between the at least one first convexity and the at least one second convexity.

The at least one first convexity and/or the at least one second convexity might be substantially a half-lobe that extends or extend not more than 25% peripherally past an extremum or extrema thereof in the length direction.

Length of the actuatable region in the length direction might be not less than 12". The curved pedal may comprise a heel end having at least one feature permitting mounting to a heel hinge.

The curved pedal may comprise a toe end having at least one feature permitting mounting to at least one pivoting linkage arm.

The curved pedal may be mounted in a pedal assembly and used to operate a drum or other such percussion instrument, or any of a wide variety of foot-actuated devices.

The tensioner mechanism may comprise a screw having an axis that is arranged in parallel but offset fashion with respect to an axis of the spring.

The tensioner mechanism may further comprise a bracket that has a nut which is threadedly engaged with the screw and that is coupled to the spring in such fashion that movement of the nut on the screw causes displacement of at least a portion of the spring.

The screw may have a top end which when turned permits adjustment of tension of the spring.

The screw may be supported by a stationary post having at least one first planar post face.

The bracket may have at least one first planar bracket face that slidingly engages with the at least one first planar post face when the nut moves on the screw.

The screw may extend for substantially the full height of the post.

Two planar faces of the bracket may intersect to form a first bracket dihedral angle at a first bracket corner.

Two planar faces of the post may intersect to form a first post dihedral angle at a first post corner.

The first post corner may guide movement of the first bracket corner when the nut moves on the screw.

The axis of the screw, the axis of the spring, and the first planar post face may be respectively vertically oriented.

Interaxial distance between the axis of the screw and the axis of the spring may be not less than 0.375 inch.

It may be that the screw is not backdriven by a load exerted thereon by the spring during normal operation of the pedal.

The screw may be self-locking, adjustment of the tension of the spring being maintained following turning of the top end of the screw despite absence of locking means at the screw.

Mechanical efficiency of output movement of the nut on the screw relative to input turning of the top end of the screw might be not greater than 50%.

Lead angle of threads at the screw might be not greater than 5°.

Lead of threads at the screw might be not greater than 33% of diameter of the screw.

The screw may be a lead screw having single-start acme threads.

The screw may be substantially housed within the post.

Other embodiments, systems, methods, and features, and advantages of the present invention will be apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. In the drawings, like reference numerals designate corresponding parts throughout the several views, description that would be repetitive being omitted for convenience. Except for the working examples of curved pedal top surface profiles shown in FIGS. 11 through 15B, the various components as well as the positional relationships therebetween that are depicted in the drawings are not necessarily drawn to scale, emphasis instead being placed upon clearly illustrating the principles of the present invention.

FIG. 5B showing curved pedal 330 comprising first convexity 340 and first concavity 350; FIG. 5C showing curved pedal 430 comprising first concavity 450 and first convexity 440; FIG. 5D showing curved pedal 530 comprising first convexity 540, first concavity 550, and second convexity 560; FIG. 5E showing curved pedal 630 comprising first convexity 640; FIG. 5F showing curved pedal 730 comprising first convexity 740; FIG. 5G showing curved pedal 830 comprising first convexity 840 and second convexity 860; FIG. 5H showing curved pedal 930 comprising first convexity 940 and first concavity 950; FIG. 5I showing curved pedal 1030 comprising first convexity 1040, first concavity 1050, and second concavity 1070; and FIG. 5I showing curved pedal 1130 comprising first convexity 1140, first concavity 1150, and second convexity 1160.

DETAILED DESCRIPTION

One embodiment of the present invention is a curved pedal.

A curved pedal in accordance with an embodiment of the present invention may be employed in any of a wide variety of devices that employ pedals for foot-actuated operation, such as automobiles, helicopters, airplanes, backhoes and other such vehicles and heavy equipment, looms, sewing machines, treadles, knitting machines, mills, lathes, pumps, and other such industrial apparatuses.

Although embodiments of the present invention are described in terms of an example in which a curved pedal mounted in a pedal assembly operates a beater to strike a vertical bass drum, it should be understood that the present invention is not limited to the example of a pedal assembly for causing actuation of a beater that strikes a vertical bass drum, but may also be applied to a pedal assembly for causing actuation of a beater that strikes a horizontal bass drum, a pedal assembly for causing actuation of high-hat cymbals, and to a pedal assembly for causing actuation of any of a wide variety of devices in which motion from a foot-actuated pedal can be converted into motion for driving and/or controlling the device or any portion thereof through an appropriate linkage or transmission mechanism, of which the pedal assembly described below is merely one example.

Figure 1:
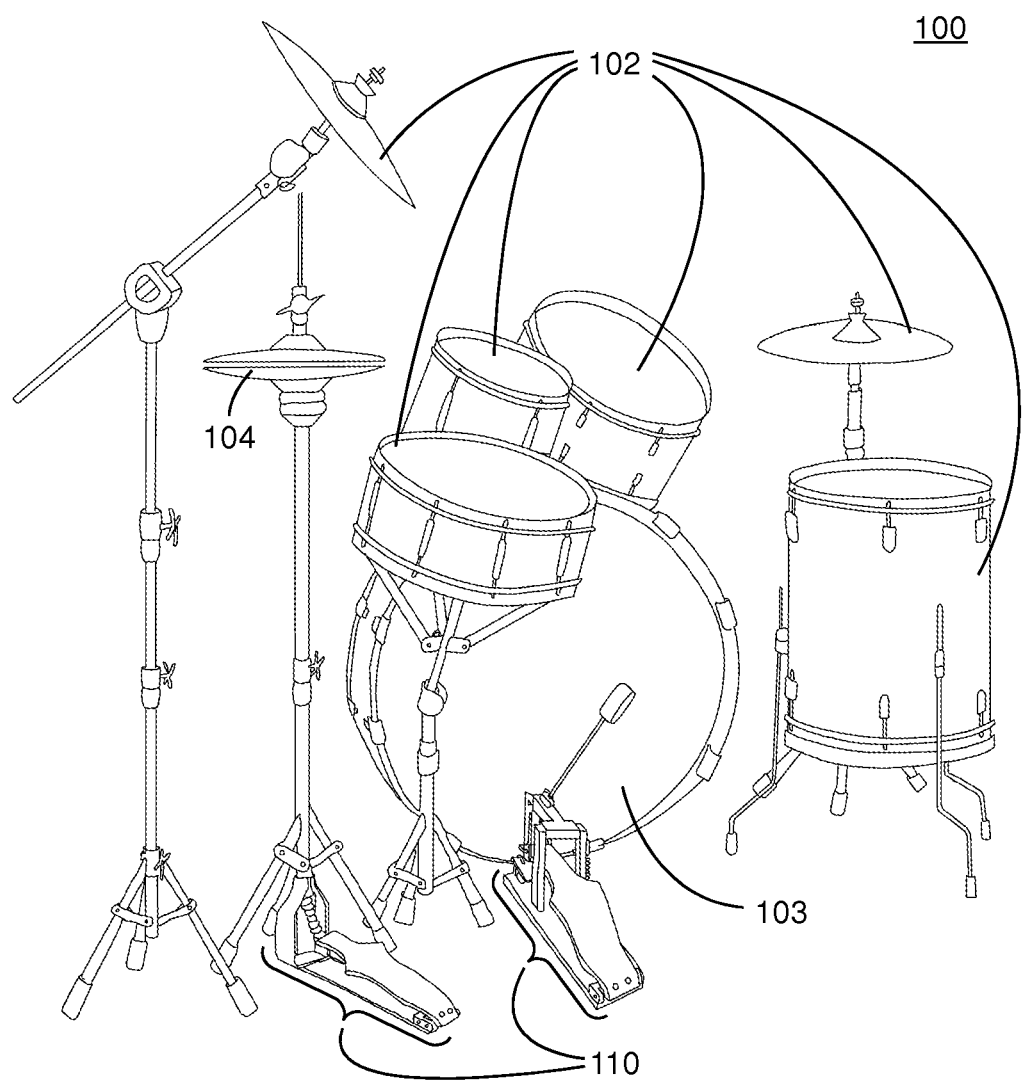
FIG. 1 shows drum set 100, this being an example of a system employing foot-operated device(s) requiring rapid, dexterous, and/or repeated actuation over an extended period of time, and which contains percussion instrument(s) 102, at least one of which is capable of being actuated by foot by way of pedal assembly 110 in accordance with an embodiment of the present invention.

Referring to FIG. 1, this shows drum set 100. Drum set 100 is an example of a system employing foot-operated device(s) requiring rapid, dexterous, and/or repeated actuation over an extended period of time. More specifically, drum set 100 includes a number of percussion instruments 102, two among which, i.e., bass drum 103 and high-hat cymbals 104, are capable of being actuated by foot by way of respective pedal assemblies 110. The description that follows is given in terms of an example in which pedal assembly 110 operates a beater that strikes bass drum 103, but pedal assembly 110 may be applied to actuation of high-hat cymbals 104 or to any of a wide variety of devices that may employ pedals for foot-actuated operation.

Figure 2:
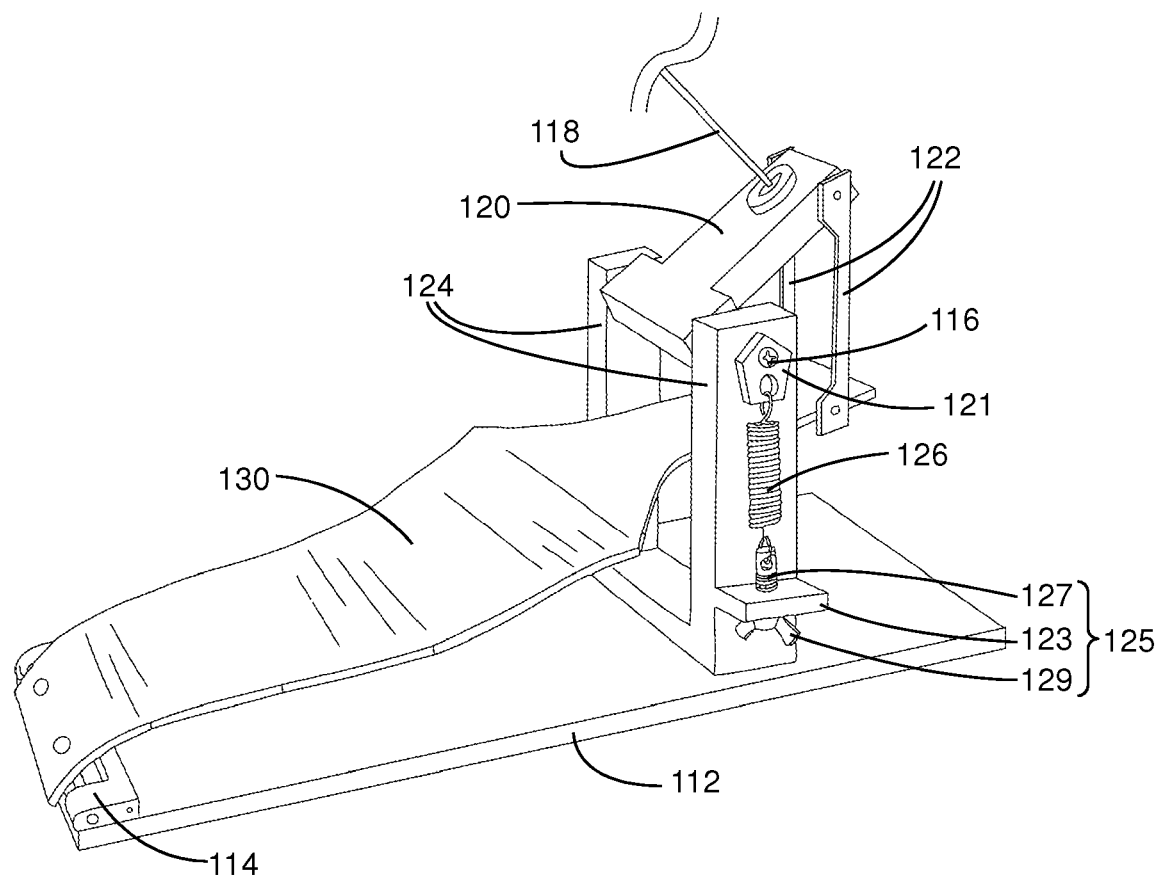
FIG. 2 is a perspective view of a pedal assembly 110 that may be employed at drum set 100 of FIG. 1 in accordance with an embodiment of the present invention.
Figure 3:
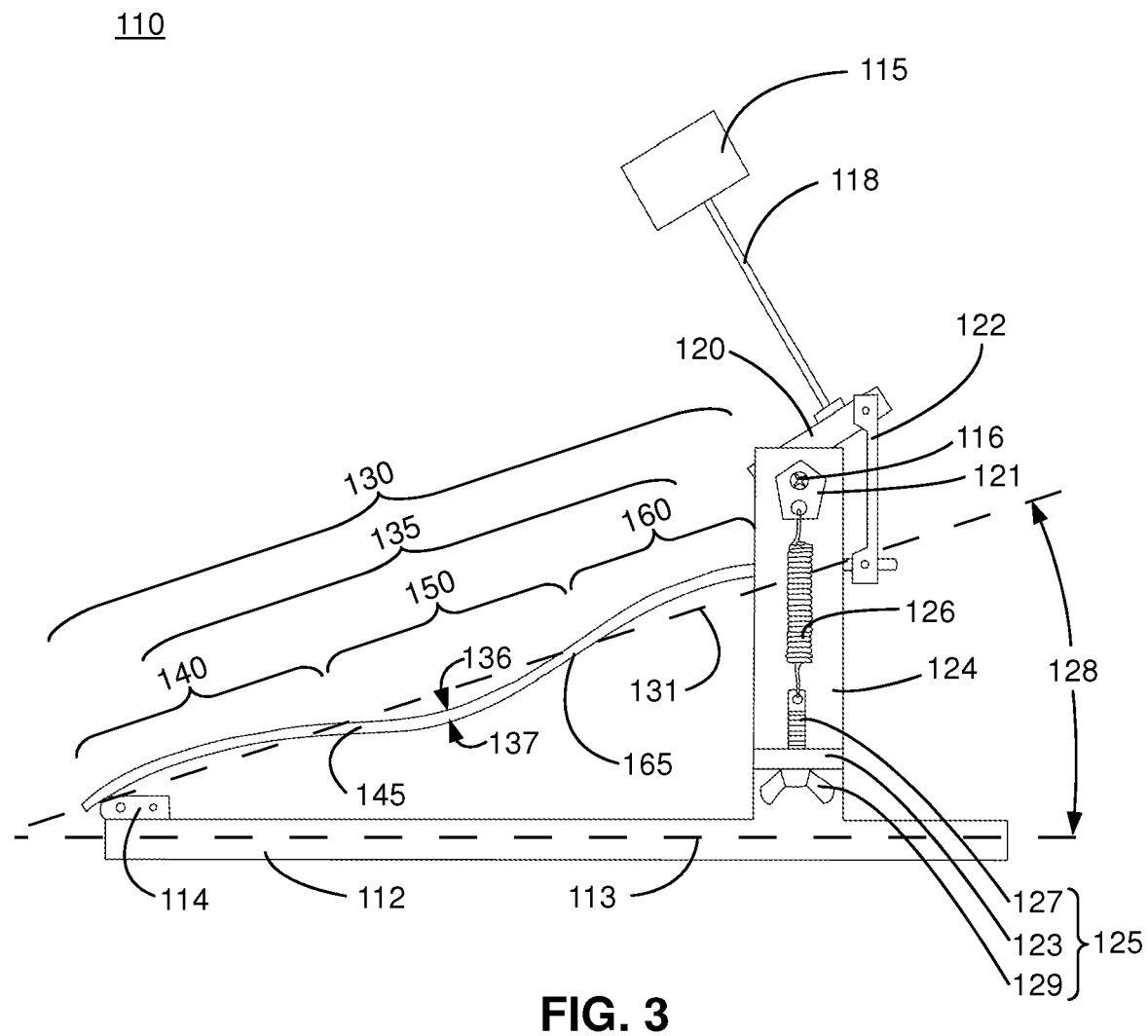
FIG. 3 is a side view of pedal assembly 110 of FIG. 2 and shows curved pedal 130 having actuatable region 135 comprising portion(s) 140, 150, 160 that is or are convex and/or concave relative to pedal reference plane 131 in accordance with an embodiment of the present invention.

Referring now to FIGS. 2 and 3, these respectively show perspective and side views of a pedal assembly 110 in accordance with one embodiment of the present invention.

In the embodiment shown in FIGS. 2 and 3, pedal assembly 110 comprises curved pedal 130, one end of which, hereinafter referred to as the heel end, has hole(s) and/or other features permitting it to be pivotably mounted on heel hinge 114 at a location toward what will be referred to as the heel end of baseboard 112. The other end of curved pedal 130, hereinafter referred to as the toe end, is free to pivot about the shaft of heel hinge 114 as curved pedal 130 goes from its raised or undepressed position at which pedal reference plane 131 is more or less inclined at pedal mount angle 128 to its lowered or fully depressed position at which pedal reference plane 131 is more or less parallel (except to the extent limited by a stopper or the like to prevent damage to the drum surface or other parts) with baseboard plane 113, when curved pedal 130 is depressed by a foot against the restoring force provided by pedal return spring 126.

Having identified one end of curved pedal 130 as the heel end thereof, and having identified the other end of curved pedal 130 as the toe end thereof, these directions, i.e., the heel end or side which is toward the left as seen in FIG. 3, and the toe end or side which is toward the right as seen in FIG. 3, may be employed herein for convenience of description.

Pivoting linkage arms 122 are oriented more or less vertically, the bottom ends of pivoting linkage arms 122 being connected to either side of the toe end of curved pedal 130, toe end of curved pedal 130 having hole(s) and/or other features permitting connection to the bottom ends of pivoting linkage arms 122, and the top ends of pivoting linkage arms 122 being connected to either side of the toe end of a rocker 120 on which beater stem 118 terminating in beater 115 is mounted. As the toe end of curved pedal 130 swings through its arc about the pivot of heel hinge 114, transfer of this rotary motion to rocker 120 via pivoting linkage arms 122 causes rocker 120 to pivot about rocker axle 116 which is supported by bearings held by a pair, i.e., left and right, support posts 124 secured to baseboard 112. Swivel arm 121 extends in perpendicular fashion from one end of rocker axle 116, rocker axle 116 being press-fit into a hole in swivel arm 121 or otherwise secured thereto in such fashion as to permit swivel arm 121 to rotate together with rocker axle 116 as curved pedal 130 is depressed and made to swing through its arc about heel hinge 114 due to rotational linkage of curved pedal 130 and rocker axle 116 by way of pivoting linkage arms 122, action of pedal return spring 126 at such time tending to cause the pedal to return to its undepressed position.

Figure 17:
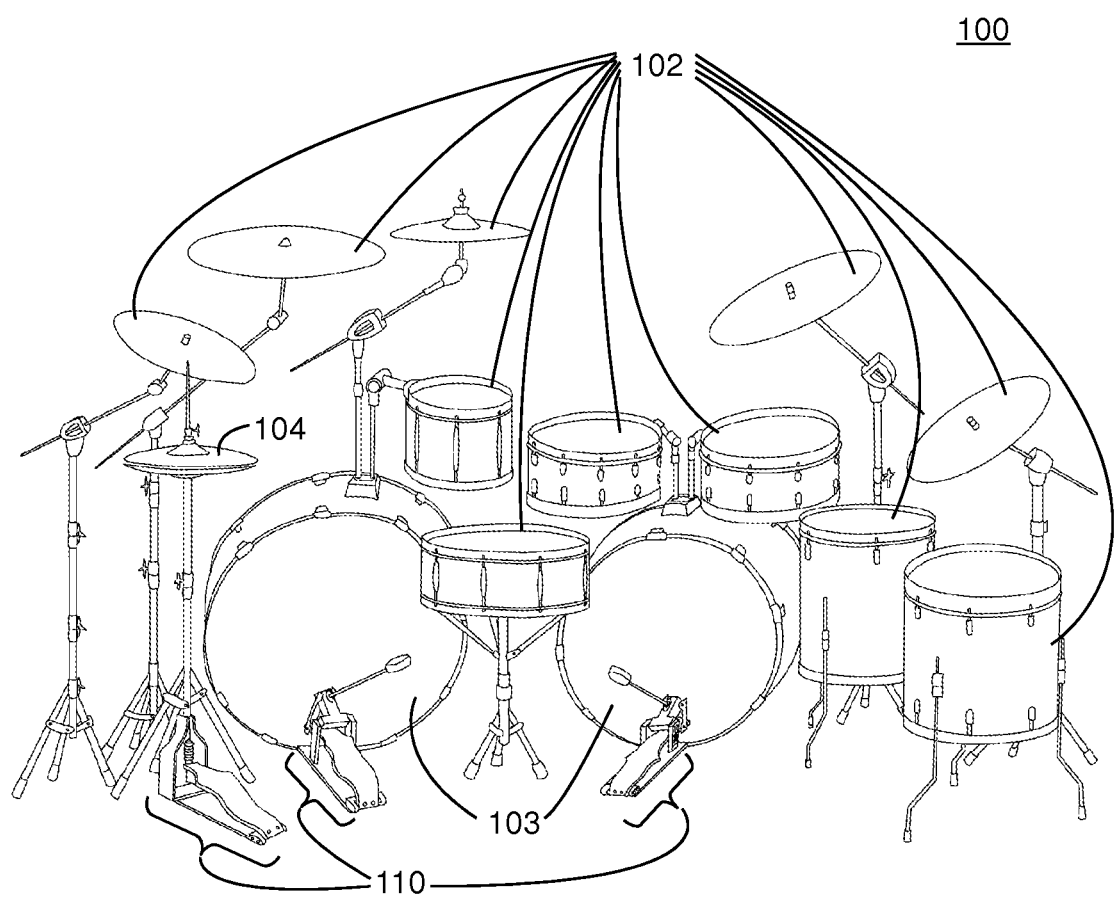
FIG. 17 shows drum set 100 similar to drum set 100 shown in FIG. 1 except that drum set 100 of FIG. 17 contains two bass drums 103, each of which has an independent pedal assembly 110 in accordance with an embodiment of the present invention.

Throughout the present specification, except where otherwise clear from context, left and right are defined as seen from the vantage point of the pedal operator; e.g., from the vantage point of a drummer seated on a drum throne or otherwise facing the percussion instrument(s) shown in FIGS. 1 and 17, for example.

Pedal assembly 110 shown in FIGS. 2 and 3 further comprises a pedal return spring tensioner mechanism 125 in which a threaded adjuster 127 is inline, i.e., coaxial, with respect to pedal return spring 126, the upper end of pedal return spring 126 being engaged with a hole in swivel arm 121, the lower end of pedal return spring 126 being engaged with the upper end of threaded adjuster 127, and the lower end of threaded adjuster 127 terminating in wingnut 129. Threaded adjuster 127 passes through a hole in shelf 123 protruding horizontally from support post 124, male threads formed at the outside circumferential surface of threaded adjuster 127 mating with female threads formed at the inside circumferential surface of the hole at shelf 123, adjustment of the tension at pedal return spring 126 being made possible when the lower end of pedal return spring 126 is disconnected from the upper end of threaded adjuster 127 and wingnut 129 is used to turn threaded adjuster 127 within the threaded hole of shelf 123, reconnection of the lower end of pedal return spring 126 to the upper end of threaded adjuster 127 allowing tension to be maintained as set by preventing turning of threaded adjuster 127 within the threaded hole of shelf 123.

Figure 4:
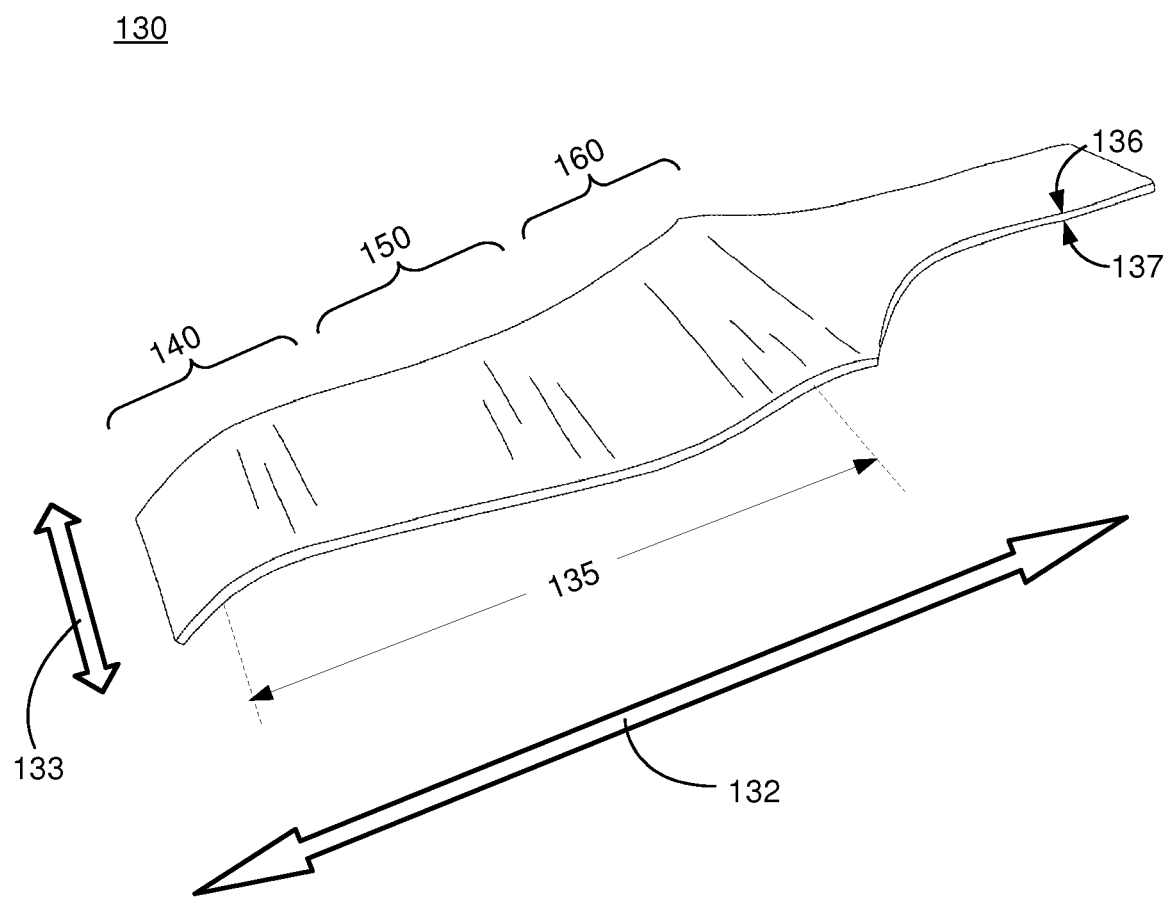
FIG. 4 is a perspective view of curved pedal 130 of FIG. 3 in which first convexity 140, first concavity 150, and second convexity 160 are arranged in length direction 132 of actuatable region 135 in accordance with an embodiment of the present invention.

With continued reference to FIG. 3 and additional reference to FIG. 4, curved pedal 130 will now be described. FIGS. 3 and 4 respectively show side and perspective views of curved pedal 130 of FIG. 2, FIG. 3 showing curved pedal 130 as mounted in pedal assembly 110 and FIG. 4 showing curved pedal 130 by itself. Additional reference may also be made to FIG. 10, in which like reference numerals indicate like parts.

As shown in FIG. 4, curved pedal 130 may have a length direction 132 and a width direction 133.

In one embodiment, curved pedal 130 may have an actuatable region 135 at a top surface 136 of curved pedal 130. Where this is the case, bottom surface 137 may be disposed opposite top surface 136. Thickness of curved pedal 130, i.e., the dimension shown in FIGS. 3 and 4 between top surface 136 and bottom surface 137, is preferably at least of magnitude sufficient to support and allow actuation by a foot but not so large as to impede movement of curved pedal 130. For example, where curved pedal 130 is made of 6061 or similar aluminum, thickness of curved pedal 130 might be on the order of 0.375". Note that there is no objection to employment of a curved pedal 130 of nonuniform thickness; for example, there is no objection to employment of a curved pedal 130 in which thickness varies with position in length direction 132 and/or in width direction 133. For example, in one embodiment, thickness of curved pedal 130 may vary such that bottom surface 137 is flat, e.g., where convenient for manufacture of curved pedal 130; so long as top surface 136 is curved or otherwise has curvature and/or other feature(s) as described herein, there is no particular objection to employment of any arbitrary configuration at bottom surface 137, provided that this does not impede operation of pedal assembly 110.

Although aluminum has been mentioned by way of example, curved pedal 130 may be made of any suitable material, including steel or other suitable metal, thermoplastic and/or thermosetting resin, wood, glass, ceramic, and/or the like, and may comprise any suitable laminated and/or composite material(s). Curved pedal 130 may be cast, machined, molded, formed in a vice or other such device, or manufactured and/or shaped by any other suitable technique.

Length of actuatable region 135 in length direction 132 is preferably at least long enough to permit comfortable actuation by the foot of a typical player, or by the feet of various players who may range in age from child to adult. For example, in one embodiment, length of actuatable region 135 in length direction 132 might be 5 inches to 20 inches. When length of actuatable region 135 is 5 inches to 20 inches, this may provide good but not excessive leverage for comfortable and responsive actuation of curved pedal 130. In a preferred embodiment, length of actuatable region 135 in length direction 132 is substantially longer than the foot of a typical player so as to permit increased leverage and facilitate various sliding actuation techniques. For example, in one embodiment, length of actuatable region 135 in length direction 132 is preferably not less than 12", more preferably not less than 14", and still more preferably not less than 16". Actuatable region 135 is described further below with reference to FIG. 10.

There is no particular limitation with respect to width of curved pedal 130 in width direction 133, it being sufficient that width of curved pedal 130 in width direction 133 be such as to permit comfortable actuation by the foot of a typical player, or by the feet of various players who may range in age from child to adult. Note that there is no objection to employment of a curved pedal 130 of nonuniform width; for example, there is no objection to employment of a curved pedal 130 in which width varies with position in length direction 132. For example, width of curved pedal 130 in width direction 133 may vary to accommodate the varying width of a typical foot. Furthermore, width of curved pedal 130 may narrow near the heel end and/or toe end of curved pedal 130 for convenience of mounting in pedal assembly 110 and to provide clearance with respect to support posts 124 and/or other parts.

In the embodiment shown in FIGS. 2 through 4, curved pedal 130 has actuatable region 135 comprising portion(s) 140, 150, 160 that is or are convex and/or concave relative to pedal reference plane 131. More specifically, curved pedal 130 in the embodiment shown in FIGS. 2 through 4 comprises actuatable region 135 having first convexity 140, first concavity 150, and second convexity 160. In the embodiment shown in FIGS. 2 through 4, first convexity 140, first concavity 150, and second convexity 160 are arranged in length direction 132 of actuatable region 135.

Except where stated otherwise herein, what is referred to herein as curvature of curved pedal 130 is curvature of top surface 136 thereof in length direction 132 as most easily seen in side view such as is shown in FIG. 3 and FIGS. 6 through 10. Except where stated otherwise herein, what is referred to herein as convexity or concavity of curved pedal 130 is convexity or concavity of top surface 136 thereof as viewed from a point above top surface 136 and as most easily seen in side view such as is shown in FIG. 3 and FIGS. 6 through 10.

Where curved pedal 130 contains multiple inflection points 145, 165, pedal reference plane 131 is defined as the plane that contains the best-fit line through those multiple inflection points 145, 165 as seen in a sectional view taken at a point located approximately centrally in width direction 133 of curved pedal 130 as shown in the side view of FIG. 3. Where curved pedal 130 contains less than two inflection points, pedal reference plane 131 is defined as the plane that contains the best-fit line through top surface 136 as seen in a sectional view taken at a point located approximately centrally in width direction 133 of curved pedal 130 as shown in the side view of FIG. 3.

Thus, in some embodiments, curved pedal 130 may be curved in at least a pedal length direction 132. Where this is the case, curved pedal 130 is preferably curved within at least a portion of an actuatable region 135 in the pedal length direction 132.

In one embodiment, the profile of top surface 136 of curved pedal 130 in length direction 132 has at least one inflection point 145, 165 (see FIG. 6 through 10) where curvature transitions between convex and concave, regardless of order, in length direction 132. In a preferred embodiment, there are at least two such inflection point 145, 165.

In a preferred embodiment, there are no horizontal flat portions (see FIG. 8) within at least a portion of actuatable region 135 and/or within substantially the entire actuatable region 135. In one embodiment, slope of top surface 136 at inflection point(s) 145, 165 where curvature transitions between convex and concave in length direction 132 is preferably not less than 5°, more preferably not less than 10°, and most preferably not less than 15°.

In a preferred embodiment, there are no vertical flat portions (see FIG. 9) within at least a portion of actuatable region 135 and/or within substantially the entire actuatable region 135. In one embodiment, slope of top surface 136 at inflection point(s) 145, 165 where curvature transitions between convex and concave in length direction 132 is preferably not greater than 85°, more preferably not greater than 80°, and most preferably not greater than 75°.

Where horizontal, vertical, and/or inclined flat portion(s) exist within actuatable region 135, these are preferably beveled or rounded so as to prevent occurrence of sharp corners 139 (see FIGS. 8 and 9) at transition(s) between flat portion(s) and convex and/or concave portion(s).

In one embodiment, local radius of curvature along top surface of curved pedal 130 within at least a portion of actuatable region 135 and/or within substantially the entire actuatable region 135 is preferably not less than one-quarter of, more preferably not less than one-third of, and most preferably not less than one-half of the length of actuatable region 135. In a preferred embodiment, local radius of curvature along top surface of curved pedal 130 within at least a portion of actuatable region 135 and/or within substantially the entire actuatable region 135 is preferably not less than 3", more preferably not less than 5", and most preferably not less than 7". In one embodiment, local radius of curvature along top surface of curved pedal 130 within at least a portion of actuatable region 135 and/or within substantially the entire actuatable region 135 is preferably 8"±75%, more preferably is 8"±50%, and most preferably is 8"±25%.

In one embodiment, curved pedal 130 has smoothly varying slope within at least a portion of actuatable region 135 and/or within substantially the entire actuatable region 135.

In one embodiment, the change in slope as a function of position along length direction 132, i.e., the second spatial derivative with respect to position in length direction 132, within at least a portion of actuatable region 135 and/or within substantially the entire actuatable region 135 is preferably not greater than 30° per inch, more preferably not greater than 18° per inch, and most preferably not greater than 13° per inch. In one embodiment, the second spatial derivative with respect to position in length direction 132 within at least a portion of actuatable region 135 and/or within substantially the entire actuatable region 135 is preferably 11.25° per inch±75%, more preferably is 11.25° per inch±50%, and most preferably is 11.25° per inch±25%.

In some embodiments, the profile of curved pedal 130 may be or approximate a sinusoidal curve in length direction 132 over at least a portion of actuatable region 135.

Where curved pedal 130 has such a sinusoidal profile, wavelength in length direction 132 is preferably on the order of or longer than the length of the foot of a typical player. For example, in one embodiment, wavelength of curved pedal 130 in length direction 132 is preferably 10"±50%, more preferably is 10"±25%, and most preferably is 10"±10%.

Where curved pedal 130 has such a sinusoidal profile, amplitude as measured from pedal reference plane 131 is preferably on the order of the height of the arch of the foot of a typical player. For example, in one embodiment, amplitude is preferably 0.30"±75%, more preferably is 0.30"±50%, and most preferably is 0.30"±25%.

In some embodiments, the profile of curved pedal 130 may be or may approximate a circular or elliptical arc in length direction 132 over at least a portion of actuatable region 135. Where curved pedal 130 has such an arcuate profile, radius of curvature is preferably 8"±75%, more preferably is 8"±50%, and most preferably is 8"±25%

Where curved pedal 130 has such an arcuate profile, distance between extrema 141, 161 (see FIG. 6 and FIGS. 8 through 10) of similar curvature, e.g., between successive convexities 140, 160, in length direction 132 is preferably on the order of or longer than the length of the foot of a typical player. For example, in one embodiment, interpeak distance, e.g., between first convexity extremum 141 and second convexity extremum 161, in length direction 132 is preferably 10"±50%, more preferably is 10"±25%, and most preferably is 10"±10%.

Where curved pedal 130 has such an arcuate profile, height of extrema 141, 151, 161 (see FIG. 6 and FIGS. 8 through 10) as measured from pedal reference plane 131 is preferably on the order of the height of the arch of the foot of a typical player. For example, in one embodiment, height of first convexity extremum 141, first concavity extremum 151, and/or second convexity extremum 161 as measured from pedal reference plane 131 is preferably 0.30"±75%, more preferably is 0.30"±50%, and most preferably is 0.30"±25%.

In some embodiments, the profile of curved pedal 130 may be or may approximate a polynomial curve in length direction 132 over at least a portion of actuatable region 135.

Where curved pedal 130 has such a polynomial profile, the order of the polynomial is preferably at least three, more preferably at least four, and most preferably at least five.

Where curved pedal 130 has such a polynomial profile, distance between extrema 141, 161 (see FIG. 6 and FIGS. 8 through 10, which, though not of polynomial profile, show analogous extrema 141, 161 of arcuately curved pedal 130a) of similar curvature, e.g., between successive convexities 140, 160, in length direction 132 is preferably on the order of or longer than the length of the foot of a typical player. For example, in one embodiment, interpeak distance, e.g., between first convexity extremum 141 and second convexity extremum 161, in length direction 132 is preferably 10"±50%, more preferably is 10"±25%, and most preferably is 10"±10%.

Where curved pedal 130 has such a polynomial profile, height of extrema 141, 151, 161 (see FIG. 6 and FIGS. 8 through 10, which, though not of polynomial profile, show analogous extrema 141, 151, 161 of arcuately curved pedal 130a) as measured from pedal reference plane 131 is preferably on the order of the height of the arch of the foot of a typical player. For example, in one embodiment, height of first convexity extremum 141, first concavity extremum 151, and/or second convexity extremum 161 as measured from pedal reference plane 131 is preferably 0.30"±75%, more preferably is 0.30"±50%, and most preferably is 0.30"±25%.

In some embodiments, curved pedal 130 may additionally be curved in pedal width direction 133. Where this is the case, curvature of top surface 136 in pedal width direction 133 may in some embodiments be convex, or curvature of top surface 136 in pedal width direction 133 may in other embodiments be concave. There is no particular objection to a saddle-shaped or similarly contoured curved pedal 130 in which curvature in length direction 132 may be locally opposite to curvature in width direction 133.

Although curved pedal 130 has been described with reference to FIGS. 2 through 4 in terms of an example in which actuatable region 135 is divided into three curved portions 140, 150, 160 without interposition of flat portion(s), e.g., horizontal or vertical flat portions (see FIGS. 8 and 9), at inflection points 145, 146 therebetween, actuatable region 135 may be divided into greater or fewer than three curved portion(s), and there is no particular objection to presence of flat portion(s); e.g., interposition of non-curved or flat portion(s) between respective curved portions 140, 150, 160. Although FIGS. 8 and 9 respectively show embodiments in which horizontal and vertical flat portions intervene between curved portions 140, 150, 160, in an embodiment in which flat portion(s) are present note that there is no objection to employment of flat portion(s) that are inclined with respect to pedal reference plane 131; i.e., flat as used in this context means noncurved and not necessarily that such flat portion(s) need be parallel to (horizontal) or perpendicular to (vertical) pedal reference plane 131. Where horizontal, vertical, and/or inclined flat portion(s) exist within actuatable region 135, these are preferably beveled or rounded so as to prevent occurrence of sharp corners 139 (see FIGS. 8 and 9) at transition(s) between flat portion(s) and convex and/or concave portion(s).

Referring to FIG. 5A through FIG. 5J, these show various embodiments in which actuatable region 135 has been subdivided into three portions, each of which may respectively contain a convex portion 140, 160; a concave portion 150; or a noncurved or flat portion.

Figure 5A:
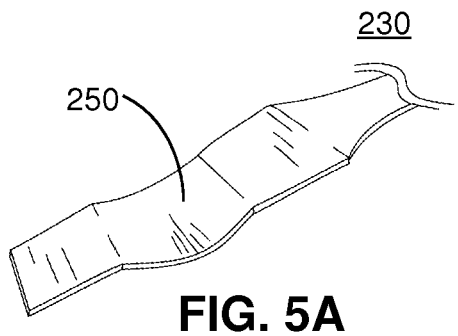
FIG. 5A through FIG. 5J show various embodiments of the present invention that are variations on curved pedal 130 of FIG. 3, FIG. 5A showing curved pedal 230 comprising first concavity 250.

In the embodiment shown in FIG. 5A, curved pedal 230 comprises first concavity 250.

Figure 5B:
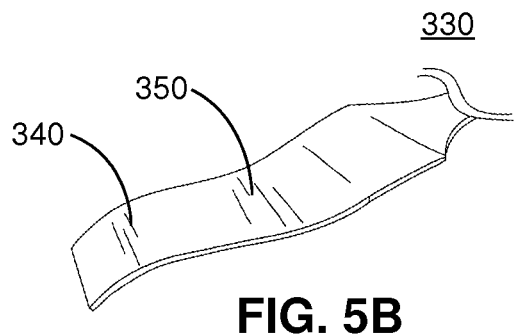

In the embodiment shown in FIG. 5B, curved pedal 330 comprises first convexity 340 and first concavity 350.

Figure 5C:
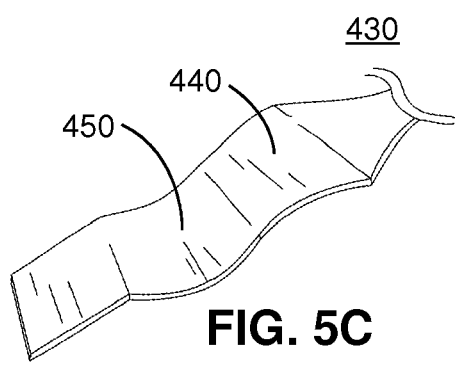

In the embodiment shown in FIG. 5C, curved pedal 430 comprises first concavity 450 and first convexity 440.

Figure 5D:
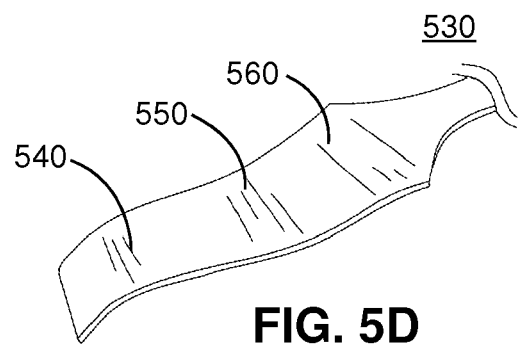

In the embodiment shown in FIG. 5D, curved pedal 530 comprises first convexity 540, first concavity 550, and second convexity 560.

Figure 5E:
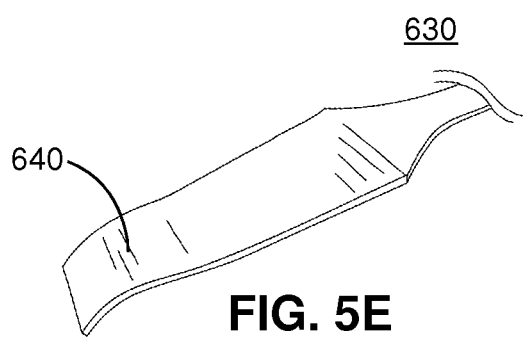

In the embodiment shown in FIG. 5E, curved pedal 630 comprises first convexity 640.

Figure 5F:
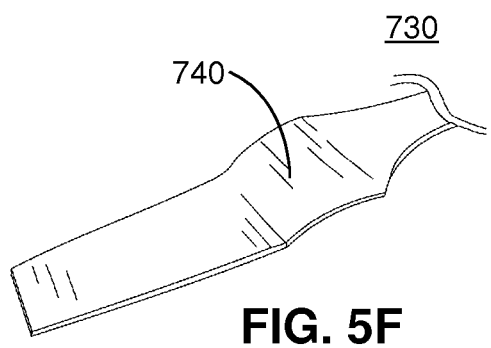

In the embodiment shown in FIG. 5F, curved pedal 730 comprises first convexity 740.

Figure 5G:
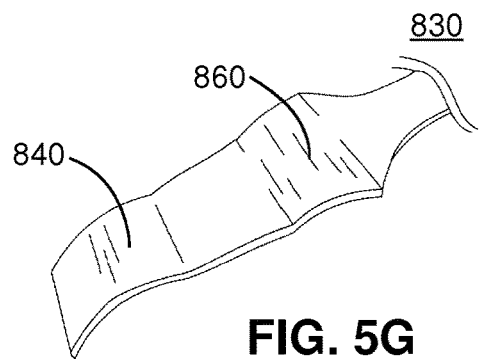

In the embodiment shown in FIG. 5G, curved pedal 830 comprises first convexity 840 and second convexity 860.

Figure 5H:
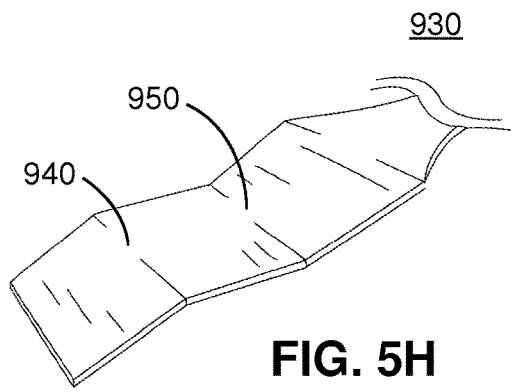

In the embodiment shown in FIG. 5H, curved pedal 930 comprises first convexity 940 and first concavity 950.

Figure 5I:
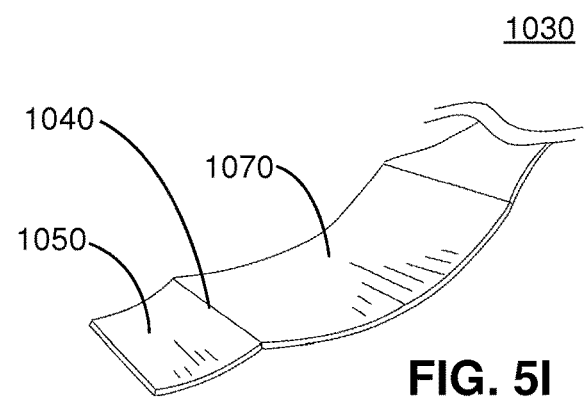

In the embodiment shown in FIG. 5I, curved pedal 1030 comprises first convexity 1040, first concavity 1050, and second concavity 1070.

Figure 5J:
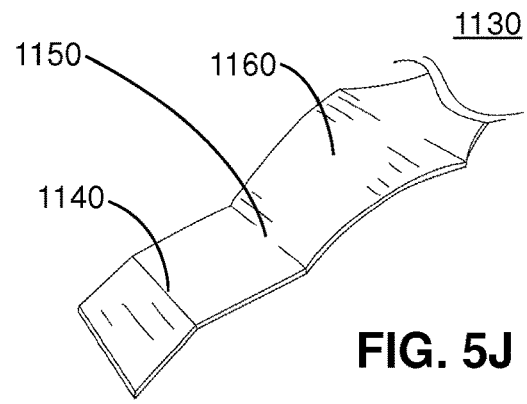

In the embodiment shown in FIG. 5J, curved pedal 1130 comprises first convexity 1140, first concavity 1150, and second convexity 1160.

Similar variations, included within the scope of the claims appended hereto, are possible when actuatable region 135 of curved pedal 130 is subdivided into greater or fewer than three portions.

Note that there is no objection to an embodiment in which convex portion(s) 140, 160, concave portion(s) 150, and/or noncurved or flat portion(s) occupy two or more of the portions into which actuatable region 135 is divided. For example, where actuatable region 135 is subdivided into three portions as shown in FIG. 5A through 5J, there is no objection to an embodiment in which first convexity 140 occupies two of the portions, and first concavity 150 occupies the remaining portion, or vice-versa. Such a variation is indicated by way of example at FIG. 5I, where second concavity 1070 occupies two of the portions into which actuatable region 135 is divided.

Note that there is no objection to combination of convex portion(s) and/or concave portion(s) with noncurved or flat portion(s), some examples of which are shown at FIGS. 5A through 5J.

Furthermore, there is no particular objection to use of angled flat portion(s) to form convex and/or concave portion(s), some examples of which are shown in FIGS. 5A through 5J. Where such angled flat portion(s) exist within actuatable region 135, these are preferably beveled or rounded so as to prevent occurrence of sharp corners 139 (see FIGS. 8 and 9) at transition(s) between flat portion(s) and convex, concave portion(s) and/or other flat portion(s).

In a preferred embodiment, at least one concave portion 150 is disposed more or less centrally in length direction 132 and/or is disposed between two convex portions 140, 160 in length direction 132.

For example, curved pedal 130 shown in FIGS. 2 through 4 and FIGS. 6 through 10 has first convexity 140, first concavity 150, and/or second convexity 160, first concavity 150 being disposed centrally between first convexity 140 and second convexity 160 along length direction 132 of actuatable region 135.

Figure 6:
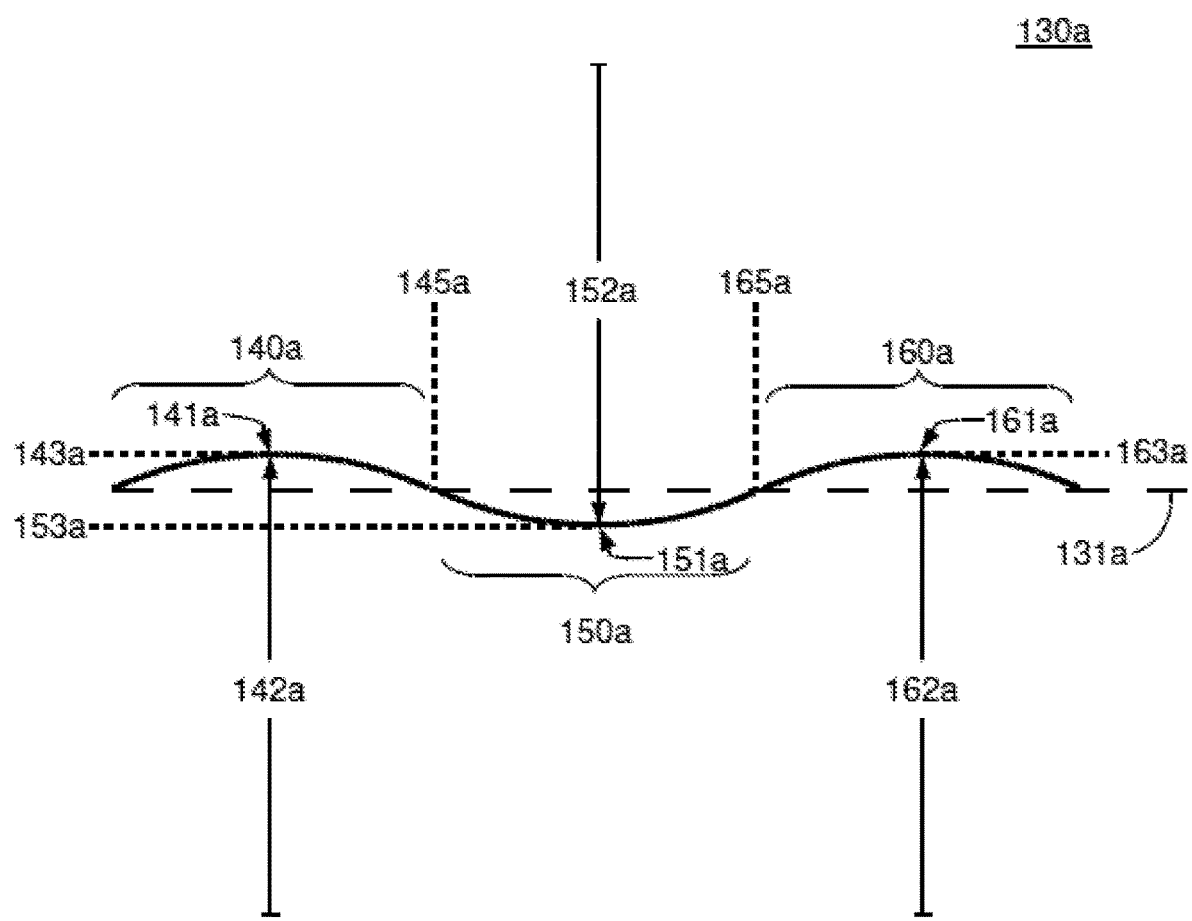
FIG. 6 is a side view of arcuately curved pedal 130a in an embodiment of the present invention in which first convexity 140a, first concavity 150a, and second convexity 160a have radii of curvature that are respectively uniform, being circular arcs, and in which arrangement and radii of curvature of first convexity 140a, first concavity 150a, and second convexity 160a are such as to produce smooth inflection points, without interposition of flat portions, therebetween.

Referring to FIG. 6, this is a side view of arcuately curved pedal 130a in an embodiment of the present invention in which first convexity 140a, first concavity 150a, and second convexity 160a have radii of curvature 142a, 152a, 162a that are respectively uniform, being circular arcs, and in which arrangement and radii of curvature 142a, 152a, 162a of first convexity 140a, first concavity 150a, and second convexity 160a are such as to produce smooth inflection points 145a, 165a, without interposition of flat portions, therebetween.

In the embodiment shown in FIG. 6, first arcuately curved convexity 140a has radius of curvature 142a, first arcuately curved concavity 150a has radius of curvature 152a, and second arcuately curved convexity 160a has radius of curvature 162a.

In the embodiment shown in FIG. 6, first arcuately curved convexity 140a has height (i.e., amplitude) 143a at extremum 141a as measured from pedal reference plane 131a. First arcuately curved concavity 150a has height (i.e., amplitude) 153a at extremum 151a as measured from pedal reference plane 131a. Second arcuately curved convexity 160a has height (i.e., amplitude) 143a at extremum 141a as measured from pedal reference plane 131a.

In the embodiment shown in FIG. 6, first convexity inflection point 145a is present where curvature transitions between convex and concave between first arcuately curved convexity 140a and first arcuately curved concavity 150a in length direction 132, and second convexity inflection point 165a is present where curvature transitions between concave and convex between first arcuately curved concavity 150a and second arcuately curved convexity 160 in length direction 132.

In the embodiment shown in FIG. 6, arrangement of first arcuately curved convexity 140a, first arcuately curved concavity 150a, and second arcuately curved convexity 160a, i.e., respective distances between extrema 141a, 151a, 161a and respective heights of extrema 141a, 151a, 161a as measured from pedal reference plane 131, and respective radii of curvature 142a, 152a, 162a, are chosen such that adjacent arcs of opposite curvature more or less exactly meet at inflection points 145a, 165a as to produce smooth inflection points 145a, 165a without interposition of flat portions therebetween.

Figure 7:
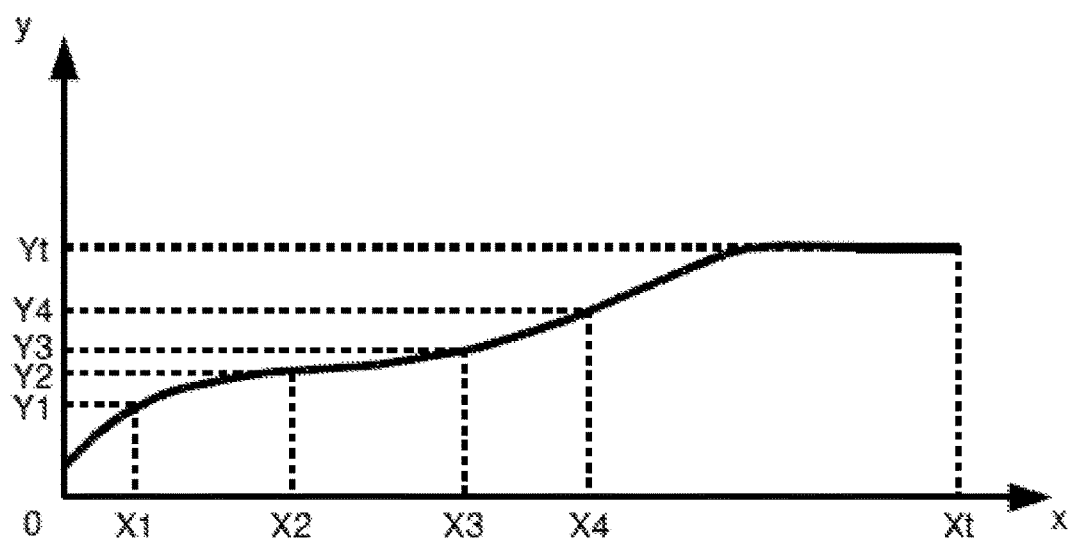
FIG. 7 is a side view of curved pedal 130 as it might exist when undepressed in pedal assembly 110 of FIG. 3, and shows inclination of extrema 141, 151, 161 and inflection points 145, 165 due to pedal mount angle 128 formed by pedal reference plane 131 and baseboard plane 113.

Referring to FIG. 7, this is a side view showing in schematic fashion how curved pedal 130, e.g., arcuately curved pedal 130a of the embodiment shown in FIG. 6, might appear when mounted in pedal assembly 110 of FIG. 3. In the schematic diagram of FIG. 7, curved pedal 130 is in its raised or undepressed position, being inclined more or less at pedal mount angle 128 (see FIG. 3). As indicated in the graph shown in FIG. 7, respective positions in the x and y axes of first convexity extremum 141a, first convexity inflection point 145a, first concavity extremum 151a, second convexity inflection point 165a, and second convexity extremum 161a-respectively indicated by indices 1, 2, 3, and 4—are inclined at pedal mount angle 128 formed by pedal reference plane 131 and baseboard plane 113.

Figure 8:
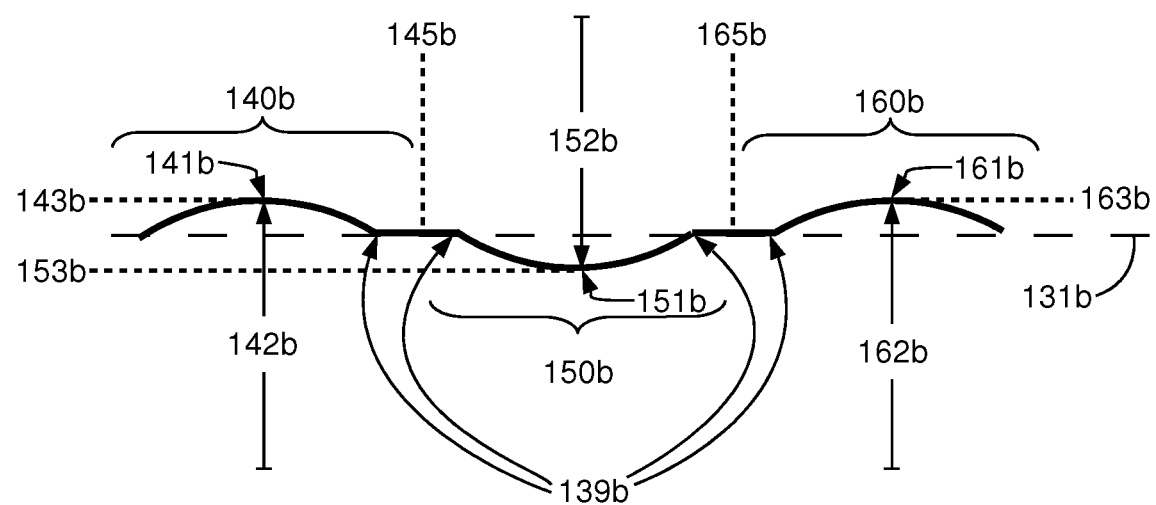
FIG. 8 is a side view of arcuately curved pedal 130b in an embodiment of the present invention in which first convexity 140b, first concavity 150b, and second convexity 160b have radii of curvature that are respectively uniform, being circular arcs, and in which arrangement and radii of curvature of first convexity 140b, first concavity 150b, and second convexity 160b are such as to accommodate interposition of horizontal flat portions at inflection points therebetween as a result of the smaller radii of curvature in the embodiment shown in FIG. 8 as compared with the embodiment shown in FIG. 6.

Referring to FIG. 8, this is a side view of arcuately curved pedal 130b in an embodiment of the present invention in which first convexity 140b, first concavity 150b, and second convexity 160b have radii of curvature 142b, 152b, 162b that are respectively uniform, being circular arcs, and in which arrangement and radii of curvature 142b, 152b, 162b of first convexity 140b, first concavity 150b, and second convexity 160b are such as to accommodate interposition of horizontal flat portions at inflection points 145b, 165b therebetween as a result of the smaller radii of curvature 142b, 152b, 162b in the embodiment shown in FIG. 8 as compared with the radii of curvature 142a, 152a, 162a employed in the embodiment shown in FIG. 6.

Note that where corner(s) 139b are produced at transition(s) between flat portion(s) and convex and/or concave portion(s), it is preferred that these be beveled or rounded so that local radius of curvature is not substantially smaller than radius of curvature at other locations along the curved profile at top surface 136 of curved pedal 130. In a preferred embodiment, radii of curvature at corner(s) 139b at transition(s) between flat portion(s) and convex and/or concave portion(s) are preferably not less than 3", more preferably not less than 5", and most preferably not less than 7".

Figure 9:
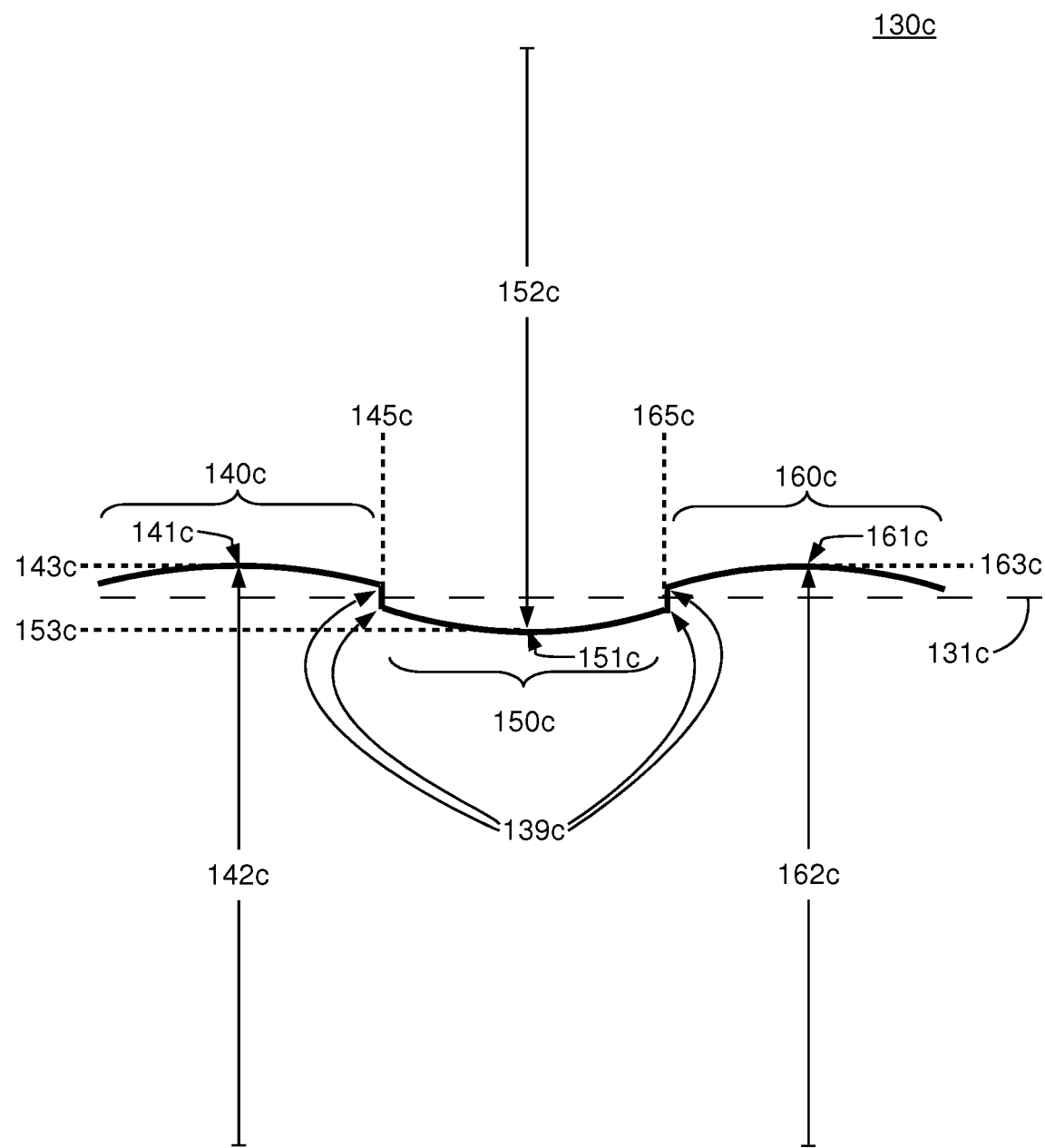
FIG. 9 is a side view of arcuately curved pedal 130c in an embodiment of the present invention in which first convexity 140c, first concavity 150c, and second convexity 160c have radii of curvature that are respectively uniform, being circular arcs, and in which arrangement and radii of curvature of first convexity 140c, first concavity 150c, and second convexity 160c are such as to accommodate interposition of vertical flat portions at inflection points therebetween as a result of the larger radii of curvature in the embodiment shown in FIG. 9 as compared with the embodiment shown in FIG. 6.

Referring to FIG. 9, this is a side view of arcuately curved pedal 130c in an embodiment of the present invention in which first convexity 140c, first concavity 150c, and second convexity 160c have radii of curvature 142c, 152c, 162c that are respectively uniform, being circular arcs, and in which arrangement and radii of curvature 142c, 152c, 162c of first convexity 140c, first concavity 150c, and second convexity 160c are such as to accommodate interposition of vertical flat portions at inflection points 145c, 165c therebetween as a result of the larger radii of curvature 142c, 152c, 162c in the embodiment shown in FIG. 9 as compared with the radii of curvature 142a, 152a, 162a employed in the embodiment shown in

FIG. 6.

Note that where corner(s) 139c are produced at transition(s) between flat portion(s) and convex and/or concave portion(s), it is preferred that these be beveled or rounded so that local radius of curvature is not substantially smaller than radius of curvature at other locations along the curved profile at top surface 136 of curved pedal 130. In a preferred embodiment, radii of curvature at corner(s) 139c at transition(s) between flat portion(s) and convex and/or concave portion(s) are preferably not less than 3", more preferably not less than 5", and most preferably not less than 7".

Figure 10:
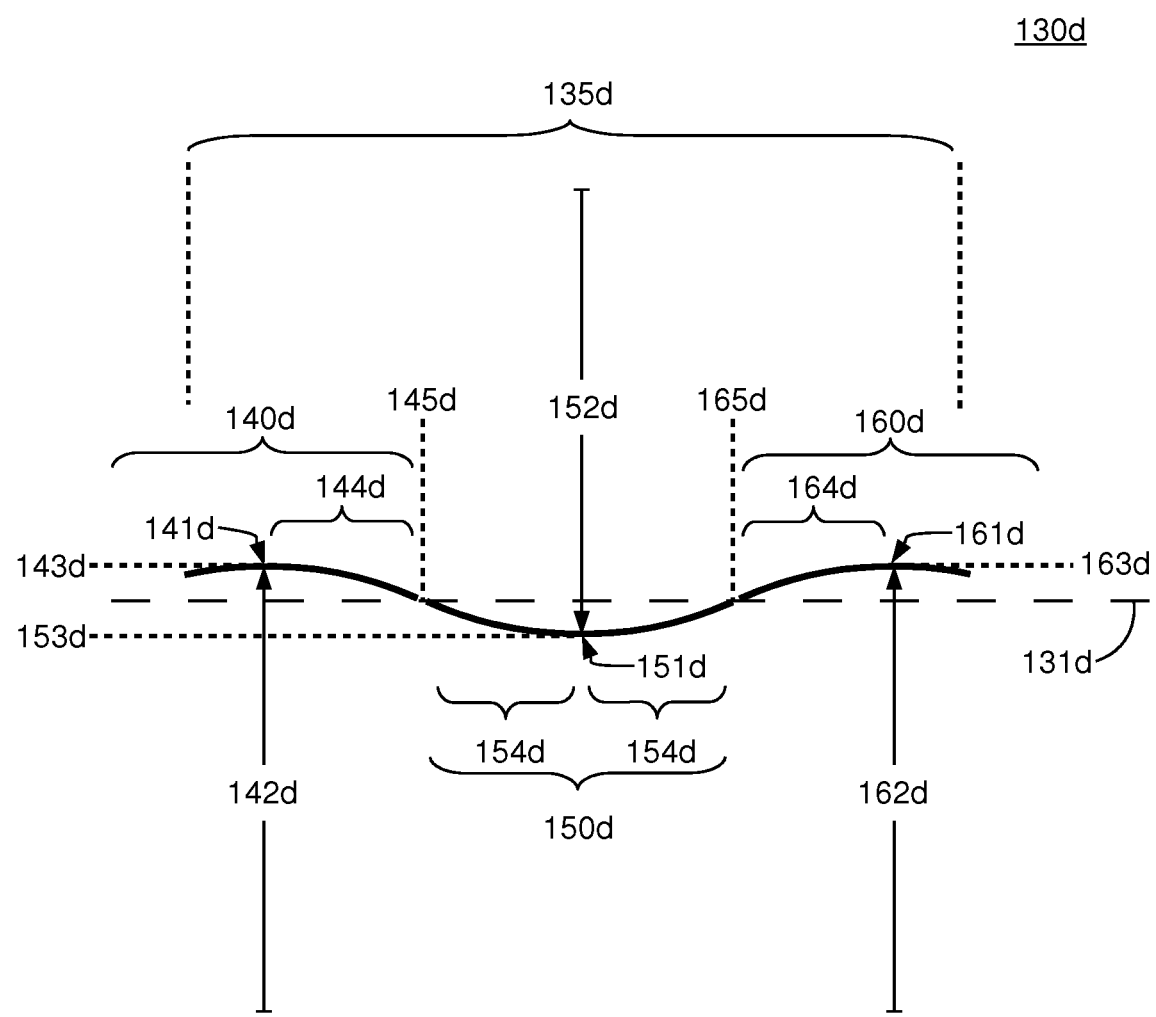
FIG. 10 is a side view of arcuately curved pedal 130d, which is identical to arcuately curved pedal 130a of FIG. 6 except that portions peripheral to actuatable region 135d have been removed, so that actuatable region 135d contains first convexity half-lobe 144d, first concavity half-lobes 154d, and second convexity half-lobe 164d.

Referring to FIG. 10, this is a side view of arcuately curved pedal 130d, which is identical to arcuately curved pedal 130a of FIG. 6 except that portions peripheral to actuatable region 135d have been removed, leaving what are substantially first convexity half-lobe 144d, first concavity half-lobes 154d, and second convexity half-lobe 164d within actuatable region 135d.

Whereas curved pedal 130 shown in FIGS. 2 through 4 and FIGS. 6 through 9 is divided into three curved portions 140, 150, 160, actuatable region 135, i.e., the region contacted by the foot during playing, may in some embodiments not extend all the way to the peripheral ends of first convexity 140 and second convexity 160.

That is, in embodiments in which there is a central concavity 150 and/or a concavity 150 disposed between two convexities 140, 160, it may primarily be the central concavity 150 that serves to locate or orient the foot, while the convexities 140, 160 to either side thereof might typically primarily serve to receive striking force from the heel and/or toe. This being the case, in such an embodiment, it may be that it is primarily only the central or interior first convexity half-lobe 144d which is disposed between extremum 141d and inflection point 145d of first convexity 140d that is required for actuation, and it may be that it is primarily only the central or interior second convexity half-lobe 164d which is disposed between extremum 161d and inflection point 165d of second convexity 160d that is required for actuation.

For this reason, actuatable region 135d of curved pedal 130d is shown in FIG. 10 as extending only slightly peripherally past first convexity extremum 141d at the heel side (left side in FIG. 10) of curved pedal 130d, and as extending only slightly peripherally past second convexity extremum 161d at the toe side (right side in FIG. 10) of curved pedal 130d.

That is, actuatable region 135d of curved pedal 130d in the embodiment shown in FIG. 10 comprises the two half-lobes 154d of central concavity 150d but only substantially the interior half-lobe 144d of first convexity 140d and only substantially the interior half-lobe 164d of second convexity 160d. Note that in a preferred embodiment, actuatable region 135d extends peripherally slightly past first convexity extremum 141d to comprise a small portion of what would be the exterior half-lobe of first convexity 140d, and extends peripherally slightly past second convexity extremum 161d to comprise a small portion of what would be the exterior half-lobe of second convexity 160d.

In one embodiment, actuatable region 135d preferably extends peripherally not more than 25%, more preferably not more than 15%, and most preferably not more than 10%, past first convexity extremum 141d. In one embodiment, actuatable region 135d preferably extends peripherally not more than 25%, more preferably not more than 15%, and most preferably not more than 10%, past second convexity extremum 161d.

And in an embodiment in which it is desirable that convex portion(s) 140, 160 be at least minimally well-defined, actuatable region 135d in such an embodiment preferably extends peripherally not less than 15%, more preferably not less than 10%, and most preferably not less than 5%, past first convexity extremum 141, and/or actuatable region 135d in such an embodiment preferably extends peripherally not less than 15%, more preferably not less than 10%, and most preferably not less than 5%, past second convexity extremum 161d.

Here, the degree to which actuatable region 135d extends peripherally past an extremum is measured as the distance from the projection of the extremum onto pedal reference plane 131d to the projection of the most peripheral point of actuatable region 135d onto pedal reference plane 131d.

Although the profiles of first convexity 140a, 140b, 140c, 140d; first concavity 150a, 150b, 150c, 150d; and second convexity 160a, 160b, 160c, 160d in the embodiments shown in FIGS. 6, 8, 9 and 10 are circular arcs, there is no objection to employment of elliptical arc(s), conic section(s), and/or any suitable portion(s) of Bezier curve(s) at one or more of first convexity 140a, first concavity 150a, and second convexity 160a, or at any suitable portion(s) thereof.

Furthermore, as described with reference to FIGS. 11 through 15, any of various sinusoidal and/or polynomial profiles may be employed at one or more of first convexity 140a, 140b, 140c, 140d; first concavity 150a, 150b, 150c, 150d; and second convexity 160a, 160b, 160c, 160d, or at any suitable portion(s) thereof.

Moreover, curvature profile need not be uniform throughout actuatable region 135 along length direction 132 of curved pedal 130 it being possible, for example, to employ respectively different curvature profiles at curved portions 140, 150, 160. Furthermore, curvature profile need not be uniform within each of respective curved portions 140, 150, 160, it being possible, for example, to employ different curvature profiles at respective half-lobe(s) 144, 154, 164 therewithin.

Figure 11:
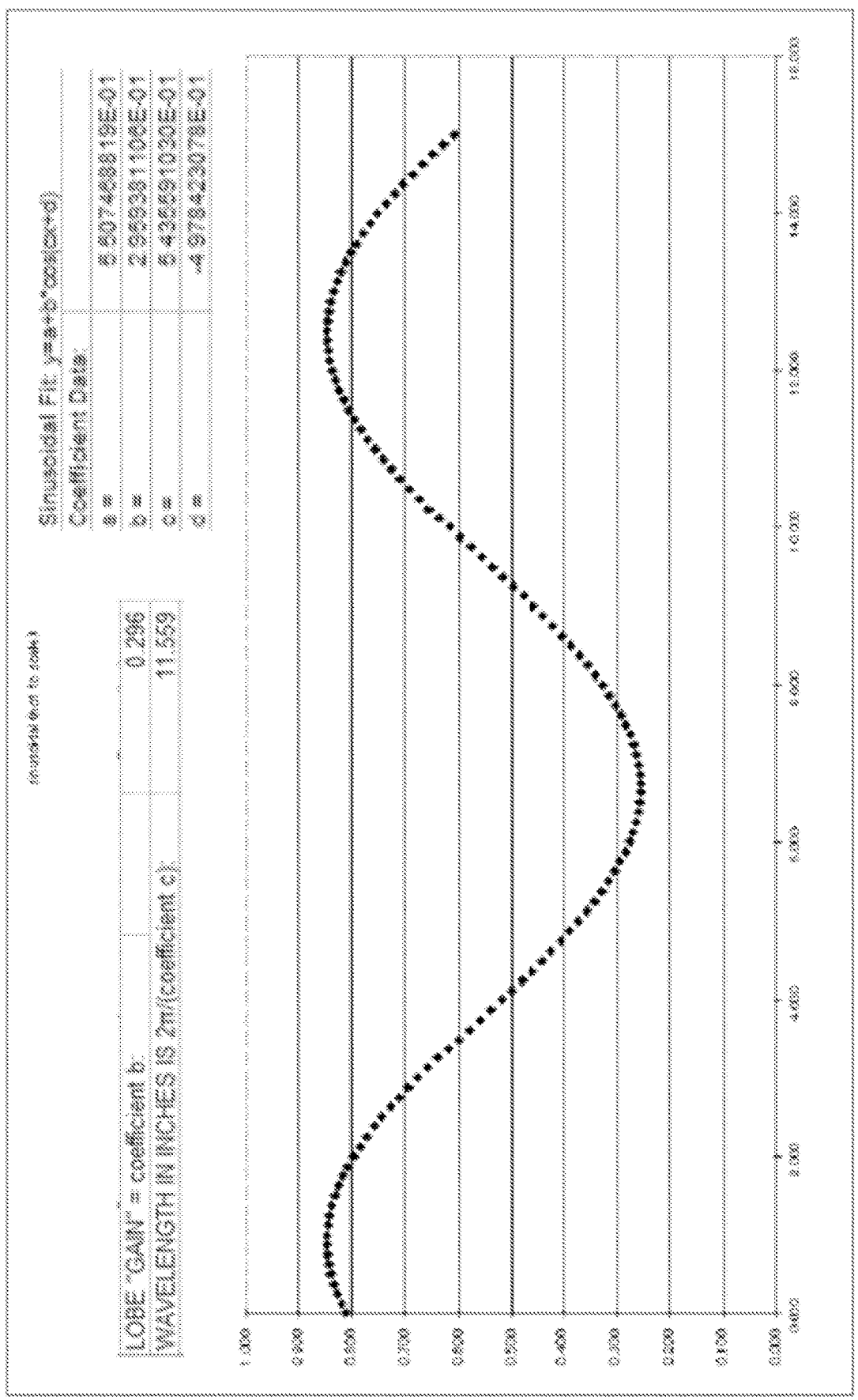
FIG. 11 shows a working example in which top surface 136 of curved pedal 130 has a uniform sinusoidal profile of wavelength 11.6" and amplitude 0.30" throughout actuatable region 135 in length direction 132.

FIG. 11 shows a working example in which top surface 136 of curved pedal 130 has a uniform sinusoidal profile of wavelength 11.6" and amplitude 0.30" throughout actuatable region 135 in length direction 132. The sinusoidal profile shown in FIG. 11 was derived by curvefitting a sinusoidal function to data measured from a prototype constructed by the inventor. More specifically, the curvature profile shown in FIG. 11 is a graph of the equation $y=a+b*\cos(cx+d)$, where coefficients a through d are: a=5.507468819E-01; b=2.959381106E-01; c=5.435591030E-01; and d=−4.978423078E-01.

Figure 12A:
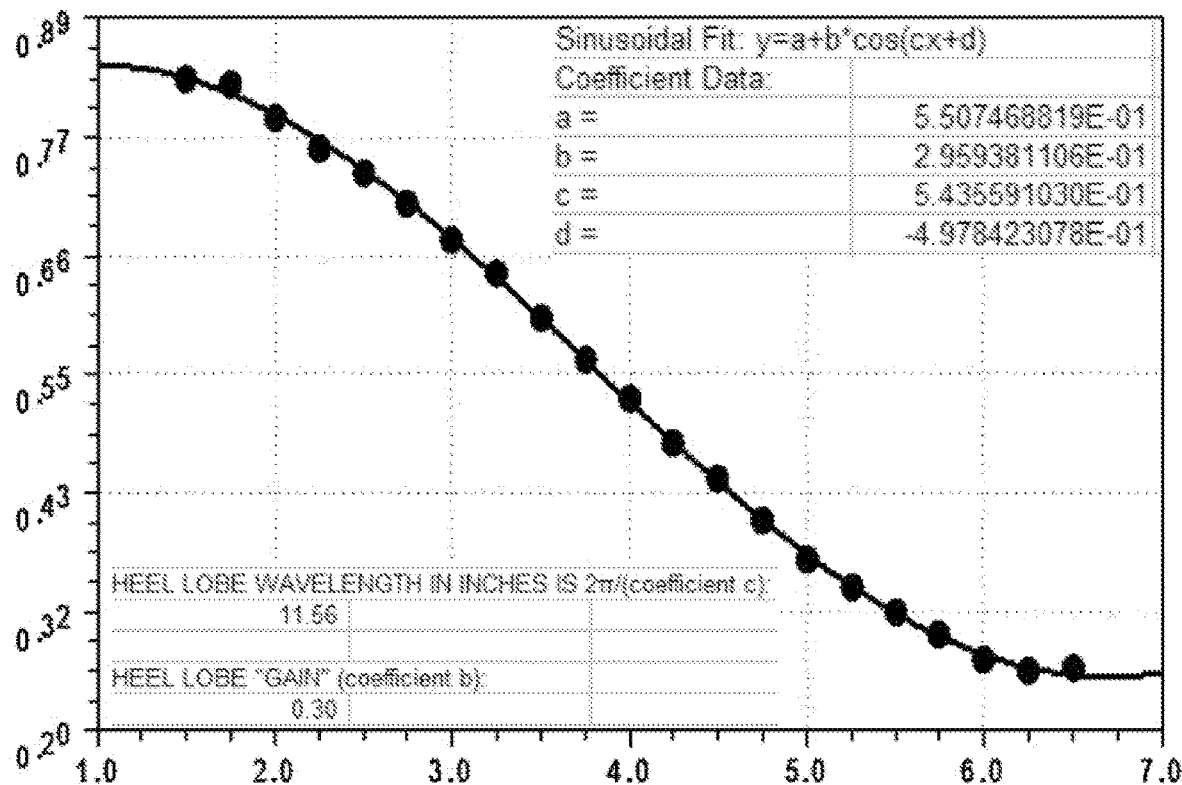
FIGS. 12A and 12B show a working example in which top surface 136 of curved pedal 130 has a varying sinusoidal profile within actuatable region 135 in length direction 132, the combined portion comprising first convexity half-lobe 144 and first concavity heel-side half-lobe 154 having a sinusoidal profile of wavelength 11.6" and amplitude 0.30" as shown in FIG. 12A, and the combined portion comprising first concavity toe-side half-lobe 154 and second convexity half-lobe 164 having a sinusoidal profile of wavelength 8.4" and amplitude 0.21" as shown in FIG. 12B.
Figure 12B:
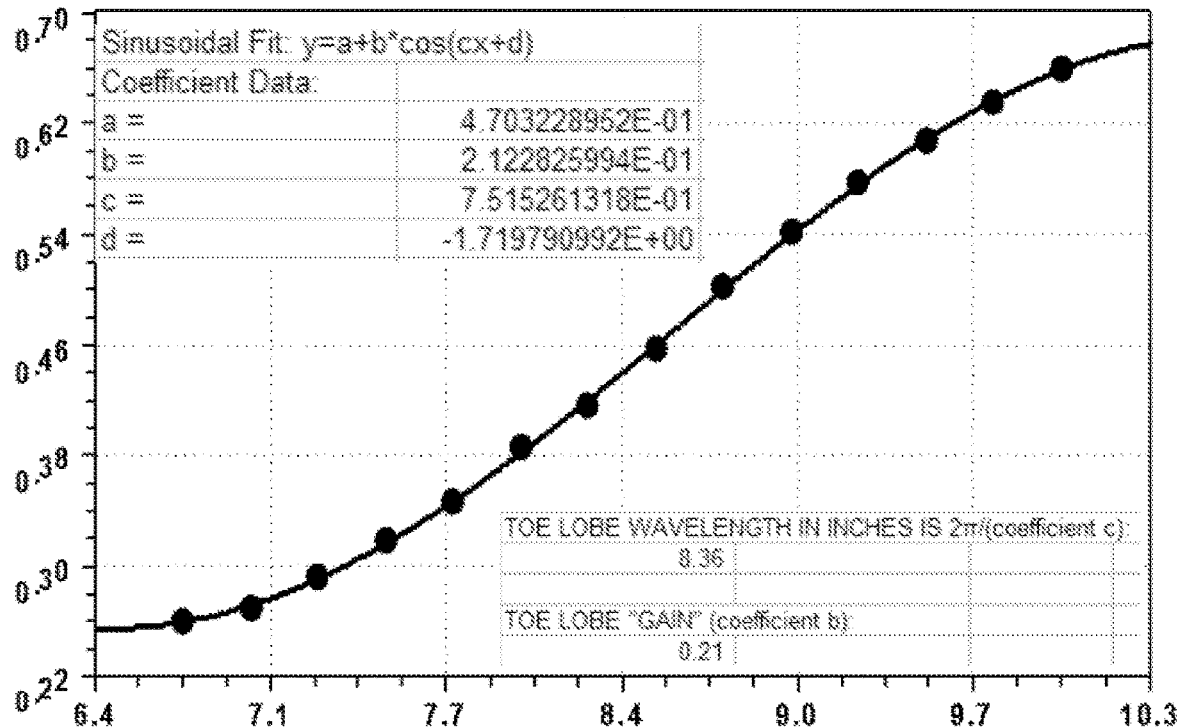

FIGS. 12A and 12B show a working example in which top surface 136 of curved pedal 130 has a varying sinusoidal profile within actuatable region 135 in length direction 132, the combined portion comprising first convexity half-lobe 144 and first concavity heel-side half-lobe 154 having a sinusoidal profile of wavelength 11.6" and amplitude 0.30" as shown in FIG. 12A, and the combined portion comprising first concavity toe-side half-lobe 154 and second convexity half-lobe 164 having a sinusoidal profile of wavelength 8.4" and amplitude 0.21" as shown in FIG. 12B. The sinusoidal profiles shown in FIGS. 12A and 12B were derived by curvefitting sinusoidal functions to data measured from a prototype constructed by the inventor. More specifically, the curvature profile shown in FIG. 12A is a graph of the equation $y=a+b*\cos(cx+d)$, where coefficients a through d are: a=5.507468819E-01; b=2.959381106E-01; c=5.435591030E-01; and d=−4.978423078E-01. Likewise, the curvature profile shown in FIG. 12B is a graph of the equation $y=a+b*\cos(cx+d)$, where coefficients a through d are: a=4.703228952E-01; b=2.122825994E-01; c=7.515261318E-01; and d=−1.719790992E+00.

Figure 13:
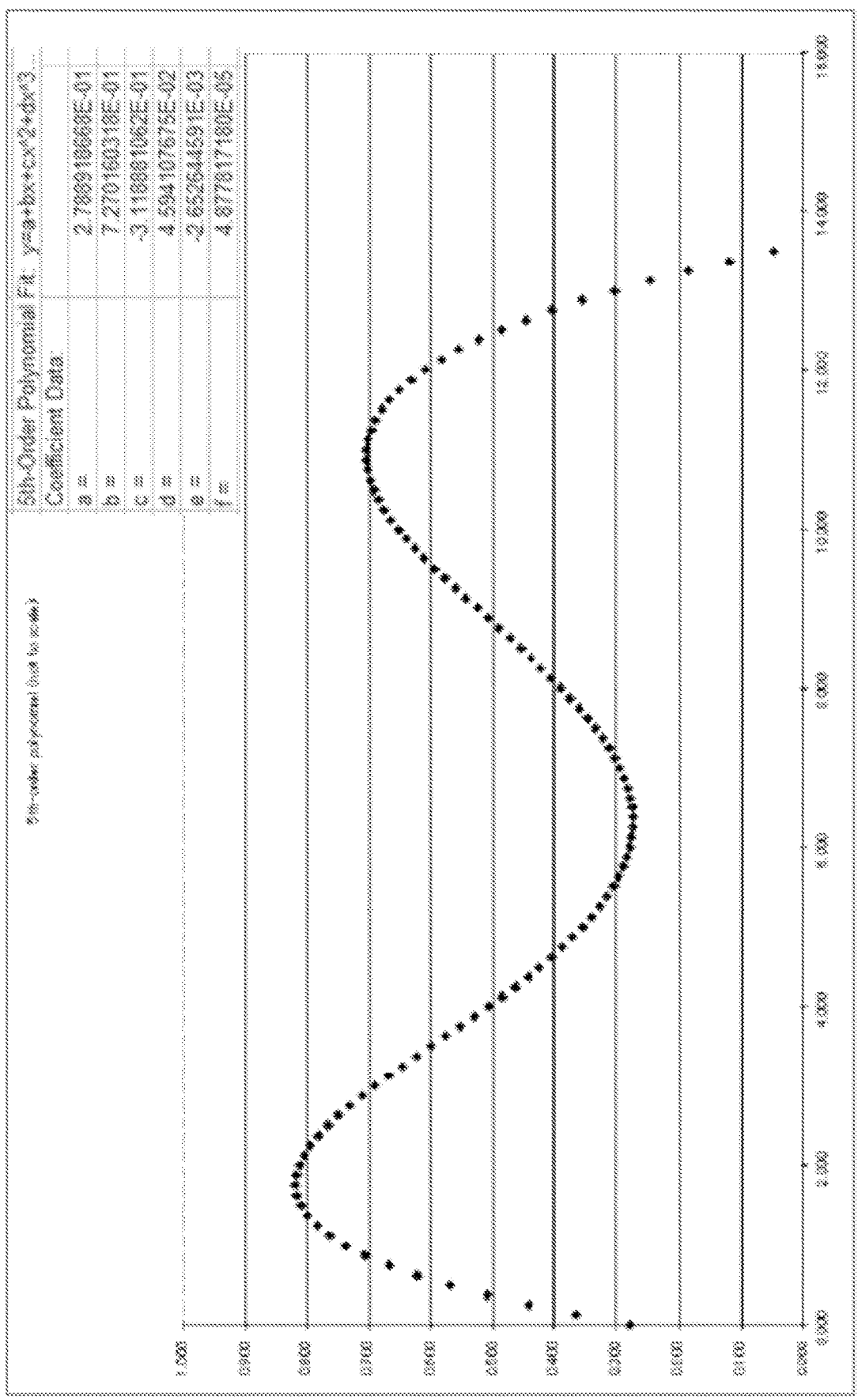
FIG. 13 shows a working example in which top surface 136 of curved pedal 130 has a 5th-order polynomial profile throughout actuatable region 135 in length direction 132.

FIG. 13 shows a working example in which top surface 136 of curved pedal 130 has a 5th-order polynomial profile throughout actuatable region 135 in length direction 132. The 5th-order polynomial profile shown in FIG. 13 was derived by curvefitting a 5th-order polynomial function to data measured from a prototype constructed by the inventor. More specifically, the curvature profile shown in FIG. 13 is a graph of the equation $y=a+bx+cx^2+dx^3+ex^4+fx^5$, where coefficients a through f are: a=2.788918668E-01; b=7.270160318E-01; c=−3.118881062E-01; d=4.594107675E-02; e=−2.652644591E-03; and f=4.877817180E-05.

Figure 14A:
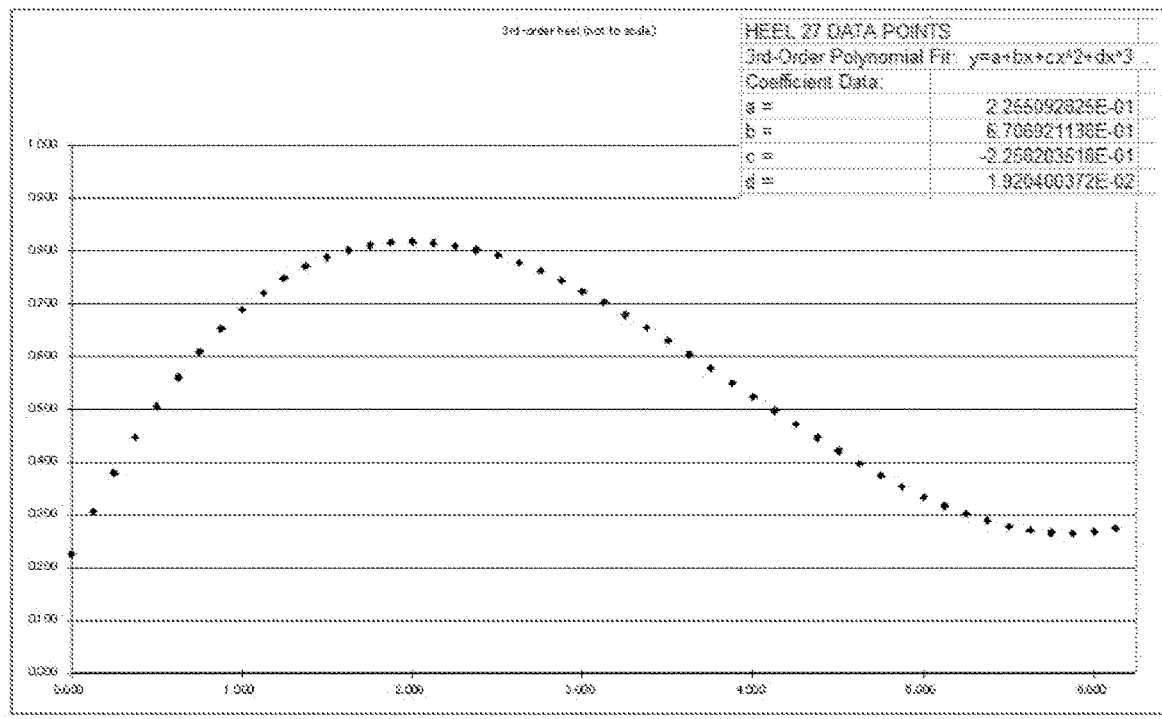
FIGS. 14A and 14B show a working example in which top surface 136 of curved pedal 130 has a varying 3rd-order polynomial profile within actuatable region 135 in length direction 132, the combined portion comprising first convexity 140 and first concavity heel-side half-lobe 154 having a 3rd-order polynomial profile as shown in FIG. 14A, and the combined portion comprising first concavity toe-side half-lobe 154 and second convexity 160 having a 3rd-order polynomial profile as shown in FIG. 14B.
Figure 14B:
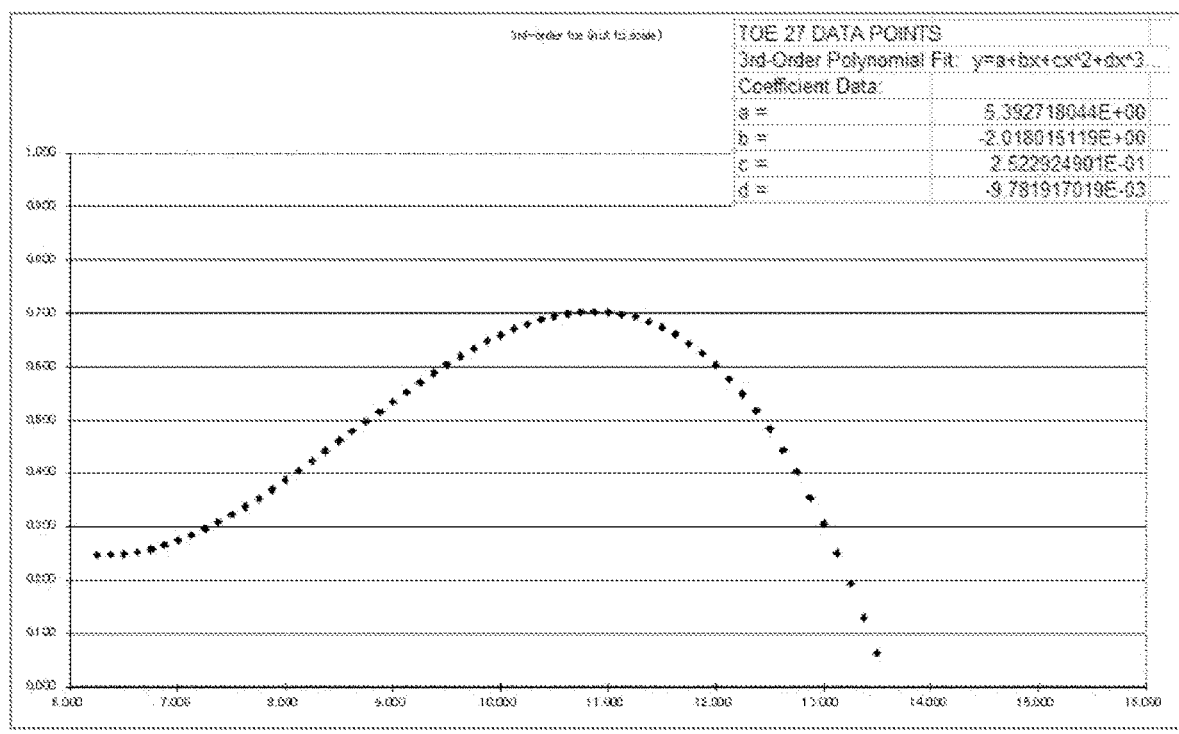

FIGS. 14A and 14B show a working example in which top surface 136 of curved pedal 130 has a varying 3rd-order polynomial profile within actuatable region 135 in length direction 132, the combined portion comprising first convexity 140 and first concavity heel-side half-lobe 154 having a 3rd-order polynomial profile as shown in FIG. 14A, and the combined portion comprising first concavity toe-side half-lobe 154 and second convexity 160 having a 3rd-order polynomial profile as shown in FIG. 14B. The 3rd-order polynomial profiles shown in FIGS. 14A and 14B were derived by curvefitting 3rd-order polynomial functions to data measured from a prototype constructed by the inventor. More specifically, the curvature profile shown in FIG. 14A is a graph of the equation $y=a+bx+cx^2+dx^3$, where coefficients a through d are: a=2.255092825E-01; b=6.706921138E-01; c=-2.258203518E-01; and d=1.920400372E-02. Likewise, the curvature profile shown in FIG. 14B is a graph of the equation $y=a+bx+cx^2+dx^3$, where coefficients a through d are: a=5.392718044E+00; b=-2.018015119E+00; c=2.522924901E-01; and d=-9.781917019E-03.

Figure 15A:
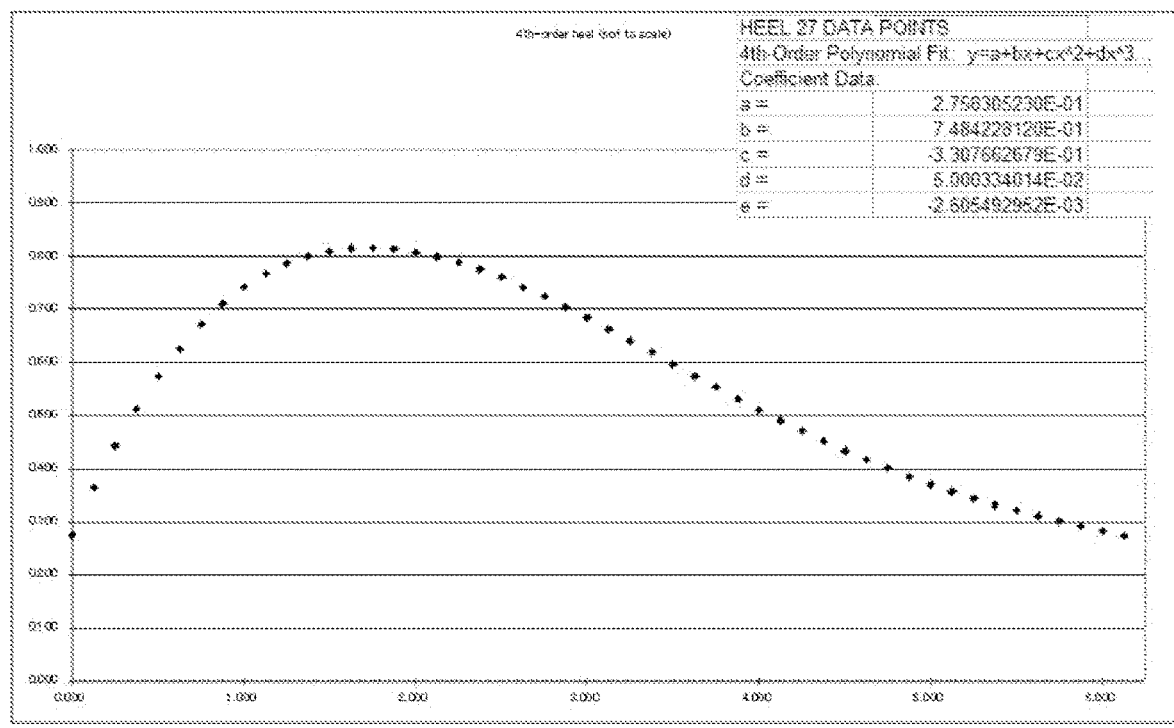
FIGS. 15A and 15B show a working example in which top surface 136 of curved pedal 130 has a varying 4th-order polynomial profile within actuatable region 135 in length direction 132, the combined portion comprising first convexity 140 and first concavity heel-side half-lobe 154 having a 4th-order polynomial profile as shown in FIG. 15A, and the combined portion comprising first concavity toe-side half-lobe 154 and second convexity 160 having a 4th-order polynomial profile as shown in FIG. 15B.
Figure 15B:
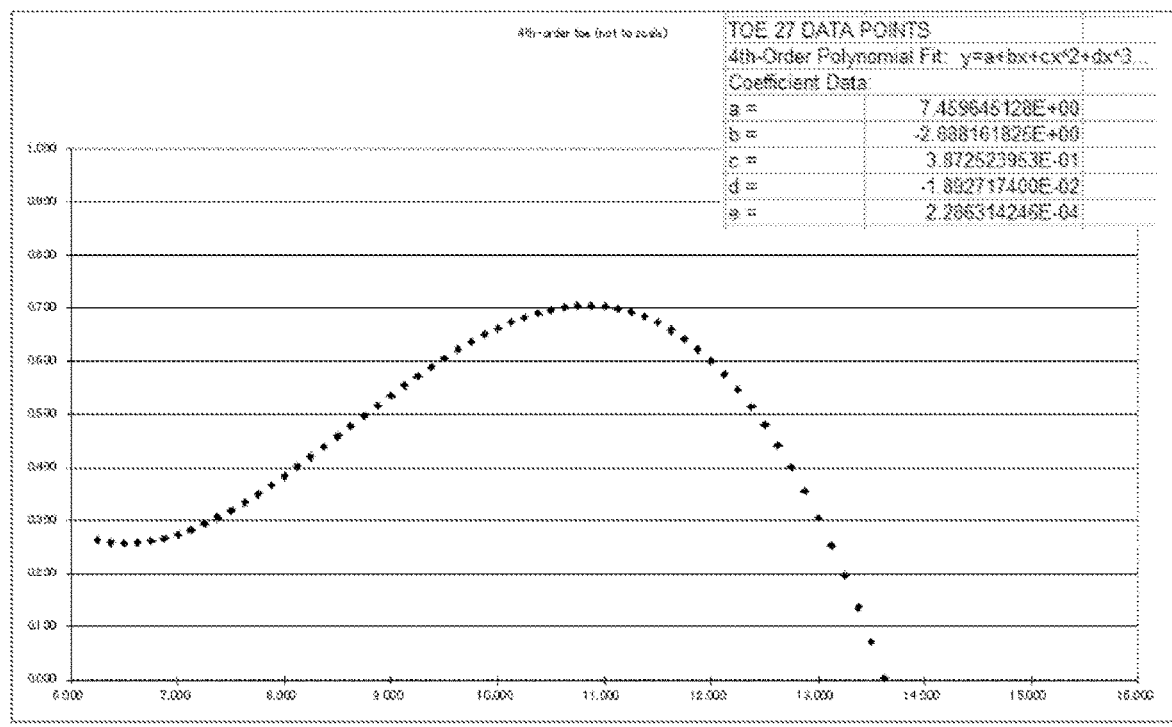

FIGS. 15A and 15B show a working example in which top surface 136 of curved pedal 130 has a varying 4th-order polynomial profile within actuatable region 135 in length direction 132, the combined portion comprising first convexity 140 and first concavity heel-side half-lobe 154 having a 4th-order polynomial profile as shown in FIG. 15A, and the combined portion comprising first concavity toe-side half-lobe 154 and second convexity 160 having a 4th-order polynomial profile as shown in FIG. 15B. The 4th-order polynomial profiles shown in FIGS. 15A and 15B were derived by curvefitting 4th-order polynomial functions to data measured from a prototype constructed by the inventor. More specifically, the curvature profile shown in FIG. 15A is a graph of the equation $y=a+bx+cx^2+dx^3+ex^4$, where coefficients a through e are: a=2.758305230E-01; b=7.484228120E-01; c=-3.307662679E-01; d=5.000334014E-02; and e=-2.605492952E-03. Likewise, the curvature profile shown in FIG. 15B is a graph of the equation $y=a+bx+cx^2+dx^3+ex^4$, where coefficients a through e are: a=7.459645128E+00; b=-2.888161825E+00; c=3.872523953E-01; d=-1.892717400E-02; and e=2.286314246E-04.

Based on the measured values for the curvature profiles shown in the working examples at FIGS. 11 through 15B, it is calculated that slope at the top surface of the curved pedal relative to the pedal reference plane varies smoothly through an angle of on the order of ±5° in going from the central concavity extremum 151 to the heel-side inflection point 145 or in going from the central concavity extremum 151 to the toe-side inflection point 165. That is, at the working examples shown in FIGS. 11 through 15B, it is calculated that slope at the top surface of the curved pedal relative to the pedal reference plane varies smoothly through an angle of on the order of 10° in going from the heel-side inflection point 145 to the toe-side inflection point 165. Based on testing carried out with working examples of varying contour by the inventor, it is preferred that slope at the top surface of the curved pedal relative to the pedal reference plane vary smoothly through an angle of at least 2.5°, more preferably at least 5°, even more preferably at least 7.5°, and most preferably at least 10°, within at least a portion of the actuatable region or within substantially the entire actuatable region.

Note that the present invention is not limited to the working examples described with reference to FIGS. 11 through 15, these merely being exemplary profiles within the ranges of the various parameters—e.g., wavelength, amplitude, interpeak distance and/or distance between extrema, extrema amplitude and/or height as measured from pedal reference plane 131, and radii of curvature—as claimed and/or as described elsewhere in this specification.

Note further that although working examples shown in FIGS. 12 through 15 employ different or asymmetric amplitudes or gains at first convexity 140 and second convexity 160, while the working example shown in FIG. 11 and in the embodiments described with reference to FIGS. 3 through 10 generally employed symmetric amplitudes or gains at first convexity 140 and second convexity 160, there is in general no objection to employment of symmetric or asymmetric amplitudes or gains and/or symmetric or asymmetric values for any of the various other parameters at first convexity 140, first concavity 150, and second convexity 160 within the ranges of the various parameters—e.g., wavelength, amplitude, interpeak distance and/or distance between extrema, extrema amplitude and/or height as measured from pedal reference plane 131, and radii of curvature—as claimed and/or as described elsewhere in this specification.

Figure 19:
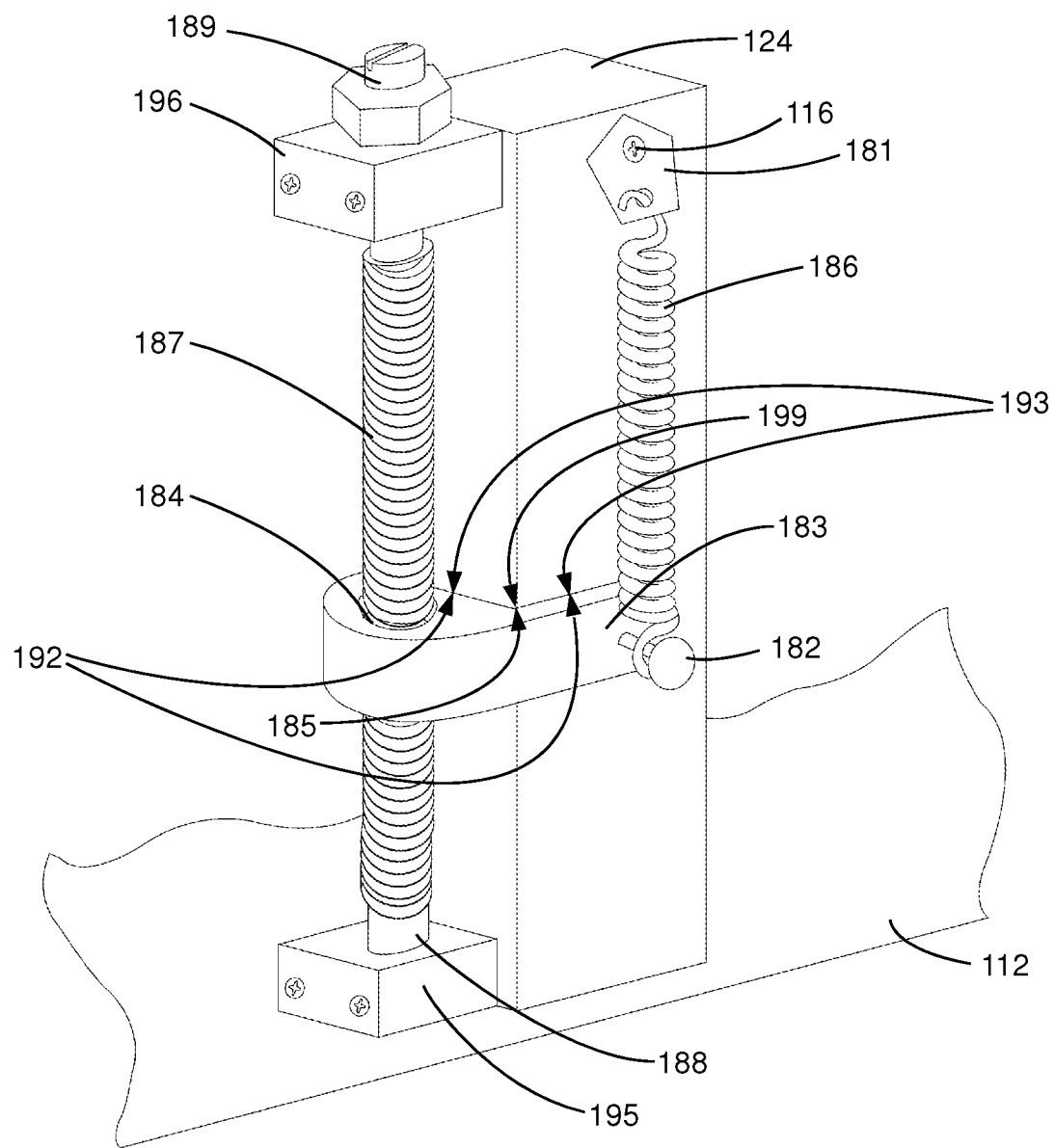
FIGS. 19 through 21 show in schematic fashion a first embodiment of a pedal return spring tensioner mechanism 180a that may be employed in place of the inline wingnut tensioner mechanism 125 of pedal assembly 110 shown in FIGS. 2 and 3, FIG. 19 showing an upper-right-front perspective view thereof, FIG. 20 showing a right side view thereof, and FIG. 21 showing a front view thereof.
Figure 20:
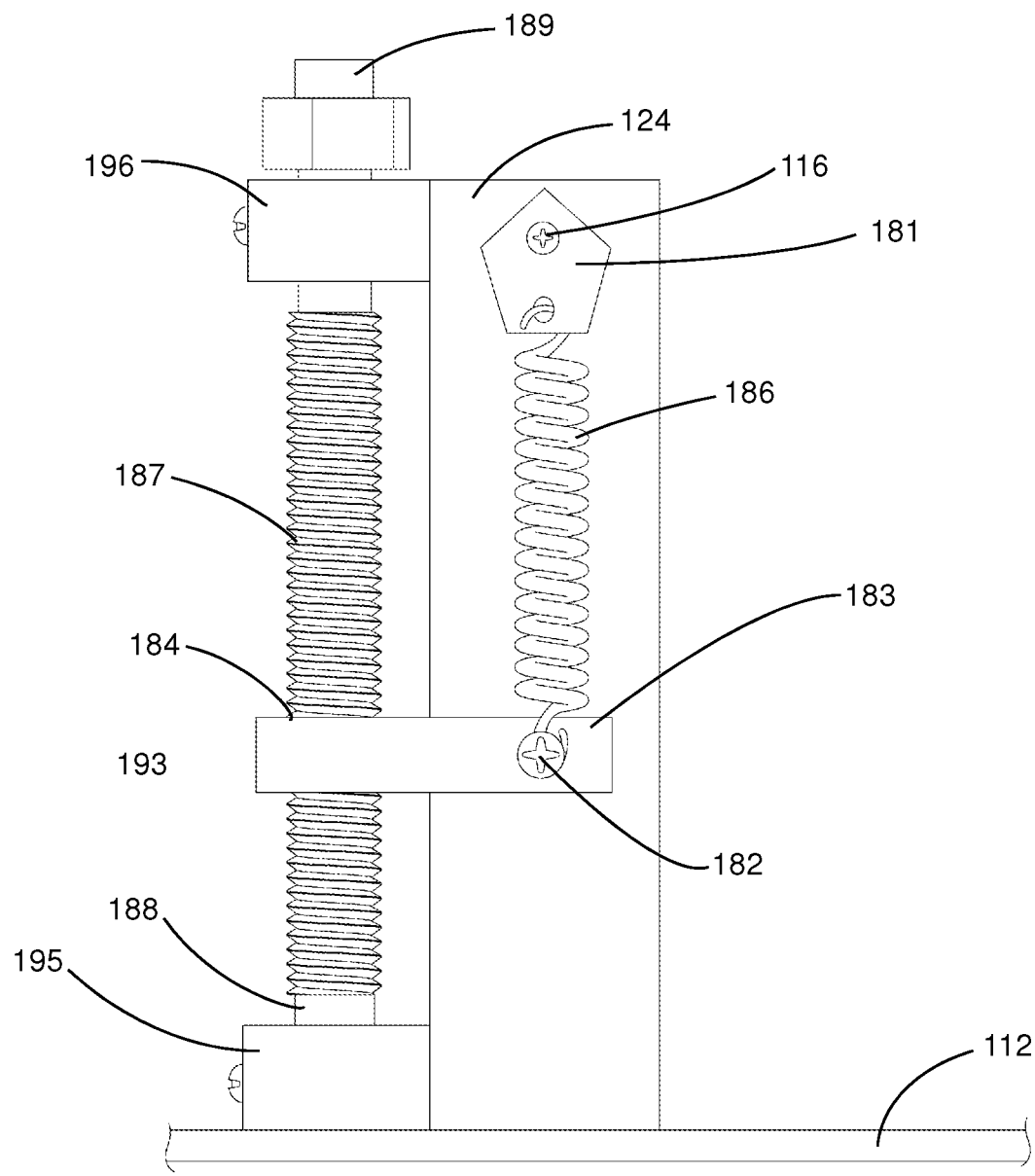
Figure 21:
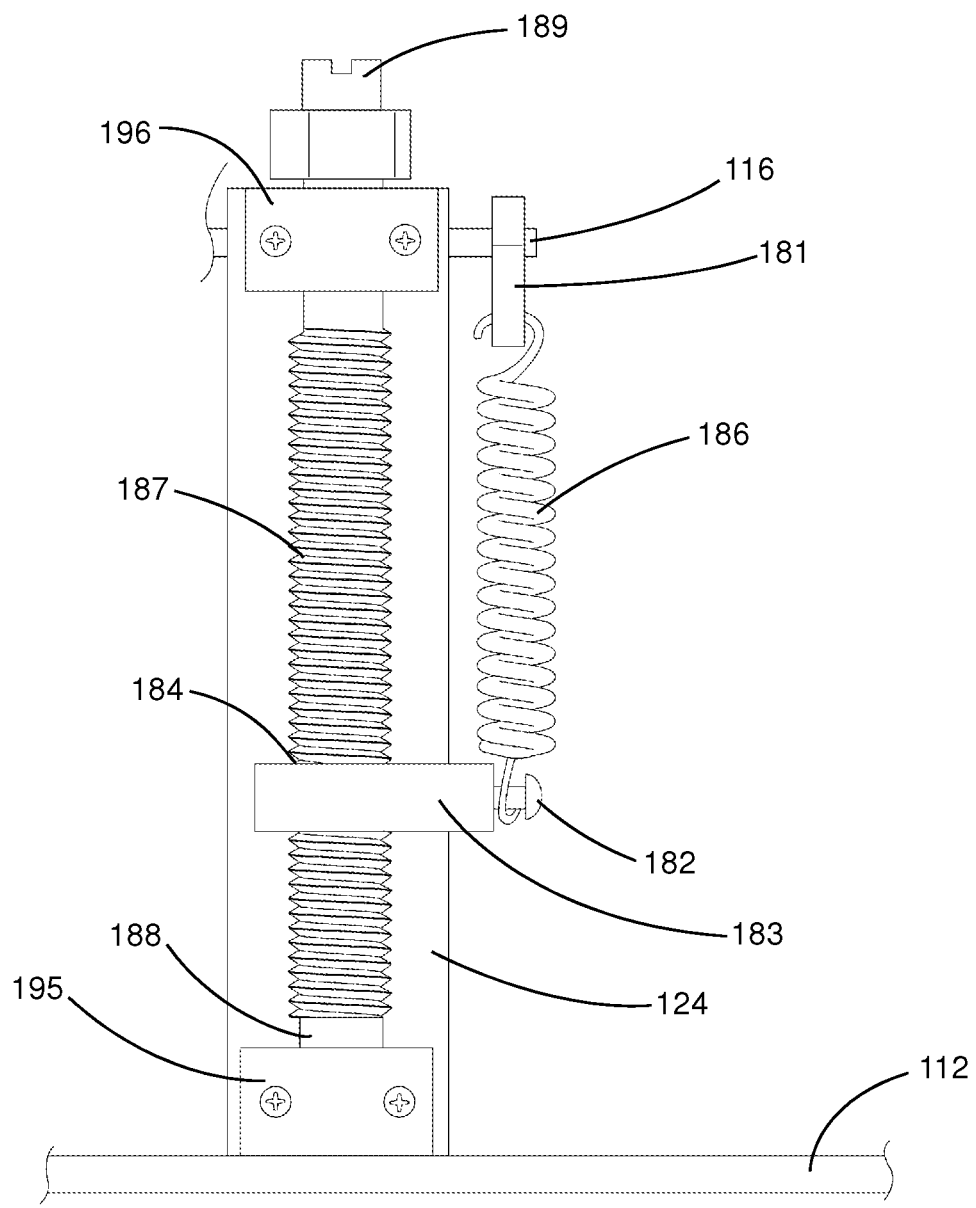

Referring now to FIGS. 19, 20, and 21, these are respectively an upper-right-front perspective view, a right side view, and a front view of a first embodiment of a pedal return spring tensioner mechanism 180a that may be employed in place of the inline wingnut tensioner mechanism 125 of pedal assembly 110 shown in FIGS. 2 and 3. Construction being similar in other respects to that of pedal assembly 110 shown in FIGS. 2 and 3, description here will be limited to those aspects of tensioner mechanism 180a that differ from inline wingnut tensioner mechanism 125 shown in FIGS. 2 and 3, with like reference numerals being used to designate corresponding parts throughout the several views.

At tensioner mechanism 180a shown in FIGS. 19 through 21, the upper end of pedal return spring 186 is engaged with a hole in swivel arm 181 in similar fashion as is the case with pedal return spring 126 and swivel arm 121 described above with reference to FIGS. 2 and 3, but at tensioner mechanism 180a shown in FIGS. 19 through 21 the lower end of pedal return spring 186 engages with lower spring mount 182, lower spring mount 182 being for example a pin or screw that is threadedly engaged with or otherwise secured to bracket 183 in which lead nut 184 is embedded or otherwise formed. Lead nut 184 is threadedly engaged with lead screw 187, such that turning of top end 189 of lead screw 187 at a time when the tension of return spring 186 is to be adjusted causes lead nut 184 to ride up or down, depending on the direction in which top end 189 of lead screw 187 is turned, along lead screw 187, this vertical motion of lead nut 184 causing contraction or elongation of return spring 186 due to the mechanical linkage between the lower end of return spring 186 and lead screw 187 that is afforded by the combination of lower spring mount 182, bracket 183, and lead nut 184.

Note that whereas lower spring mount 182, bracket 183, and lead nut 184 have been described by way of an example in which these are separate parts, there is no objection to use of a single integral part that serves the functions of all or any partial combination of lower spring mount 182, bracket 183, and lead nut 184.

At tensioner mechanism 180a shown in FIGS. 19 through 21, pedal return spring 186 is preferably arranged in parallel but offset, i.e., not inline or coaxial, fashion with respect to lead screw 187. Where this is the case, lead screw 187 will similarly be arranged in parallel but offset, i.e., not inline or coaxial, fashion with respect to pedal return spring 186. That is, the axes of pedal return spring 186 and lead screw 187 are preferably mutually parallel, being arranged in offset fashion such that the distance therebetween is at least sufficient to prevent mutual interference between the envelope of pedal return spring 186 and the envelope of lead screw 187. For example, where the outside diameter of lead screw 187 is on the order of 0.25 inch and the outside diameter of pedal return spring 186 is on the order of 0.50 inch, interaxial distance is preferably not less than 0.375 inch, more preferably not less than 0.5 inch, and most preferably 1.5 inches±0.5 inch.

Furthermore, pedal return spring 186 and lead screw 187 are each preferably vertically oriented so that they are more or less perpendicular to baseboard 112. In a preferred embodiment, the axes of support posts 124 are perpendicular to baseboard 112 to which posts 124 are rigidly secured, and pedal return spring 186 and lead screw 187 are each arranged relative to the same one of the posts 124, e.g., the right post 124 at pedal assembly 110 shown in FIGS. 2 and 3, in such fashion that pedal return spring 186 and lead screw 187 each extend vertically, the vertical direction being the height direction of post 124 when post 124 is installed perpendicularly with respect to baseboard 112. This being the case, pedal return spring 186, lead screw 187, and post 124 will preferably be mutually parallel, which is to say that their axes will preferably be mutually parallel.

Where it is said that in the context of the present invention that features are mutually parallel, this should be understood to include allowance for assembly tolerances and design variation; if the orientations of such features are within an angle of 30° from each other, this should be understood to be mutually parallel within the meaning of the present specification. And where it is said in the context of the present invention that features are vertically oriented, this should similarly be understood to mean that the axis or axes thereof are within an angle of 30° from a line drawn perpendicular to baseboard 112.

Note that whereas top end 189 of lead screw 187 at tensioner mechanism 180a shown in FIGS. 19 through 21 is depicted as terminating in a nut and as having a slot suitable for turning by a screwdriver, this slot and terminating nut are provided merely to facilitate turning of top end 189 of lead screw 187 at a time when tension of return spring 186 is to be adjusted, and should not be taken to indicate that top end 189 of lead screw 187 is rigidly secured to upper support means 196 in a manner that would prevent rotation of lead screw 187, the small gap between the bottom of this terminating nut and the top of upper support means 196 visible in FIG. 20 being intended to indicate absence of such rigid connection therebetween and lack of interference with rotation of lead screw 187 about its axis, consistent with description below where it is described that lower support means 195 and upper support means 196 are such as to allow rotation of lead screw 187 about its axis.

Note moreover that whereas a locknut or other such locking means for holding lead nut 184 in place on lead screw 187 in such fashion as to prevent slippage following adjustment of the tension of return spring 186 is not shown at tensioner mechanism 180a in FIGS. 19 through 21, there is no particular objection to use of such a locknut or other locking means in some embodiments.

However, in a preferred embodiment, no such locknut or other locking means is employed, lead screw 187 and the parts with which lead screw 187 mechanically interacts being instead designed so as to produce a mechanical system of low enough efficiency to prevent backdriving of lead screw 187 under the load of return spring 186 during normal operation. That is, in an embodiment in which a locknut or other such locking means for holding lead nut 184 in place on lead screw 187 is not employed, it is preferred that the lead screw system be self-locking, i.e., that backdriving of lead screw 187 by the load from return spring 186 not occur.

Stated another way, it is preferred in some embodiments that efficiency of the lead screw system—including the mechanical advantage due to the lead angle of the threads at lead screw 187 and lead nut 184; drag between lead screw 187 and lead nut 184; drag between support means 195, 196 and lead screw ends 188, 189; and/or drag produced by contact between lead nut bracket surfaces 193, 199 and post surfaces 185, 192 in embodiments in which such contact occurs—be low enough to prevent backdriving of lead screw 187 under the load of return spring 186. In such an embodiment, efficiency of the lead screw system is preferably not greater than 50%, more preferably not greater than 40%, and most preferably not greater than 30%.

One factor contributing to drag at the foregoing locations is the choice of materials employed where parts make contact and produce friction during turning of lead screw 187. One aspect of controlling efficiency to produce a self-locking lead screw 187 in such an embodiment is therefore appropriate choice of materials such as will produce suitably high friction therebetween. For example, metal-to-metal contact will generally tend to produce higher drag than metal-to-plastic or plastic-to-plastic contact. This being the case, while there is no particular objection to use of plastic parts, use of metals parts at lead screw 187 and the parts that make contact with lead screw 187 when lead screw 187 is turned may be preferred in some embodiments.

In one embodiment, such efficiency as will prevent backdriving under the load of return spring 186 may be attained through control of the efficiency of the mechanical system comprising the lead screw 187 and the lead nut 184. For example, in one embodiment, suitably low efficiency of the mechanical system comprising the lead screw 187 and the lead nut 184 might be achieved through employment of threads preferably having a lead angle not greater than on the order of 5° at lead screw 187 and lead nut 184, this more preferably being not greater than on the order of 4°, and most preferably being not greater than on the order of 3°. As another example, suitably low efficiency of the mechanical system comprising the lead screw 187 and the lead nut 184 might be achieved by causing lead screw 187 and lead nut 184 to employ threads preferably having a lead not greater than on the order of 33% of the diameter of lead screw 187, this more preferably being not greater than on the order of 25% of the diameter of lead screw 187, and most preferably being not greater than on the order of 15% of the diameter of lead screw 187.

While there is no particular limitation with regard to the type of threads employed at lead screw 187 and lead nut 184, it being possible, for example, to employ v-threads, square threads, acme threads, buttress threads, or the like thereat, employment of acme threads is preferred in one embodiment. For example, the present inventor has demonstrated satisfactory performance in terms of self-locking capability in the context of prototypes fabricated after the fashion of tensioner mechanism 180a shown in FIGS. 19 through 21, tensioner mechanism 180b shown in FIGS. 22 through 24, and tensioner mechanism 190 shown in FIG. 28 where lead screw 187 and lead nut 184 were made of steel of 5/16-inch diameter that employed single-start acme threads having a thread pitch corresponding to 14 threads per inch. Note that these prototypes employed no ball bearings or the like at support means 195, 196, the bearing surfaces at each end

188, 189 of lead screw 187 comprising a steel collar of ⁹⁄₁₆-inch diameter attached by means of a set screw to the lead screw end 188, 189, this collar bearing directly on a flat aluminum surface rigidly attached to post 124, the only preload therebetween being that exerted thereon due to the tension from return spring 186 during normal operation.

In some embodiments, a ballscrew may be employed in place of lead screw 187; where this is the case, because efficiency of a ballscrew will in general be higher than that of the equivalent lead screw, it is preferred that a locknut or the like be employed; or if no locknut is employed, that drag at the ballscrew nut be increased through employment of an appropriately preloaded nut; or if a preloaded ballscrew nut is not employed or drag at the nut is otherwise insufficient to prevent backdriving, that drag at locations other than the nut be made high enough to prevent backdriving of the ballscrew under the load of return spring 186 during normal operation. Because embodiments of the present invention can therefore be applied to situations in which a ballscrew is employed in place of lead screw 187, where the present invention is described in terms of embodiments employing a lead screw 187 and a lead nut 184 it should be understood that a ballscrew and ballscrew nut may be employed in place of the lead screw 187 and the lead nut 184.

Whether in the context of a ballscrew or in the context of a lead screw 187, drag at the nut 184 may be increased through use of an appropriate preload acting thereon, which will also have the advantage of reducing backlash. One technique that may in some embodiments be employed to increase the preload acting on nut 184 is to increase the length of the lever arm from lower spring mount 182 to the axis of lead screw 187, i.e., the interaxial distance between the axis of return spring 186 and the axis of lead screw 187.

Whether in the context of a ballscrew or in the context of a lead screw 187, although there is no particular objection to employment of ball bearings, roller bearings, or the like at support means 195, 196, drag between support means 195, 196 and ballscrew ends 188, 189 might be increased, for example, by causing there to be direct contact between bearing surfaces at support means 195, 196 and screw ends 188, 189 without employment of such ball bearings, roller bearings, or the like and/or through appropriate choice of materials such as will produce suitably high friction therebetween. Furthermore, preload, i.e., preload above and beyond that preload which may exist between support means 195, 196 and screw ends 188, 189 in some embodiments due to the load from return spring 186 during normal operation, may be applied to the bearing surfaces at support means 195, 196 and screw ends 188, 189 to increase friction therebetween.

Whether in the context of a ballscrew or in the context of a lead screw 187, drag produced by contact between bracket surfaces 193, 199 and post surfaces 185, 192 might be employed to lower efficiency of the lead screw (or ballscrew) system so as to prevent backdriving, this being described in further detail below in the context of embodiments in which there is sliding engagement between bracket surface(s) 193, 199 and post surface(s) 185, 192.

That is, in one embodiment, there may be gap(s) between bracket surfaces 193, 199 and post surfaces 185, 192 such that bracket surfaces 193, 199 normally do not contact post surfaces 185, 192 except, in some embodiments, when acting as stopper(s) at a time when bracket 183 is carried by friction between nut 184 and screw 187 when the top end 189 of screw 187 is turned to adjust the tension of return spring 186. Where this is the case, contact between bracket surfaces 193, 193 and post surfaces 185, 192 being at other times undesirable in such an embodiment, gap(s) may advantageously be employed to prevent interference, and/or create clearance, between bracket 183 and post 124. For example, in one such embodiment, as bracket 183 pivots about lead screw 187 as a result of being carried by friction between nut 184 and screw 187 when the top end 189 of screw 187 is turned, it may only, for example, be the post-facing surfaces at the far ends of the bracket 183, i.e., the post-facing surface at the end of bracket 183 which is near lower spring mount 182 and the post-facing surface at the end of bracket 183 which is farthest from lower spring mount 182, that come in contact with post 124 to stop such undesirable rotation of nut 184 and bracket 183 about lead screw 187, there being no objection to presence of gap(s) of arbitrary size at other location(s) between bracket 183 and post 124. Furthermore, as such stopper action in such an embodiment need only occur as sufficient to prevent excessive pivoting of bracket 183 about the axis of lead screw 187, there is no need for even the ends of bracket 183 to at other times come in contact with post 124, it being possible for there to be even considerable clearance. e.g., on the order of up to as much as 0.25 inch or more, at all locations between bracket surfaces 193, 199 and post surfaces 185, 192.

It should be noted, however, that some small tendency for bracket 183 to be carried by friction as top end 189 of lead screw 187 is turned is not necessarily problematic, since such phenomenon will only occur during adjustment and since in such a situation it may be considered acceptable for the operator to suppress such tendency by applying finger pressure or the like to lower spring mount 182 to prevent it from moving too far from post 124 and stretching return spring 186 in awkward and undesirable fashion.

Figure 22:
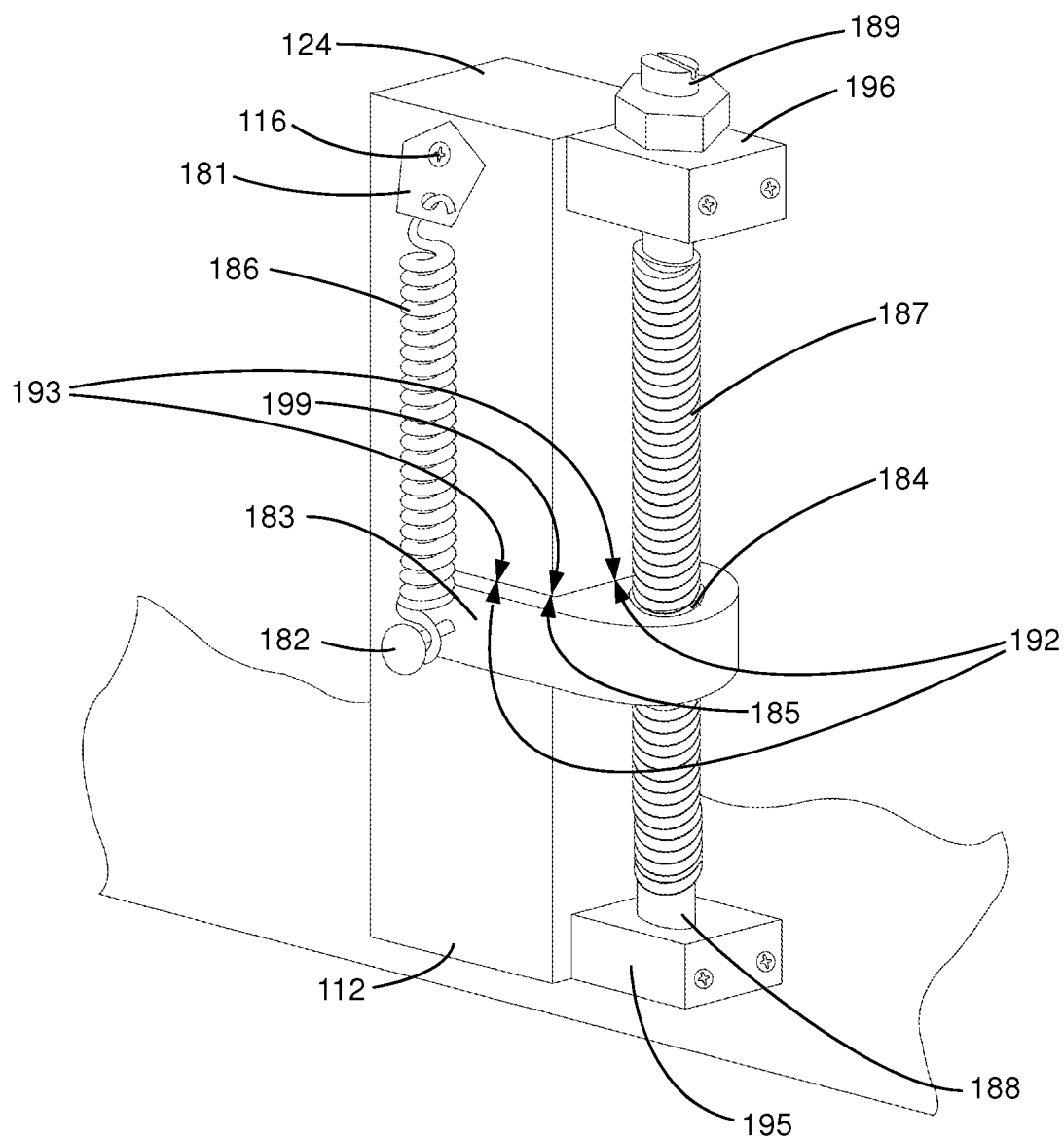
FIGS. 22 through 24 show in schematic fashion a second embodiment of a pedal return spring tensioner mechanism 180b that may be employed in place of the inline wingnut tensioner mechanism 125 of pedal assembly 110 shown in FIGS. 2 and 3, FIG. 22 showing an upper-right-back perspective view thereof, FIG. 23 showing a right side view thereof, and FIG. 24 showing a back view thereof.
Figure 23:
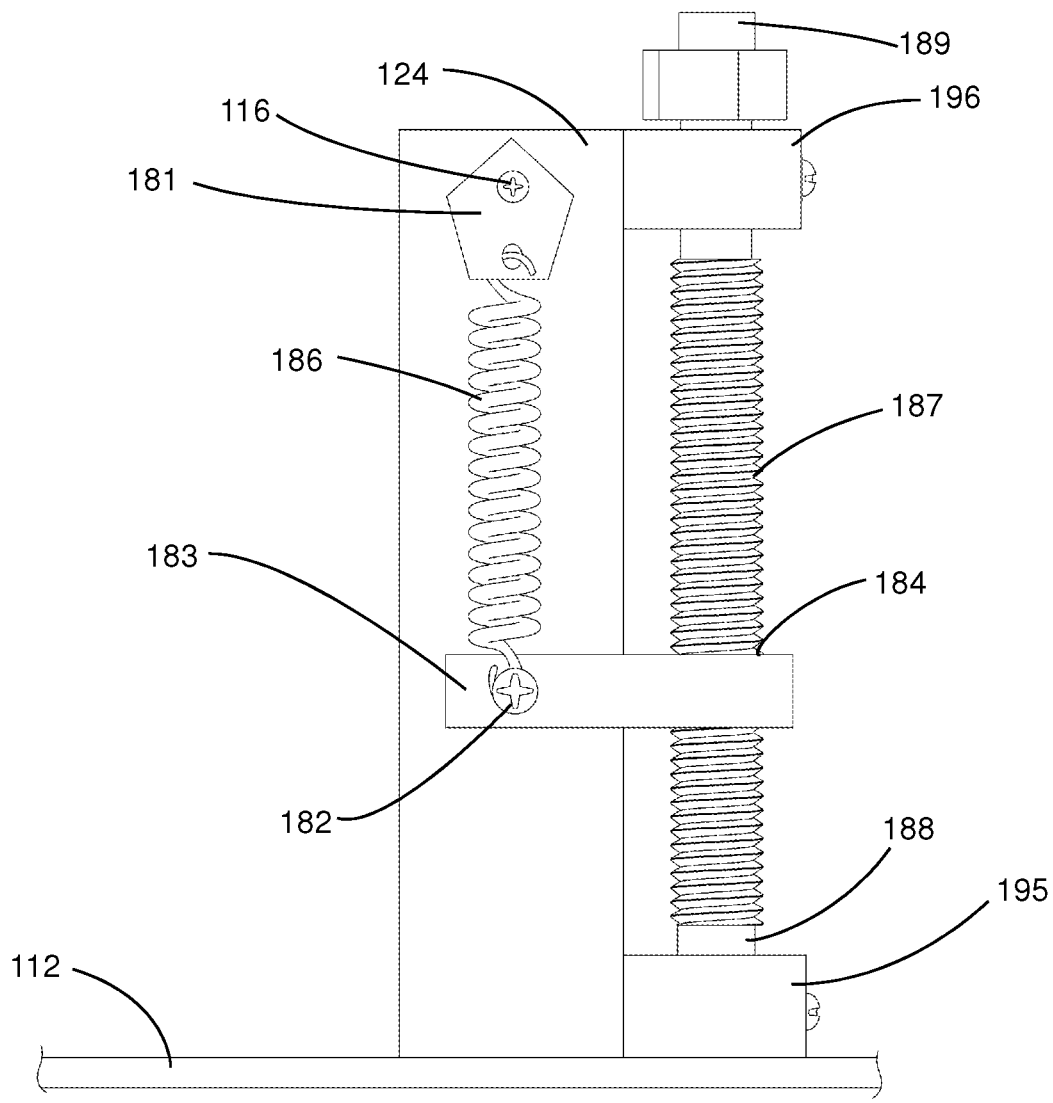
Figure 24:
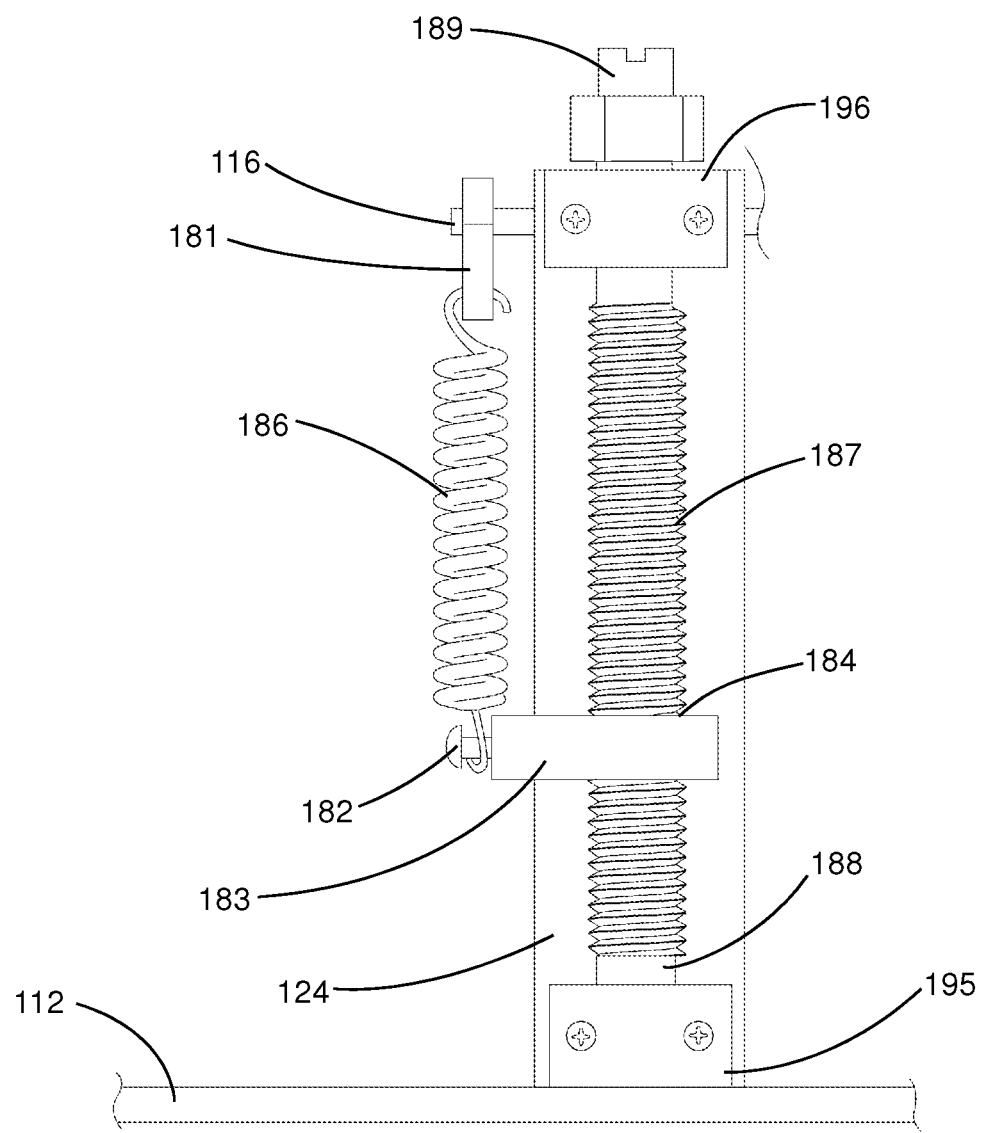
Figure 28:
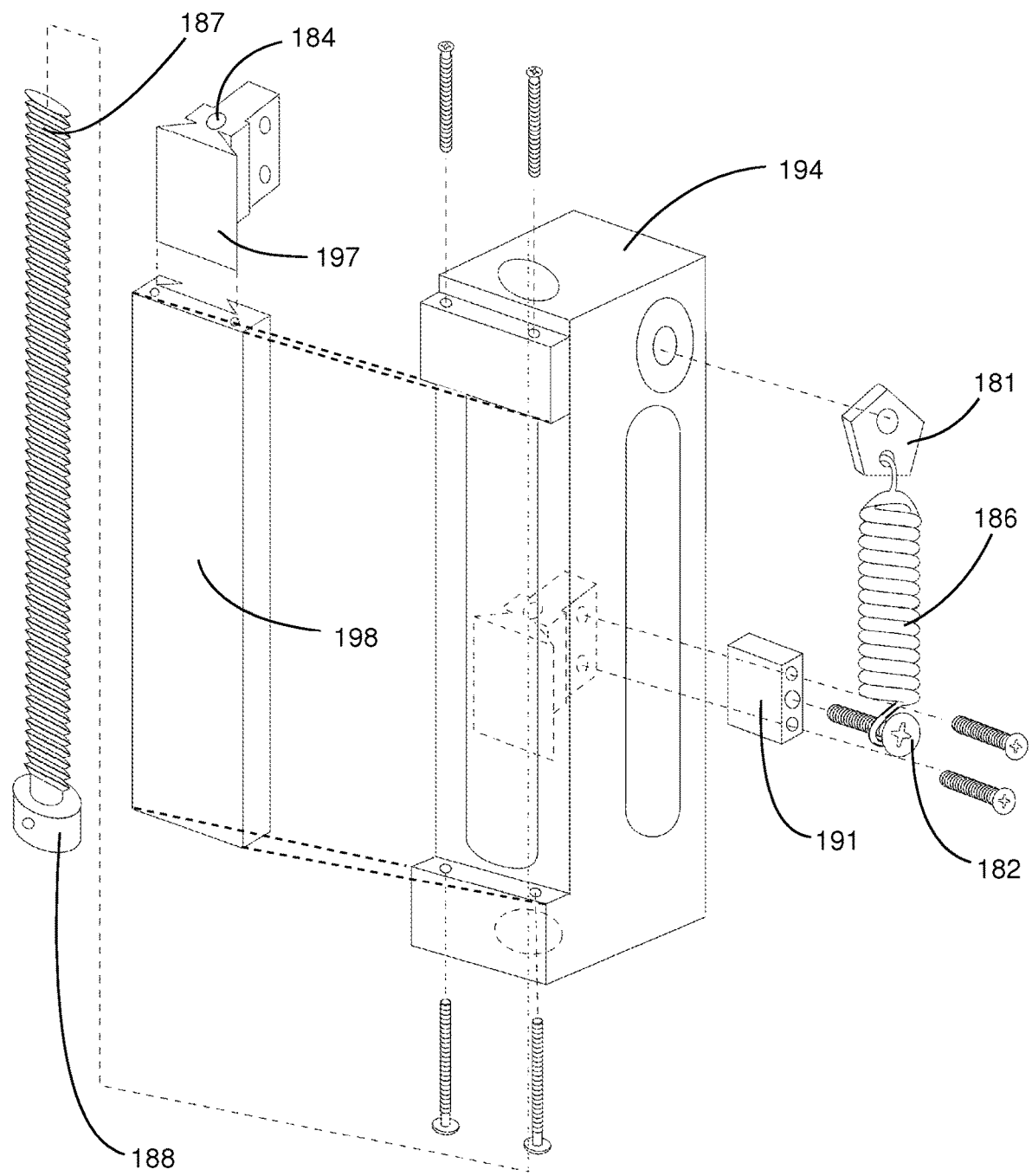
FIG. 28 shows in schematic fashion an exploded view of a fourth embodiment of a pedal return spring tensioner mechanism 190 that may be employed in place of the inline wingnut tensioner mechanism 125 of pedal assembly 110 shown in FIGS. 2 and 3.

In this regard, in a preferred embodiment, depending on whether return spring 186 and lead screw 187 are arranged at right post 124 as shown in the embodiments at FIGS. 19 through 28 or at left post 124, and depending on whether lead screw 187 is arranged at the front of post 124 as in tensioner mechanism 180*a* shown in FIGS. 19 through 21 and tensioner mechanism 190 shown in FIG. 28 or lead screw 187 is arranged at the back of post 124 as in tensioner mechanism 180*b* shown in FIGS. 22 through 24, employment of reverse threading at lead screw 187 and lead nut 184 may, by causing bracket 183 to be carried by such friction in the direction that tends to cause lower spring mount 182 to be pressed against the face of post 124 when lead screw 187 is turned in the direction that tends to cause the greater load and thus the greater friction to be produced between lead nut 184 and lead screw 187, i.e., presumably the direction that would cause elongation rather than contraction of return spring 186, help prevent turning of bracket 183 about the axis of lead screw 187 in such fashion as would cause lower spring mount 182 to move away from the face of post 124 and carry the lower end of return spring 186 with it in awkward and undesirable fashion. Stated differently, it is preferred in one embodiment that the choice of threading direction, i.e., whether forward threading or reverse threading is employed, at lead screw 187 be such as will produce a general reduction in the tendency for lower spring mount 182 to be carried by friction in a direction causing it to move away from the face of post 124.

But where such tendency for bracket 183 to be carried by friction is considered problematic, besides employment of stopper(s) as described above, there would be no objection to employment of means such as a groove, slot, rod, bar, track, frame, and/or the like to limit such movement. For example, in one embodiment, the end of bracket 183 that extends past lower spring mount 182, i.e., the end of bracket 183 at the right side of the drawing in FIG. 20 or the end of bracket 183 at the left side of the drawing in FIG. 23, might be extended sufficiently so as not to interfere with the envelope of return spring 186 during operation of pedal assembly 110, and this extended end of bracket 183 might be made to ride in a vertical track, groove, frame, or the like which may be attached to or formed on the surface of post 124 so as to prevent bracket 183 from being carried too far from post 124 as a result of friction between lead nut 184 and lead screw 187 when top end 189 of lead screw 187 is turned.

But in a preferred embodiment, as lead nut 184 is made to ride up and down along lead screw 187, flat surface(s) of inner face(s) 193 of bracket 183 may be made to slidingly engage with flat surface(s) of outer face(s) 192 of post 124, sliding contact of such flat(s) of bracket 183 with such flat(s) of post 124 not only counteracting the tendency of bracket 183 to rotate about the axis of lead screw 187 as bracket 183 is carried by the friction between lead nut 184 and lead screw 187 when top end 189 of lead screw 187 is turned at a time when the tension of return spring 186 is to be adjusted but also preferably guiding and facilitating smooth, repeatable, and precise movement of bracket 183 in accompaniment to turning of lead screw 187.

For example, at tensioner mechanism 180a shown in FIGS. 19 through 21, where right post 124 is for example of rectangular cross-section, post 124 may have at least one first planar face 192 that is substantially perpendicular to the axis of rocker axle 116, and may have at least one second planar face 192 that is substantially perpendicular to the first planar face 192. This being the case, in the embodiment shown in FIGS. 19 through 21, each of these planar faces 192, 192 of right post 124 will be vertically oriented and will be parallel to a plane containing the axis of return spring 186 and will be parallel to a plane containing the axis of lead screw 187.

Similarly, where post 124 is for example of rectangular cross-section as at tensioner mechanism 180a shown in FIGS. 19 through 21, bracket 183 may have at least one first planar face 193 that is likewise substantially perpendicular to the axis of rocker axle 116, and may have at least one second planar face 193 that is likewise substantially perpendicular to the first planar face 193. This being the case, in the embodiment shown in FIGS. 19 through 21, each of these planar faces 193, 193 of bracket 183 will likewise be vertically oriented and will likewise be parallel to a plane containing the axis of return spring 186 and will likewise be parallel to a plane containing the axis of lead screw 187.

This being the case, at tensioner mechanism 180a shown in FIGS. 19 through 21, planar inner faces 193, 193 of bracket 183 may be made to slidingly engage with planar outer faces 192, 192 of post 124, guiding movement of lead nut 184 as it is made to ride up and down along lead screw 187 at a time when top end 189 of screw 187 is turned to adjust the tension of return spring 186.

And in a preferred embodiment, two planar faces 192, 192 of right post 124 may meet to form an outside corner 185 that is likewise vertically oriented, the locus of outside corner 185 being a vertical line segment that is parallel to the axis of pedal return spring 186 and lead screw 187, and that is perpendicular to baseboard 112. Where this is the case, outside corner 185 will constitute a dihedral angle formed by the intersection of two planar faces 192, 192 of post 124.

Similarly, in such a preferred embodiment, two planar faces 193, 193 of bracket 183 may meet to form an inside corner 199 that is likewise vertically oriented, the locus of inside corner 199 being a vertical line segment that is parallel to the axis of pedal return spring 186 and lead screw 187, and that is perpendicular to baseboard 112. Where this is the case, inside corner 199 will constitute a dihedral angle formed by the intersection of two planar faces 193, 193 of bracket 183.

This being the case, at tensioner mechanism 180a shown in FIGS. 19 through 21, sliding engagement of inside corner 199 of bracket 183 with outside corner 185 of post 124 may in some embodiments further assist in locating and guiding bracket 183 relative to post 124 as bracket 183 is made to ride up and down lead screw 187 at a time when the tension of return spring 186 is being adjusted.

In an embodiment in which there is sliding engagement between bracket surface(s) 193, 199 and post surface(s) 185, 192, drag produced by contact between bracket surface(s) 193, 199 and post surface(s) 185, 192 may be employed to lower efficiency, suppress backdriving, and/or promote self-locking of the lead screw system. In such an embodiment, bracket surface(s) 193, 199 and/or post surface(s) 185, 192 may be coated with an appropriate material, or a tape of appropriate material may be applied to bracket surface(s) 193, 199 and/or post surface(s) 185, 192 to control the coefficient of friction therebetween. For example, a material of suitable lubricity and wear resistance, e.g., polytetrafluoroethylene or other such fluorinated resin, polyolefin, or other such suitable material, may be used as coating or tape where bracket surface(s) 193, 199 come in contact with post surface(s) 185, 192. For creation of a suitable normal force between bracket surface(s) 193, 199 and post surface(s) 185, 192 at such time, it is preferred in such an embodiment that there be at least one location along bracket surface(s) 193, 199 and post surface(s) 185, 192 at which where there is not a gap or clearance but there is instead interference therebetween. And to appropriately control the magnitude of this normal force in such an embodiment, it is preferred in light of variation in the magnitude of this interference due to design tolerances, wear, and so forth that an appropriately compliant material, i.e., a material of suitable resilience such as a foamed rubber or synthetic resin or the like, also be employed, e.g., as backing for a tape or similar laminated material that may be applied to such mutually contacting bracket surface(s) 193, 199 and post surface(s) 185, 192. By inserting such a compliant member into the lead screw system, not only will it be possible to appropriately lower efficiency of the lead screw system as a result of drag produced by contact between bracket surfaces 193, 199 and post surfaces 185, 192, but as the restoring force produced by the resiliency of this compliant member will exert a small preload on the mechanical system comprising the lead screw 187 and the lead nut 184, this will reduce backlash and contribute to the smooth and precise operation of lead screw 187.

In a preferred embodiment, post 124 is stationary, being rigidly secured to baseboard 112, and to the extent that lead screw 187 is secured in stable and stationary—i.e., except for ability to rotate about its axis so as to be capable of functioning as a lead screw—fashion to post 124, this will facilitate the precise and smooth adjustment of the tension of pedal return spring 186 when top end 189 of lead screw 187 is turned.

Furthermore, in a preferred embodiment, lead screw 187 extends for substantially the full height of post 124, bottom end 188 of lead screw 187 being supported at or near the bottom of post 124 and top end 189 of lead screw 187 being supported at or near the top of post 124. Where it is said that lead screw 187 extends for substantially the full height of post 124, this is to allow for some difference in height therebetween such as will prevent protrusion of lead screw 187 in awkward and interfering fashion when lead screw 187 is in front of post 124 as at tensioner mechanism 180a shown in FIGS. 19 through 21, or such as will facilitate access to lead screw 187 when lead screw 187 is behind post 124 as at tensioner mechanism 180b shown in FIGS. 22 through 24.

For example, lower support means 195 for lead screw bottom end 188 and/or upper support means 196 for lead screw top end 189, which are respectively secured by means of screws or other fasteners at or near the bottom end and the top end of post 124 in the embodiment shown in FIGS. 19 through 21, may in one embodiment be bearing(s) that allow rotation of lead screw 187 about its axis but substantially prevent translational motion along the axis of lead screw 187, substantially prevent translational motion in directions perpendicular to the axis of lead screw 187, and substantially prevent rotation about axes other than the axis of lead screw 187. Specifically, with respect to end fixity, any suitable combination of simple (or floating) and/or fixed support, e.g., simple-simple, fixed-fixed, simple-fixed, or fixed-simple, may be employed at support means 195, 196 for lead screw ends 188, 189. Furthermore, there is no particular objection to an embodiment in which one of the lead screw ends 188, 189 is free, i.e., unsupported.

In another embodiment, lower support means 195 and/or upper support means 196 in the first embodiment shown at FIGS. 19 through 21 might be simple boxlike cage(s) within which lead screw end(s) 188, 189 are captured in such fashion as to allow lead screw 187 to rotate about its axis but substantially prevent lead screw 187 from engaging in translational motion along its axis.

For example, in such an embodiment, axial locating feature(s) may be employed at lead screw end(s) 188, 189 such that support means 195, 196 may support lead screw end(s) 188, 189 without use of intervening bearing(s) so that lead screw end(s) 188, 189 bear directly on stationary support means 195, 196 when top end 189 of lead screw 187 is turned at a time when the tension of return spring 186 is to be adjusted.

Note that an example of such bearing-less support, at which a squat cylindrical collar has been attached by means of a set screw, is shown at lead screw bottom end 188 of tensioner mechanism 190 shown in exploded view fashion at FIG. 28. Although not shown at FIG. 28, such a cylindrical collar might similarly be attached toward top end 189 of lead screw 187, and compartments appropriately dimensioned so as to allow rotation of lead screw 187 about the axis of lead screw 187 but substantially prevent translational motion and substantially prevent rotation about other axes, might be formed at the bottom and top ends of post 124, lead screw end(s) 188, 189 being captured therewithin in such fashion as to allow rotation of lead screw 187 about its axis but substantially prevent translational motion and substantially prevent rotation about other axes.

In some embodiments, bearing-less support of lead screw end(s) 188, 189 may be preferred to support by means of bearings, since high drag at friction-generating lead screw end(s) 188, 189 and/or lead nut 184, and thus low efficiency of the overall lead screw 187, will reduce the tendency for lead screw 187 to be backdriven under the load exerted thereon by return spring 186, facilitating ability of tensioner mechanism 180a to be employed as a self-locking tensioner mechanism 180a capable of easy adjustment without the need for a locknut or other such separate locking means. For similar reasons, use of a lead screw 187 may be preferred in some embodiments to use of a ballscrew, use of which in place of lead screw 187 though not shown in the drawings should be considered to be a variation within the scope of the claims except where the claims explicitly recite use of a lead screw.

Referring now to FIGS. 22, 23, and 24, these are respectively an upper-right-back perspective view, a right side view, and a back view of a second embodiment of a pedal return spring tensioner mechanism 180b that may be employed in place of the inline wingnut tensioner mechanism 125 of pedal assembly 110 shown in FIGS. 2 and 3. Construction of tensioner mechanism 180b shown in FIGS. 22 through 24 being similar to that of tensioner mechanism 180a shown in FIGS. 19 through 21, description here will be limited to those aspects of tensioner mechanism 180b shown in FIGS. 22 through 24 that differ from tensioner mechanism 180a shown in FIGS. 19 through 21, with like reference numerals being used to designate corresponding parts throughout the several views.

Whereas lead screw 187 is arranged in front of post 124, and generally in front of return spring 186, at tensioner mechanism 180a shown in FIGS. 19 through 21, lead screw 187 is arranged behind post 124, and generally behind return spring 186, at tensioner mechanism 180b shown in FIGS. 22 through 24. Because, at tensioner mechanism 180b shown in FIGS. 22 through 24, lead screw 187 is behind post 124, i.e., lead screw 187 is arranged at the far side of post 124 as viewed by a drummer seated on the drum throne, to facilitate access by the drummer to top end 189 of lead screw 187 in tensioner mechanism 180b at a time when the tension of return spring 186 is to be adjusted, top end 189 of tensioner mechanism 180b may be extended in an upward direction beyond what is shown in FIGS. 22 through 24. Conversely, because, at tensioner mechanism 180a shown in FIGS. 19 through 21, lead screw 187 is in front of post 124, i.e., lead screw 187 is arranged at the near side of post 124 as viewed by a drummer seated on the drum throne, top end 189 of tensioner mechanism 180a may be shortened so that it does not extend in an upward direction as far as is shown in FIGS. 19 through 21 without interfering with access by the drummer to top end 189 of lead screw 187 in tensioner mechanism 180a at a time when the tension of return spring 186 is to be adjusted.

Figure 25A:
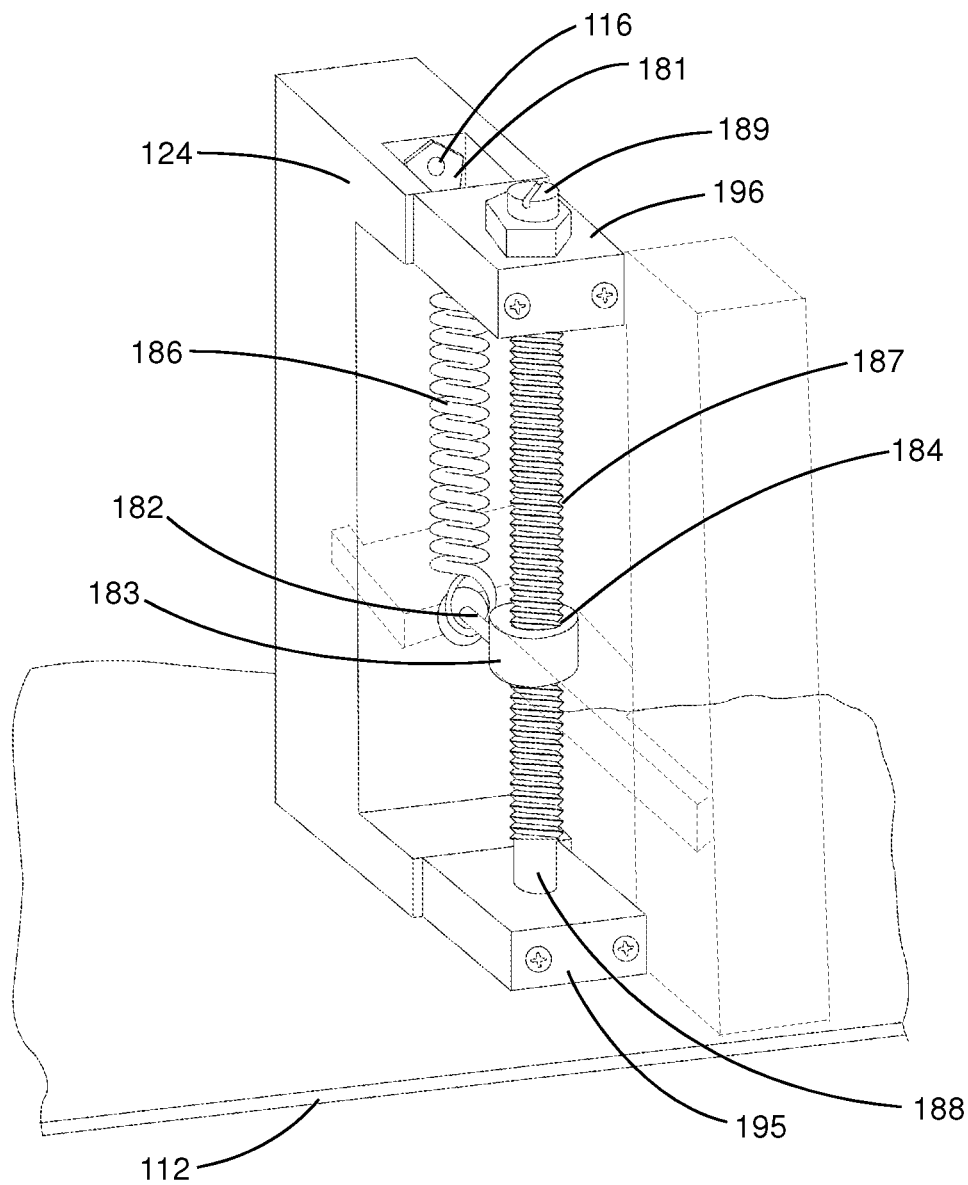
FIGS. 25A through 27 show in schematic fashion a third embodiment of a pedal return spring tensioner mechanism 180c that may be employed in place of the inline wingnut tensioner mechanism 125 of pedal assembly 110 shown in FIGS. 2 and 3, FIGS. 25A and 25B showing an upper-right-front perspective view thereof, FIG. 26 showing a right side view thereof, and FIG. 27 showing a front view thereof, variations being shown in dashed line in FIGS. 25A and 25B, FIG. 25C being a schematic sectional view through the portion containing bracket 183 as seen from above in the variation shown in dashed line in FIG. 25B.

Referring now to FIGS. 25A (or 25B), 26, and 27, these are respectively an upper-right-front perspective view, a right side view, and a front view of a third embodiment of a pedal return spring tensioner mechanism 180c that may be employed in place of the inline wingnut tensioner mechanism 125 of pedal assembly 110 shown in FIGS. 2 and 3. Note that variations are shown in dashed line in FIGS. 25A and 25B, FIG. 25C being a schematic sectional view through the portion containing bracket 183 as seen from above in the variation shown in dashed line in FIG. 25B. Construction of tensioner mechanism 180c shown in FIGS. 25A through 27 being similar to that of tensioner mechanism 180a shown in FIGS. 19 through 21 and that of tensioner mechanism 180b shown in FIGS. 22 through 24, description here will be limited to those aspects of tensioner mechanism 180c shown in FIGS. 25A through 27 that differ from tensioner mechanism 180a shown in FIGS. 19 through 21 and tensioner mechanism 180b shown in FIGS. 22 through 24, with like reference numerals being used to designate corresponding parts throughout the several views.

Whereas lead screw 187 is arranged in front of post 124 and generally in front of return spring 186 at tensioner mechanism 180a shown in FIGS. 19 through 21, and lead screw 187 is arranged behind post 124 and generally behind return spring 186 at tensioner mechanism 180*b* shown in FIGS. 22 through 24, lead screw 187 is arranged to the side, i.e., outside, of post 124 and to the side, i.e., outside, of return spring 186 at tensioner mechanism 180*c* shown in FIGS. 25A through 27.

Figure 25B:
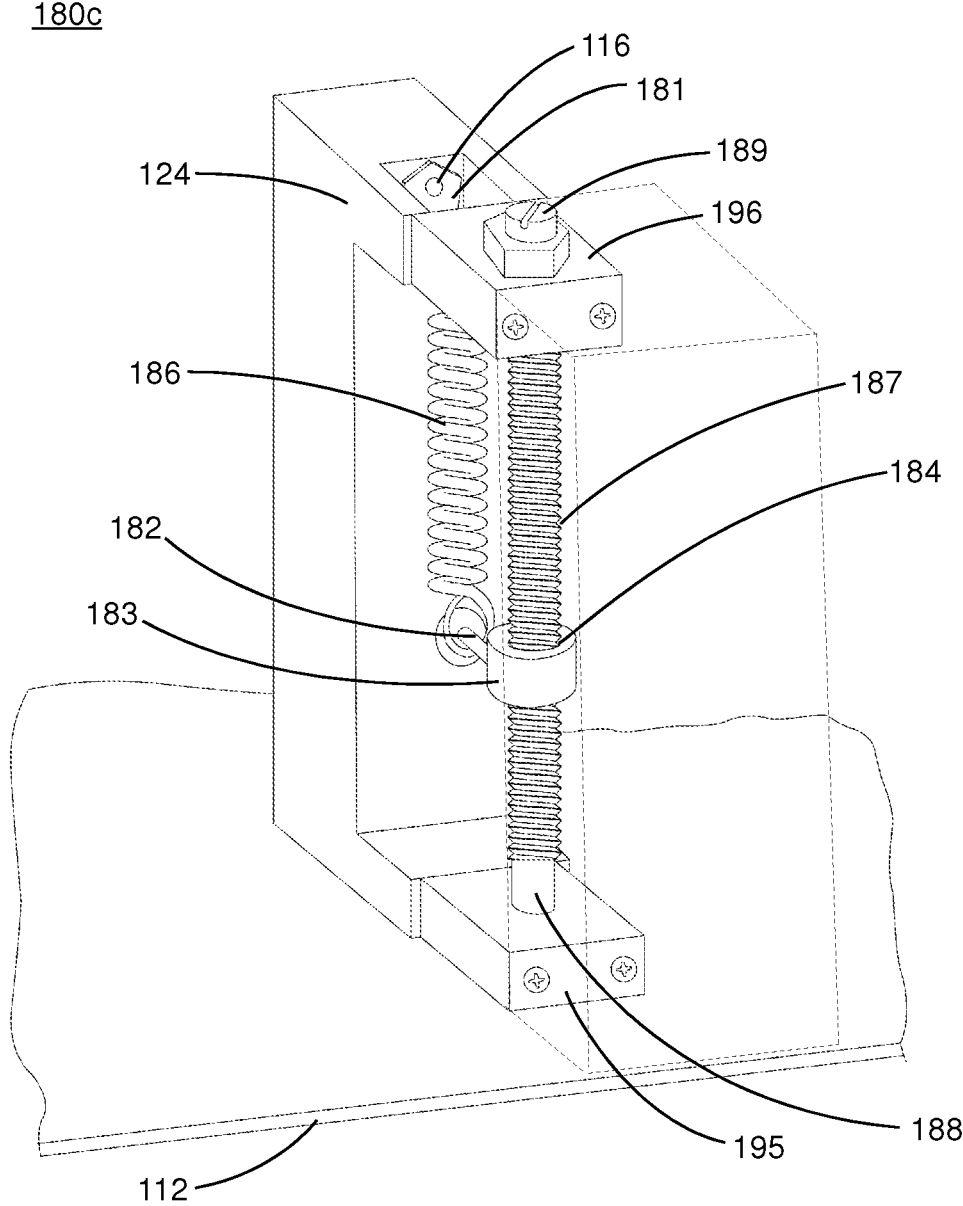
Figure 25C:
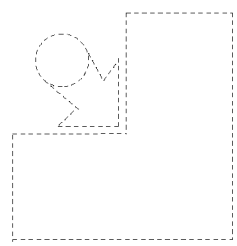
Figure 26:
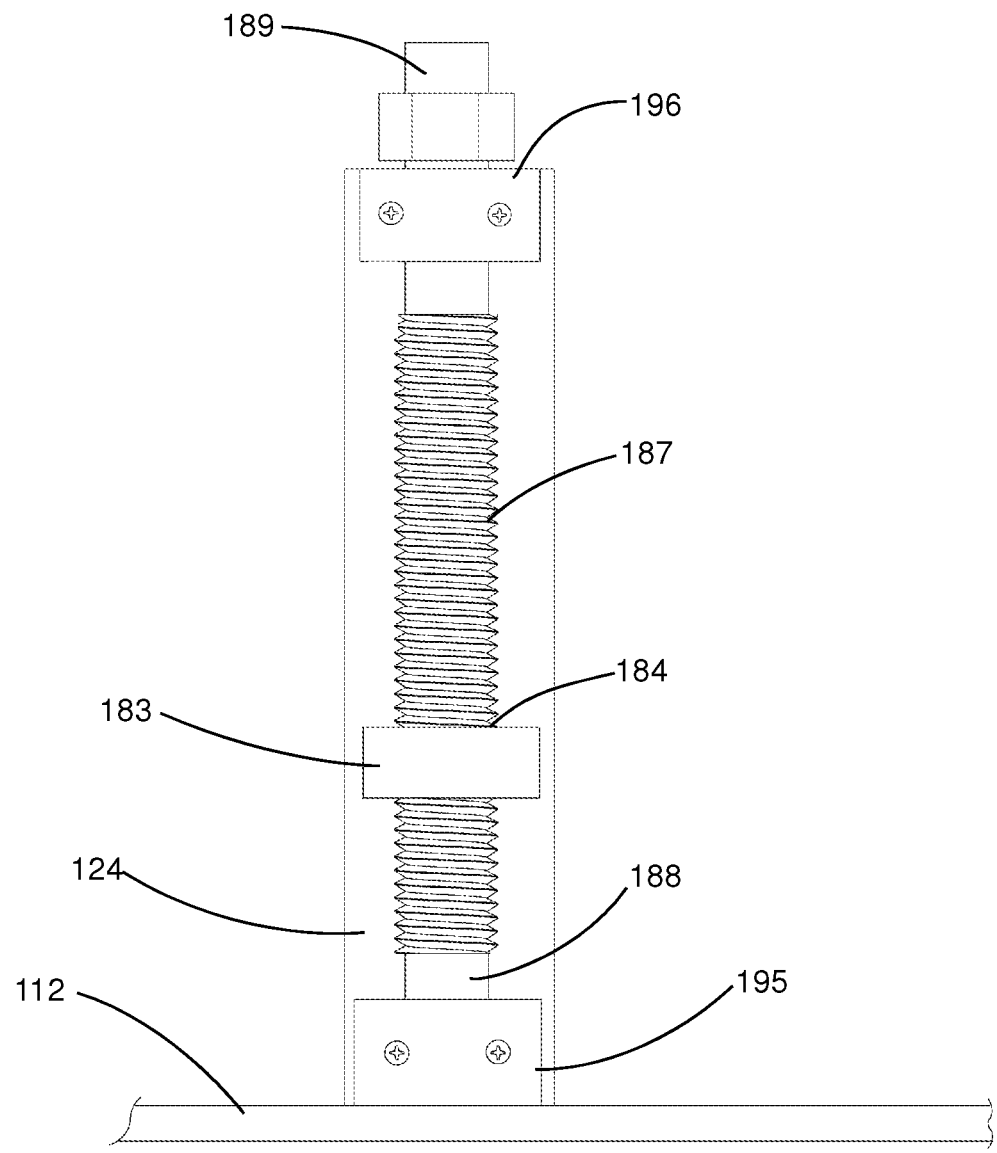
Figure 27:
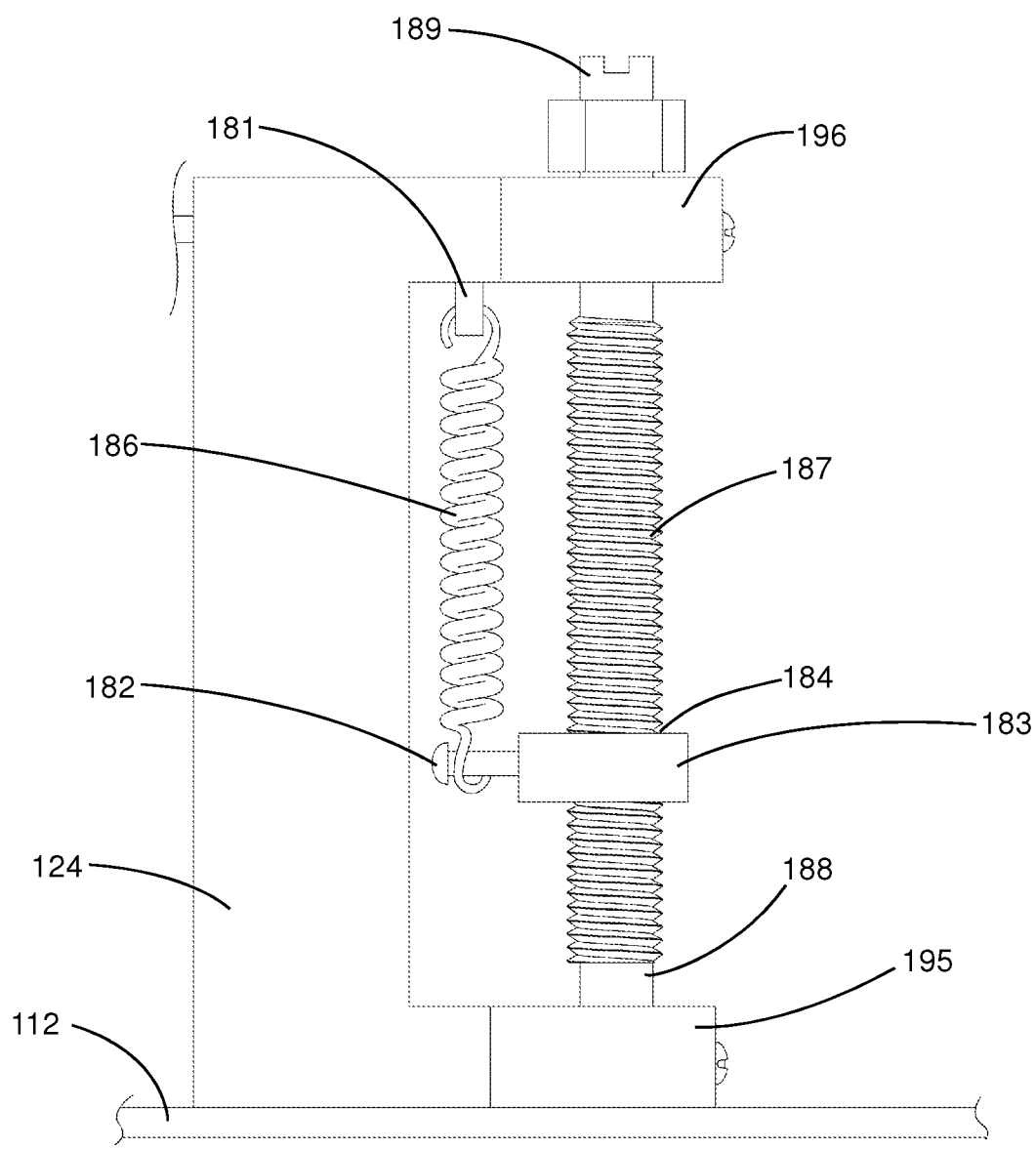

At tensioner mechanism 180*c* shown in FIGS. 25A through 27 in which lead screw 187 is to the side of post 124, because in accordance with the design shown in solid line at FIGS. 25A and 25B bracket surfaces 193, 199 do not come in contact with post surfaces 185, 192 either to act as stopper(s) or to permit sliding engagement therebetween, where it is considered unacceptable for the player to apply finger pressure or the like to lower spring mount 182 to suppress the tendency for bracket 183 to be carried by friction as top end 189 of lead screw 187 is turned to adjust the tension of return spring 186 and thus prevent lower spring mount 182 from deviating from its vertical orientation, which could cause return spring 186 to be stretched and perhaps twisted about lead screw 187 in awkward and undesirable fashion, feature(s) such as those shown in dashed line in FIGS. 25A through 25C might be employed as stopper(s) to prevent bracket 183 from being carried by friction and/or to permit sliding engagement as top end 189 of lead screw 187 is turned.

That is, a feature such as that shown in dashed line toward the left side of the drawing in FIG. 25A might be employed to extend bracket 183 and/or lower spring mount 182 in the direction of post 124 so as to permit contact and/or sliding engagement with post 124.

Or features such as those shown in dashed line toward the right side of the drawing in FIG. 25A might be employed to extend bracket 183 in the direction of an additional guide post secured to baseboard 112 so as to permit contact and/or sliding engagement with this additional guide post.

Or features such as those shown in dashed line toward the right side of the drawing in FIG. 25B and in FIG. 25C might be employed to extend bracket 183 in the direction of an additional guide post secured to baseboard 112 so as to permit contact and/or sliding engagement with this additional guide post. Here, note that FIG. 25C is a schematic sectional view through the portion containing bracket 183 as seen from above in the variation shown in dashed line in FIG. 25B.

Where an additional guide post is employed as shown in dashed line toward the right side of the drawing in FIG. 25A or as shown toward the right side of the drawing in FIG. 25B and in dashed line at FIG. 25C, note that whereas inside face(s) 193, 193 of bracket 183 come in contact with outside face(s) 192, 192 of post 124 at tensioner mechanism 180*a* shown in FIGS. 19 through 21, at tensioner mechanism 180*b* shown in FIGS. 22 through 24, and at the variations on tensioner mechanism 180*c* shown in dashed line in FIG. 25A, it is outside face(s) of the extended bracket shown in dashed line at FIG. 25C that come in contact with inside face(s) of the additional guide post shown in dashed line at FIG. 25C.

Similarly, where an additional guide post is employed as shown in dashed line toward the right side of the drawing in FIG. 25A or as shown toward the right side of the drawing in FIG. 25B and in dashed line at FIG. 25C, note that whereas two planar faces 193, 193 of bracket 183 meet to form a vertically oriented inside corner 199 capable of engaging with a vertically oriented outside corner 185 of post 124 or of such additional guide post, this inside corner 199 of bracket 183 constituting a dihedral angle formed by intersection of two planar faces 193, 193 of bracket 183, and this outside corner 185 of post 124 or such additional guide post constituting a dihedral angle formed by intersection of two planar faces 192, 192 of post 124 or such additional guide post, at tensioner mechanism 180*a* shown in FIGS. 19 through 21, at tensioner mechanism 180*b* shown in FIGS. 22 through 24, and at the variations on tensioner mechanism 180*c* shown in dashed line in FIG. 25A, two planar faces extending from bracket 183 meet to form a vertically oriented outside corner capable of engaging with a vertically oriented inside corner of such additional guide post, this outside corner of bracket 183 constituting a dihedral angle formed by intersection of two planar faces of bracket 183, and this inside corner of such additional guide post constituting a dihedral angle formed by intersection of two planar faces of such additional guide post, at the variation on tensioner mechanism 180*c* shown in dashed line in FIGS. 25B and 25C.

But whether it is inside face(s) of a bracket 183 that come in contact with outside face(s) of a post or it is outside face(s) of a bracket 183 that come in contact with inside face(s) of a post (or additional guide post), it will be possible to counteract the tendency for nut 184 and bracket 183 to be carried by friction, and it will be possible for there to be sliding engagement between planar face(s) of bracket 183 and post 124 (or additional guide post), as top end 189 of lead screw 187 is turned.

And whether it is an inside corner of a bracket 183 that comes in contact with an outside corner 185 of a post 124 or it is an outside corner of a bracket 183 that comes in contact with an inside corner 185 of a post 124 (or additional guide post), it will be possible to cause sliding engagement between such inside corner and such outside corner to further assist in locating and guiding bracket 183 relative to post 124 (or additional guide post) as top end 189 of lead screw 187 is turned.

As apparent by comparing tensioner mechanism 180*a* shown in FIGS. 19 through 21, tensioner mechanism 180*b* shown in FIGS. 22 through 24, and tensioner mechanism 180*c* shown in FIGS. 25A through 27, vertically oriented lead screw 187, which is arranged in parallel but offset fashion with respect to return spring 186, may be disposed at any angular position about the axis of return spring 186. Furthermore, bracket 183, within which nut 184 is embedded or otherwise formed and which couples lead screw 187 to lower spring mount 182, may have surface(s) that come in contact with and/or slidingly engage with surface(s) of post 124 and/or additional guide post(s).

Referring now to FIG. 28, this is an exploded view of a fourth embodiment of a tensioner mechanism 190 that may be employed in place of the inline wingnut tensioner mechanism 125 of pedal assembly 110 shown in FIGS. 2 and 3.

At tensioner mechanism 190 shown in FIG. 28, post 124 has been hollowed out so that lead screw 187 may be inserted therewithin in such fashion that lead screw 187 is in front and to the inside of return spring 186. Furthermore, a section 198 at the front of post 124 has been made removable and the female side of a dovetail joint has been machined into the interior side of that removable section 198 of the front face of post 124, this female dovetail part 198 serving as guide surface for a male dovetail part 197 having a threaded hole serving as nut 184 for engagement with lead screw 187.

During assembly of tensioner mechanism 190 shown in FIG. 28, post 124 is removed from baseboard 112, a collar is attached to bottom end 188 of lead screw 187 by means of a set screw or the like, and lead screw 187 is inserted into post 124 by way of a hole formed at the base of post 124. But before lead screw 187 is inserted into post 124, the wedge of male dovetail part 197 is inserted in dovetail fashion into the groove of female dovetail part 198, and female dovetail part 198, into which male dovetail part 197 has thus been inserted, is returned to its original configuration at post 124. Then, as lead screw 187 is inserted thereinto from the bottom of post 124, male threads at lead screw 187 are made to engage with female threads formed at hole 184 in male dovetail part 197, and the top end 189 of lead screw 187 is made to emerge from a hole formed at the top of post 124. Lead screw ends 188, 189 are supported by support means 195, 196 housed within hollowed-out post 124 in similar fashion as described above with respect to tensioner mechanism 180*a* shown in FIGS. 19 through 21. Male dovetail part 197 furthermore contains threaded holes for attachment of half-bracket 191 to male dovetail part 197, the combination of half-bracket 191 and male dovetail part 197 serving as bracket 183 in the present embodiment. Male dovetail part 197 also contains an additional threaded hole into which lower spring mount 182 may be threadedly engaged so as to permit the lower end of return spring 186 to be coupled to male dovetail part 197 which rides along lead screw 187 in similar fashion as is the case with nut 184 at tensioner mechanism 180*a* shown in FIGS. 19 through 21, tensioner mechanism 180*b* shown in FIGS. 22 through 24, and tensioner mechanism 180*c* shown in FIGS. 25A through 27.

Note that the front face of post 124 contains an appropriately shaped groove to allow motion of male dovetail part 197 within female dovetail part 198 as male dovetail part 197 is made to ride up and down along lead screw 187 during adjustment of the tension of return spring 186, and the face of post 124 toward the side at which return spring 186 is arranged contains an appropriately shaped groove to allow motion of lower spring mount 182 and half-bracket 191 as male dovetail part 197 is made to ride up and down along lead screw 187 during adjustment of the tension of return spring 186. Following assembly in this fashion, female dovetail part 198 may be secured in place at the front of post 124 using screws or other fasteners, and post 124 may be secured to baseboard 112.

At tensioner mechanism 190, planar faces of male dovetail part 197 making up a portion of bracket 183 meet to form vertically oriented outside corners capable of engaging with vertically oriented inside corners of female dovetail part 198 making up a portion of post 124, these outside corners of male dovetail part 197 constituting dihedral angles, each of which is formed by intersection of two planar faces of male dovetail part 197, and these inside corners of female dovetail part 198 constituting dihedral angles, each of which is formed by intersection of two planar faces of female dovetail part 198.

Whereas post 124 at tensioner mechanism 190 shown in FIG. 28 is hollowed out so that lead screw 187 may be inserted therewithin in such fashion that lead screw 187 is in front and to the inside of return spring 186, note that lead screw 187 may in general be disposed at any angular position about the axis of return spring 186, the location of hollowed-out post 124 being modified to accommodate insertion of lead screw 187 therewithin.

Whereas male dovetail part 197 which rides along lead screw 187 makes contact with female dovetail part 198 formed at the interior of hollowed-out post 124 at tensioner mechanism 190 shown in FIG. 28, in a variation thereon a female part which rides along lead screw 187 may make contact with a male dovetail part formed at the interior of hollowed-out post 124, or instead of a dovetail part which rides along lead screw 187 a bracket which rides along lead screw 187 and which has an outside corner that makes contact with an inside corner at the hollowed out interior of post 124 may be employed in similar fashion as shown at FIGS. 25B and 25C, or an additional guide post might be provided in similar fashion as shown in dashed line toward the right side of the drawing in FIG. 25A so that a bracket which rides along lead screw 187 and which has an inside corner that makes contact with an outside corner of the additional guide post might be employed. There is moreover no objection to employment of means such as a groove, slot, rod, bar, track, frame, and/or the like as described above to counteract the tendency for nut 184 and bracket 183 to be carried by friction as top end 189 of lead screw 187 is turned.

Thus, at tensioner mechanism 190 shown in FIG. 28 or a variation thereon as described above, where inside face(s) of a bracket 183 come in contact with outside face(s) of a post 124 or outside face(s) of a bracket 183 come in contact with inside face(s) of a post 124, it will be possible to counteract the tendency for nut 184 and bracket 183 to be carried by friction, and it will be possible for there to be sliding engagement between planar face(s) of bracket 183 and post 124, as top end 189 of lead screw 187 is turned. Furthermore, at tensioner mechanism 190 shown in FIG. 28, where an inside corner of a bracket 183 comes in contact with an outside corner 185 of a post 124 or an outside corner of a bracket 183 comes in contact with an inside corner 185 of a post 124, it will be possible to cause sliding engagement between such inside corner and such outside corner to further assist in locating and guiding bracket 183 relative to post 124 as top end 189 of lead screw 187 is turned.

Whereas pedal return springs 126, 186 shown in the drawings are depicted as coil springs, the present invention is not limited to tensioner mechanisms employing coil springs and/or other such helical springs, whether designed to act in tension or compression or both tension and compression, it also being possible to employ any of a wide variety of springs, e.g., gas springs, leaf springs, torsion springs, cantilever springs, rubber-band-like springs (but without limitation to those made of rubber, it being possible to employ any suitable elastic or viscoelastic material), foamed resin or other such elastic or viscoelastic material, and any other suitable device capable of providing a restoring force that varies as a function of displacement, as pedal return spring 126, 186.

Whereas tensioner mechanisms 180*a*, 180*b*, 180*c*, 190 in accordance with the present invention have been described in terms of examples in which bracket 183, by way of which nut 184 that rides on screw 187 is coupled to return spring 186, is connected to a lower spring mount 182 that is disposed at the bottom end of return spring 186, the present invention may also be applied to tensioner mechanisms in which bracket 183 is connected to an upper spring mount that is disposed at the top end of return spring 186, or is connected at any other suitable location to return spring 186, the mechanism and linkages being modified as necessary so as to permit adjustment of tension as a result of movement of nut 184 on screw 187 when top end 189 of screw 187 is turned. This being the case, it should be understood that the present invention is not limited to tensioner mechanisms in which tension of return spring 186 is increased by causing nut 184 to move to a lower position on screw 187 and decreased by causing nut 184 to move to a higher position on screw 187, it also being possible to apply the present invention to tensioner mechanisms in which tension of return spring 186 is increased by causing nut 184 to move to a higher position on screw 187 and decreased by causing nut 184 to move to a lower position on screw 187.

Whereas brackets 183 of various shapes have been employed at tensioner mechanisms 180a, 180b, 180c, 190 shown by way of example at FIGS. 19 through 28, the present invention is not limited to brackets 183 of any particular size or shape, it being possible to employ brackets 183 of a wide variety of sizes and shapes so long as they are capable of carrying out the functions described herein.

As described above, a tensioner mechanism 180a, 180b, 180c, 190 and/or a curved pedal 130 in accordance with any of various embodiments of the present invention may be mounted in pedal assembly 110 for use in a drum set 100, for example.

A drum set 100 comprising a pedal assembly 110 employing a tensioner mechanism 180a, 180b, 180c, 190 in accordance with the present invention and a curved pedal 130 in accordance with the present invention will make it possible, by permitting convenient and precise adjustment of pedal return spring tension, for a proficient player to take full advantage of the benefits of the curved pedal of the present invention.

Employment of tensioner mechanism 180a, 180b, 180c, 190 in accordance with one or more embodiments of the present invention may make it possible for the operator of the pedal to adjust the tension of the pedal return spring conveniently and without the need to disassemble the pedal assembly. For example, in some embodiments, the operator may be able to adjust the tension of the pedal return spring without the need for the operator to move from the position from which the operator normally operates the pedal. For example, in some embodiments, employment of a tensioner mechanism 180a, 180b, 180c, 190 in accordance with the present invention may make it possible for a drummer seated on a drum throne to be able to adjust pedal return spring tension while seated on the throne.

And in an embodiment in which lead screw 187 is self-locking as described above, it will be possible for pedal return spring tension to be easily adjusted without the need to loosen a locknut or other locking means, and once adjusted, it will be possible for the tension adjustment to be maintained without the need to tighten a locknut or other locking means.

Curved pedal 130 mounted in pedal assembly 110 for use in drum set 100 in accordance with embodiments of the present invention may facilitate pedal-actuated drumming and/or may make pedal-actuated drumming less tiring or more comfortable, especially when employing techniques such as the sliding technique and/or the heel-toe technique.

Furthermore, the curved shape of curved pedal 130 in accordance with some embodiments may allow a player to quickly and reliably locate his or her foot by the "feel" of curved pedal 130.

Moreover, because curved pedal 130 in accordance with some embodiments may be a good match for the shape of the foot, employment of curved pedal 130 may make it possible to achieve more rapid and powerful striking of the drum with less movement of the foot and/or ankle than is the case conventionally.

In addition, the curved shape of curved pedal 130 in accordance with some embodiments may allow the foot—and in particular the heel of the foot and/or the ball of the foot—to strike curved pedal 130 at an angle more nearly perpendicular to top surface 136 thereof, making it possible to improve the leverage or efficiency with which force is transferred from the player's foot to curved pedal 130, and/or permitting stronger and/or less tiring performance.

Furthermore, the smoothly varying contour of curved pedal 130 in some embodiments may be advantageous for players who employ bare feet or who wears socks but no shoes or who wears thin shoes or other such foot coverings for improved comfort and sensitivity in locating the foot on curved pedal 130.

Moreover, because actuatable region 135 of curved pedal 130 in some embodiments is substantially longer than the foot of the player, this may not only permit increase in leverage about the fulcrum of heel hinge 114, permitting more powerful and/or less tiring playing, but may also facilitate more sustained sliding along length direction 132 of curved pedal 130. In addition, a pedal substantially longer than the foot of the player may also accommodate multiple striking locations beyond the basic heel-toe striking positions employed conventionally.

Figure 16A:
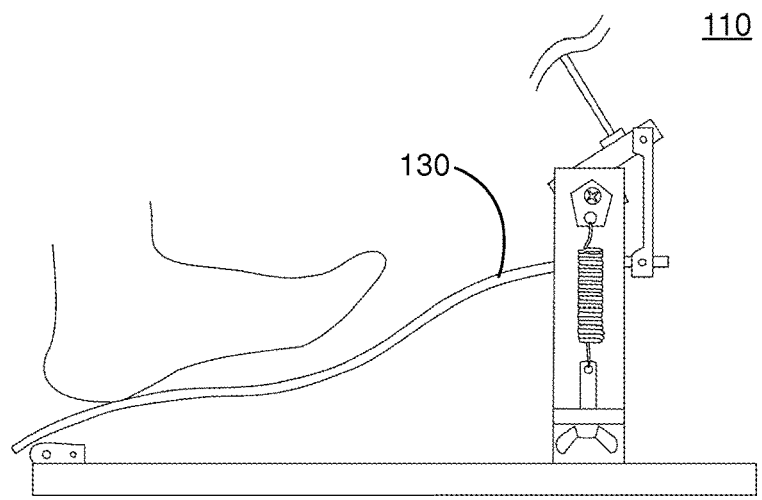
FIGS. 16A through 16C are diagrams to assist in describing one example of use of curved pedal 130 in pedal assembly 110 in accordance with an embodiment of the present invention.
Figure 16B:
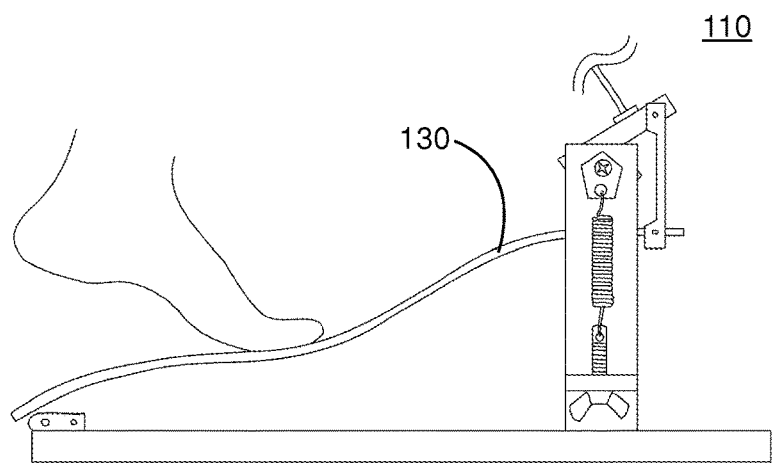
Figure 16C:
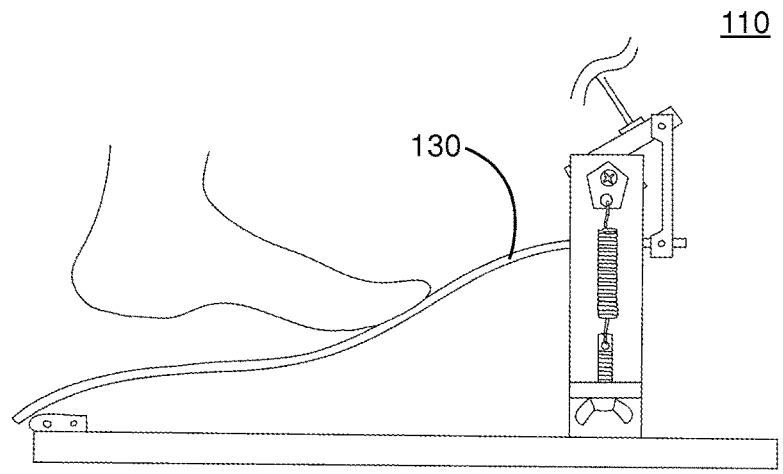

Referring now to FIGS. 16A through 16C, description will be given of how curved pedal 130 in pedal assembly 110 at drum set 100 might be used accordance with an embodiment of the present invention.

At drum set 100, pedal assembly 110 may be used to play a drum 103 or high-hat cymbals 104, for example, in any suitable manner. For example, where pedal assembly 110 is used to operate bass drum 103, pedal assembly 110 may be assembled in such fashion as to permit pedal assembly 110 to cause beater 115 to strike vertically standing drum 103 or a horizontally standing drum when curved pedal 130 is depressed.

In some embodiments, a player may use pedal assembly 110 to generate a single drum beat. At such time, when the player uses his or her foot to operate pedal assembly 110, the foot may in general be positioned at any arbitrary location along top surface 136 of curved pedal 130 at the time that curved pedal 130 is depressed. For example, the foot may be positioned as shown in FIG. 16A. In another example, the foot may be positioned as shown in FIG. 16B. In yet another example, the foot may be positioned as shown in FIG. 16C. Possible foot positions are not limited to those shown in FIG. 16A through FIG. 16C.

In some embodiments, a player may use pedal assembly 110 to generate a doublet, or two consecutive drum beats. A doublet may be generated in various ways. For example, a player may simply repeat one of the foot movements mentioned above to generate a single drum beat twice in rapid succession. One advantage of some embodiments of the present invention is that it facilitates production of two consecutive drum beats in one foot motion cycle. When two consecutive beats are produced by one foot motion cycle, rapid consecutive beats may be easily achieved.

For example, in accordance with one or more embodiments of the present invention, a player may use any of various sliding techniques. In accordance with one such sliding technique, a player might first depress curved pedal 130 using his or her toe to generate a first stroke, slide his or her foot along length direction 132 of curved pedal 130, and then depress curved pedal 130 again using his or her toe to generate a second stroke. For example, a foot may be positioned for a first toe stroke as shown in FIG. 16B and then for a second toe stroke as shown in FIG. 16C. Alternatively, a foot may be positioned for a first toe stroke as shown in FIG. 16C and then for a second toe stroke as shown in FIG. 16B. Possible foot positions are not limited to those described in FIG. 16B and FIG. 16C.

One advantage of at least some embodiments of the present invention is that the curved top surface 136 of curved pedal 130 may be better suited for foot sliding motion and therefore permit easier and less tiring generation of doublets, for example, as compared with a conventional flat pedal.

For example, when toe positions for two consecutive toe strokes are in a curved region of curved pedal 130, e.g., within first concavity 150, the curved shape of top surface 136 of curved pedal 130 may allow a player to more easily slide his or her toe forward or backward along length direction 132 as the toe depresses curved pedal 130.

Furthermore, employment of a curved pedal 130 having smoothly varying slope within at least a portion of actuatable region 135 and/or within substantially the entire actuatable region 135 may make it possible for a player to be able to feel on his or her foot a gradual local angle shift, i.e., slope change, of curved pedal 130 during foot sliding motion, and a player may use this shift as an indicator to understand where his or her toe is positioned during a foot motion cycle. The shift that may be felt on a player's foot may make reproducing a foot motion cycle easier for the player. In particular, where curved pedal 130 has second convexity 160, the curvature of second convexity 160 may provide further toe positioning guidance. Thus, the smoothly varying slope of curved pedal 130 may allow a player to better rely on the feel of the foot and to eliminate or reduce the need to focus on how far the foot should slide, which may make generating a doublet, for example, more reproducible, less tiring, and more enjoyable.

Thus, one advantage of at least some embodiments of the present invention is that curved pedal 130 may make foot tilting motion and hence doublet generation easy and less tiring as compared with a conventional flat pedal. For example, when curved pedal 130 has at least one convexity 140, 160, this may permit a player to be better able to feel on his or her toe a gradual local angle shift, slope change, within first convexity 140, so as to allow easy positioning of a heel for a heel stroke, for example.

As another example of a technique that may be employed, a player may use a heel-toe technique and/or toe-heel technique.

In one such heel-toe technique, a player may first depress curved pedal 130 with his or her heel to generate a first stroke, tilt his or her toe down, and then depress curved pedal 130 with his or her toe to generate a second stroke. For example, a heel may be positioned for a first stroke as shown in FIG. 16A and then for a second stroke as shown in FIG. 16B or FIG. 16C.

In one such toe-heel technique, a toe stroke may be a first stroke and a heel stroke may be a second stroke. For example, the toe may be positioned for a first stroke as shown in FIG. 16B or 16C, and then the heel may be positioned for a second stroke as shown in FIG. 16A. Possible foot positions are not limited to those described in FIG. 16B and FIG. 16C.

In some embodiments, a player may use pedal assembly 110 to generate triplets, or three consecutive drum beats. Triplets may be generated in any of various ways. For example, a player may simply repeat the foot movement mentioned above for generating a single drum beat three times. One advantage of some embodiments of the present invention is that it facilitates production of three consecutive drum beats in one foot motion cycle. When three consecutive beats are produced by one foot motion cycle, very rapid consecutive beats may be easily achieved. Furthermore, such a foot motion cycle may be repeated as many times as desired to generate more than three consecutive beats.

It was unexpectedly found by the present inventor that pedal assembly 110 comprising curved pedal 130 makes it possible to easily combine heel-toe techniques (or toe-heel techniques) with sliding techniques for easy generation of triplets, for example.

In accordance with such a combined technique, a player may first depress curved pedal 130 with his or her toe to generate a first stroke, tilt his or her toe down, depress curved pedal 130 with his or her toe to generate a second stroke, slide his or her foot in length direction 132, and then depress curved pedal 130 again with his or her toe to generate a third stroke. For example, a foot may be positioned for a first stroke as shown in FIG. 16A, then for a second stroke as shown in FIG. 16B, and then for a third stroke as shown in FIG. 16C. Alternatively, a foot may be positioned for a first stroke as shown in FIG. 16A, then for a second stroke as shown in FIG. 16C, and then for a third stroke as shown in FIG. 16B. Possible foot positions are not limited to those described in FIG. 16A through FIG. 16C.

One advantage of at least some embodiments of the present invention is that curved pedal 130 may make generating triplets easier and less tiring as compared with a conventional flat pedal.

Presence of first convexity 140, first concavity 150, and/or second convexity 160 at curved pedal 130 may facilitate utilization of various sliding and/or heel-toe techniques.

Furthermore, actuatable region 135 of curved pedal 130 may be longer than the corresponding length in a conventional flat pedal. Where this is the case, the greater length of curved pedal 130 may provide space sufficient to allow a player's foot to perform ankle tilting and/or foot sliding motions in sequence, allowing greater degrees of freedom in combining toe-heel techniques and sliding techniques, and making it possible to more easily generate triplets, for example.

Although various foot positions have been shown in FIGS. 16A through 16B, there is of course no limitation on the manner in which curved pedal 130 or pedal assembly 110 is used, the exact foot positions with respect to curved pedal 130 for generation of one or multiple drum beats being freely chosen depending, for example, on the player's preference, the player's foot shape and/or size, whether or not the player is wearing socks, shoes, and/or or other such foot coverings or is playing with bare feet, for example.

Where pedal assembly 110 is used to play high-hat cymbals 104, there is no particular limitation on the manner in which this may be carried out; for example, use of pedal assembly 110 to play high-hat cymbals 104 may be generally similar to use of pedal assembly 110 to play a drum 103 as described above.

Because bass drum 103 in accordance with embodiments of the present invention may permit faster playing than would be possible with a conventional flat pedal, this may allow more versatility in playing than was conventionally possible.

For example, whereas with a conventional flat pedal a player might have been forced to employ two pedals on one drum to achieve a certain degree of frequency of repetitions in striking the drumhead, curved pedal 130 in accordance with embodiments of the present invention may allow such a player to achieve comparable frequency of repetitions with a single curved pedal 130, thus freeing up the other foot to play another drum 103 and/or high-hat cymbals 104. An arrangement suitable for such manner of playing is shown in FIG. 17, which shows a drum set 100 similar to that of FIG. 1 except that drum set 100 of FIG. 17 contains two bass drums 103, each of which has an independent pedal assembly 110 as described above.

Figure 18:
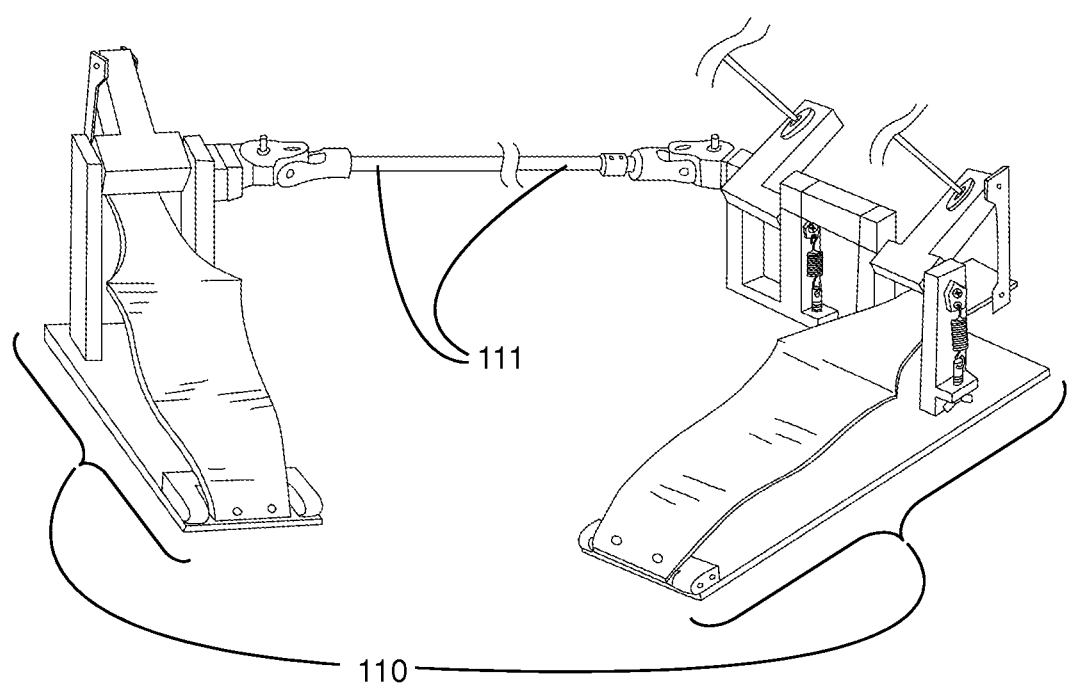
FIG. 18 shows dual pedal linkage 111 which links two pedal assemblies 110 in accordance with an embodiment of the present invention.

Note that a singled curved pedal 130 in accordance with embodiments of the present invention may be used to play multiple instruments through use of a pedal assembly 110 in combination with various linkages may permit tandem and/ or parallel playing. Similarly, multiple curved pedals 130 in accordance with embodiments of the present invention may be used in pedal assemblies 110 in combination with various linkages to strike the same and/or different instruments. One such arrangement is shown in FIG. 18, but it should be understood that all such variations are intended to be within the scope of the claims.

Note that tensioner mechanism 180a, 180b, 180c, 190, curved pedal 130, and pedal assembly 110 are not limited to employment in bass drums 103, percussion instruments 102, drum sets 100, or musical instruments, but may be applied for use in any of a wide variety of applications where dexterity, responsiveness, and comfort are desired, especially when a pedal is to be operated for an extended period of time. Curved pedals 130 and pedal assemblies 110 in accordance with various embodiments of the present invention are particularly useful for generating rapid and/or repeated mechanical motions.

In some embodiments, such mechanical motion may be employed for playing a percussion instrument or non-percussion musical instrument. In one embodiment, such mechanical motions may be transmitted to an instrument directly when part of a pedal assembly physically comes in contact with an instrument. In another embodiment, such mechanical motions may be transformed into another form of signal, for example an electrical signal, and transmitted to an instrument indirectly.

In some embodiments, such mechanical motion may be employed to operate any of various devices and/or machines. Devices and/or machines in which curved pedals 130 and pedal assemblies 110 in accordance with various embodiments of the present invention may be employed include, without limitation, musical instruments, games, video games, toys, playground equipment, automobiles, helicopters, airplanes, backhoes and other such vehicles, construction equipment, and/or heavy equipment, looms, sewing machines, treadles, knitting machines, saws and/or mills, lathes, pumps, and/or other such manufacturing equipment and industrial apparatuses, as well as any of various devices employed in agriculture, forestry, robotics, and/or aerospace, for example. Regardless of field in which the present invention is applied, mechanical motion of foot-actuated curved pedal 130 may be transmitted by way of an assembly similar to pedal assembly 110 to a target device or machine directly or indirectly. Indirect transmission may include, without limitation, electrical transmission. Although the various embodiments of the present invention have been described in terms of an example in which the operator of curved pedal 130 is human, there is no particular limitation to use of curved pedal 130 or to pedal assembly 110 by a non-human, such as a pet or other animal, or by a non-animal such as a robot, for example.

Although the aforementioned pedals have generally been shown in the drawings as having splayed sides in which pedal width generally increases from heel to toe to accommodate the shape of the human foot, there is no objection to employment of a pedal having straight sides in which pedal width is more or less constant, or to employment of a pedal having reverse-splayed sides in which pedal width generally decreases from heel to toe in reverse fashion as the shape of the human foot.

Furthermore, curved pedals in accordance with various embodiments of the present invention may encompass various ornamental designs. FIGS. 29A through 41G show examples of such designs in various contexts and environments. At FIGS. 29A through 41G, portions drawn in solid line should be understood to indicate the edges of the design, shading being used within the region of the design in some of the drawings to indicate surface contour; portions drawn in dashed or dotted line should be understood to indicate environment which is not part of the design; and dot-dash chain lines should be understood to indicate boundaries between the design and environment which is not part of the design.

Figure 29A:
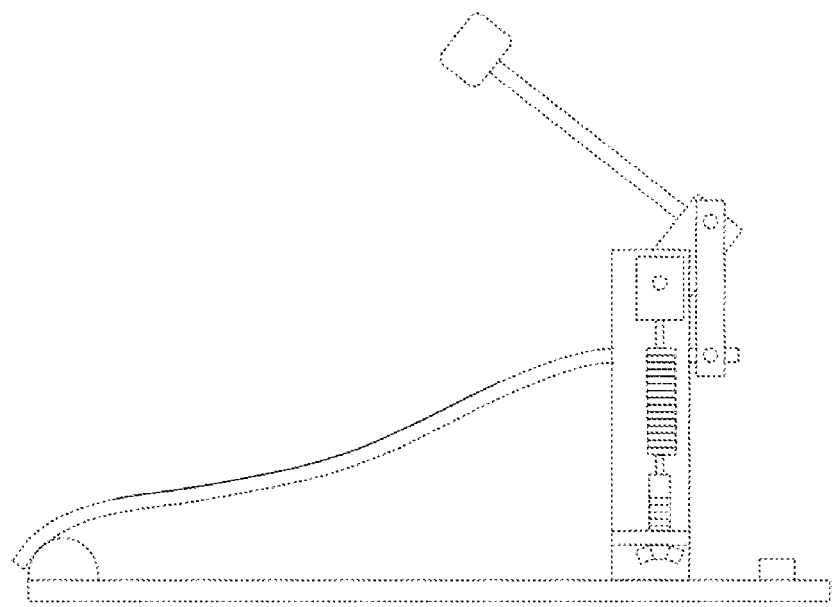
FIG. 29A is a right side view of a first embodiment of a curved pedal having splayed sides, showing a central concavity, not extending to the pedal edges in the length direction but extending to the pedal edges in the width direction, in the context of a convex-concave-convex design at a pedal surface in a drum beater assembly, order in which surfaces are listed here and below being from heel to toe, i.e., from left to right as viewed at FIG. 29A.
Figure 29B:
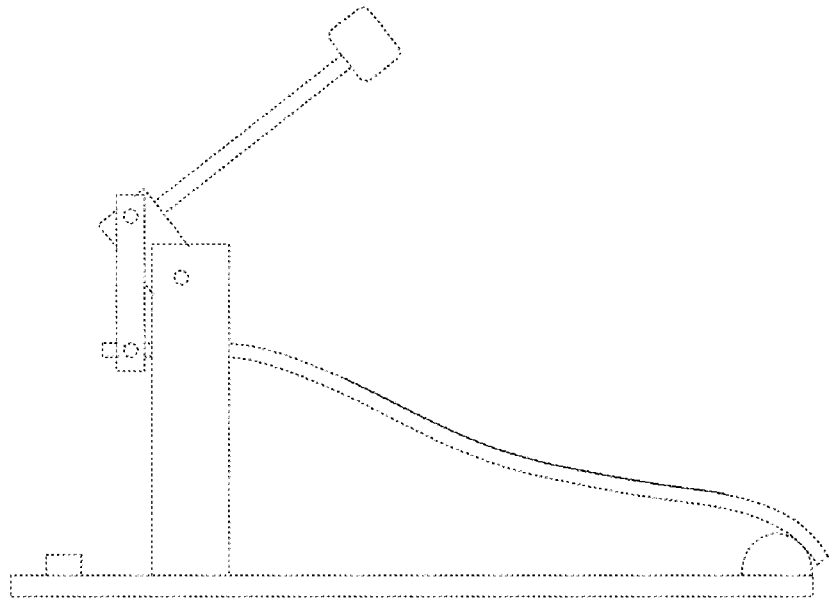
FIG. 29B is a left side view thereof.
Figure 29C:
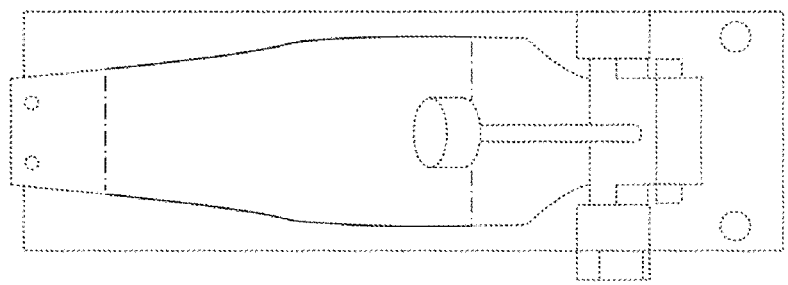
FIG. 29C is a top view thereof.
Figure 29E:
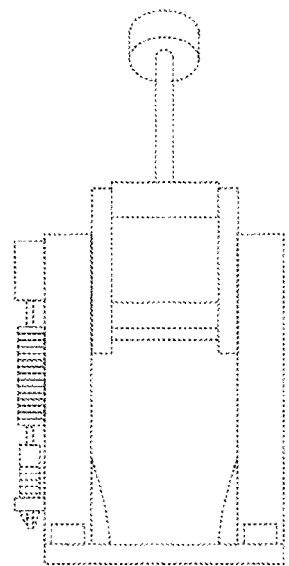
FIG. 29E is a rear view thereof.
Figure 29D:
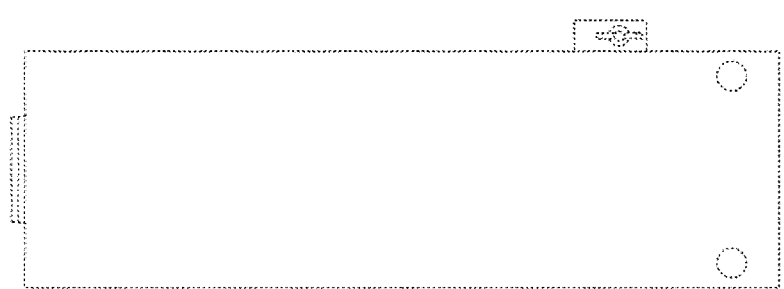
FIG. 29D is a bottom view thereof.
Figure 29F:
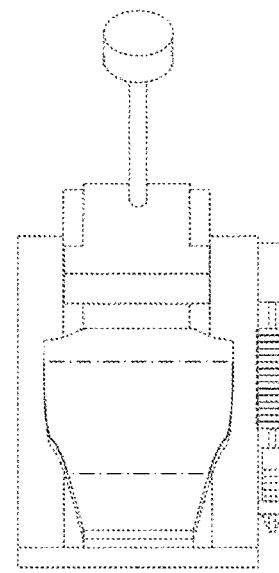
FIG. 29F is a front view thereof.

FIG. 29A is a right side view of a first embodiment of a curved pedal having splayed sides, showing a central concavity, not extending to the pedal edges in the length direction but extending to the pedal edges in the width direction, in the context of a convex-concave-convex design at a pedal surface in a drum beater assembly, order in which surfaces are listed here and below being from heel to toe, i.e., from left to right as viewed at FIG. 29A; FIG. 29B is a left side view thereof; FIG. 29C is a top view thereof; FIG. 29D is a bottom view thereof; FIG. 29E is a rear view thereof; and FIG. 29F is a front view thereof.

Figure 30A:
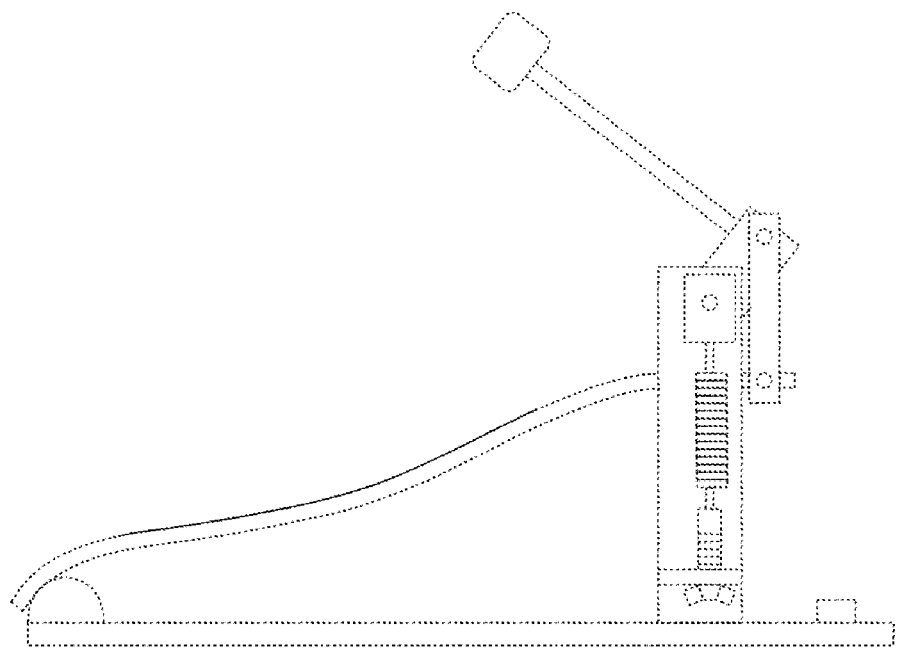
FIG. 30A is a right side view of a second embodiment of a curved pedal having parallel sides, showing a central concavity, not extending to the pedal edges in the length direction but extending to the pedal edges in the width direction, the extent of the design in the length direction being similar to that of the first embodiment, in the context of a convex-concave-convex design at a pedal surface in a drum beater assembly.
Figure 30B:
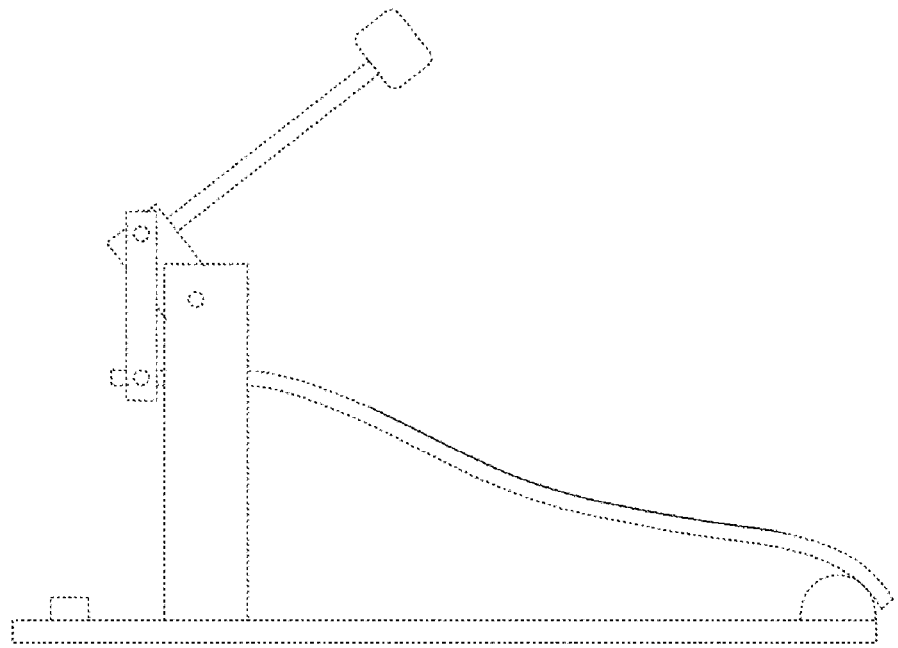
FIG. 30B is a left side view thereof.
Figure 30C:
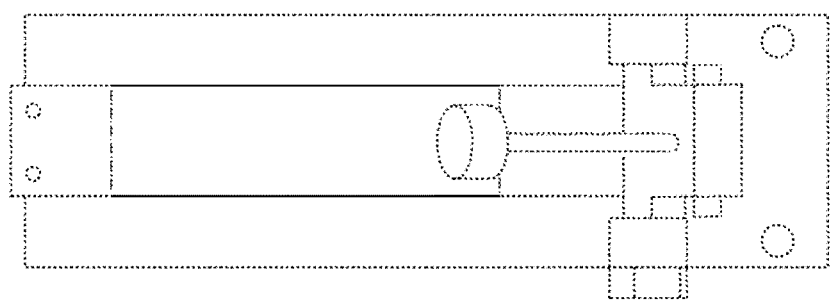
FIG. 30C is a top view thereof.
Figure 30E:
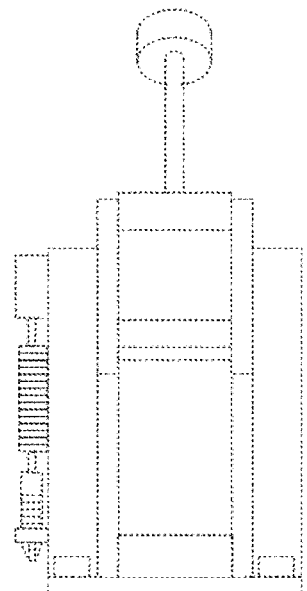
FIG. 30E is a rear view thereof.
Figure 30D:
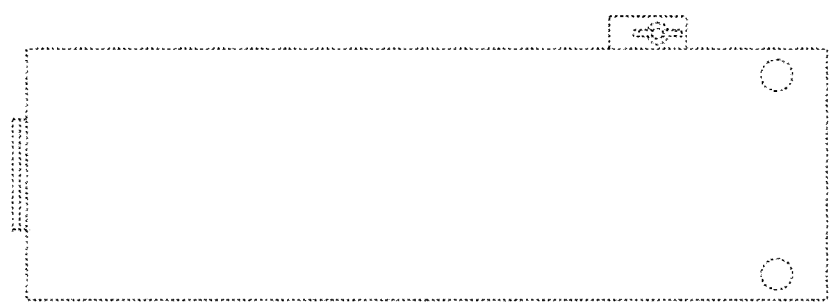
FIG. 30D is a bottom view thereof.
Figure 30F:
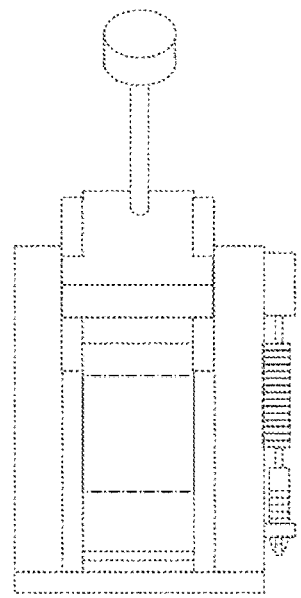
FIG. 30F is a front view thereof.

FIG. 30A is a right side view of a second embodiment of a curved pedal having parallel sides, showing a central concavity, not extending to the pedal edges in the length direction but extending to the pedal edges in the width direction, the extent of the design in the length direction being similar to that of the first embodiment, in the context of a convex-concave-convex design at a pedal surface in a drum beater assembly; FIG. 30B is a left side view thereof; FIG. 30C is a top view thereof; FIG. 30D is a bottom view thereof; FIG. 30E is a rear view thereof; and FIG. 30F is a front view thereof.

Figure 31A:
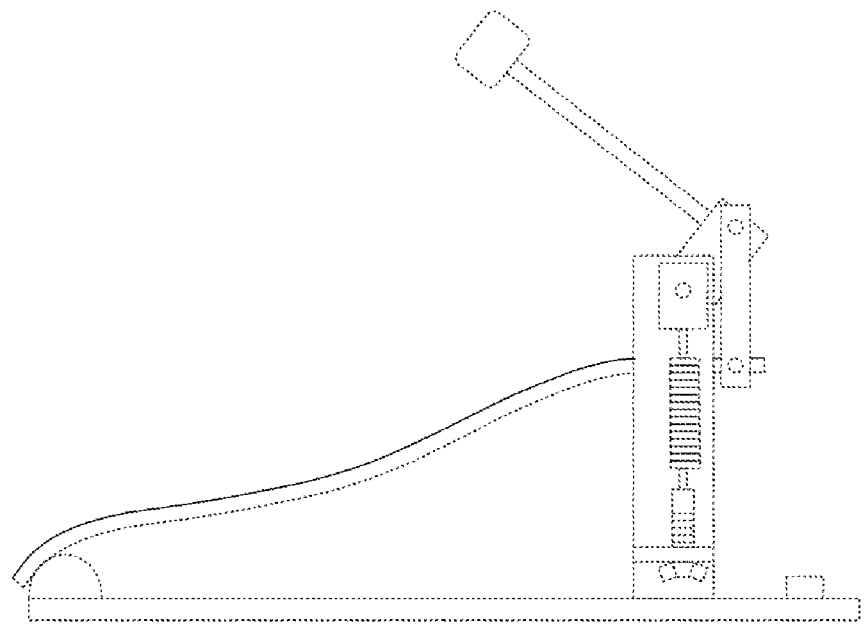
FIG. 31A is a right side view of a third embodiment of a curved pedal having splayed sides, showing a convex-concave-convex design at a pedal surface, extending to the pedal edges in the length and width directions, in a drum beater assembly.
Figure 31B:
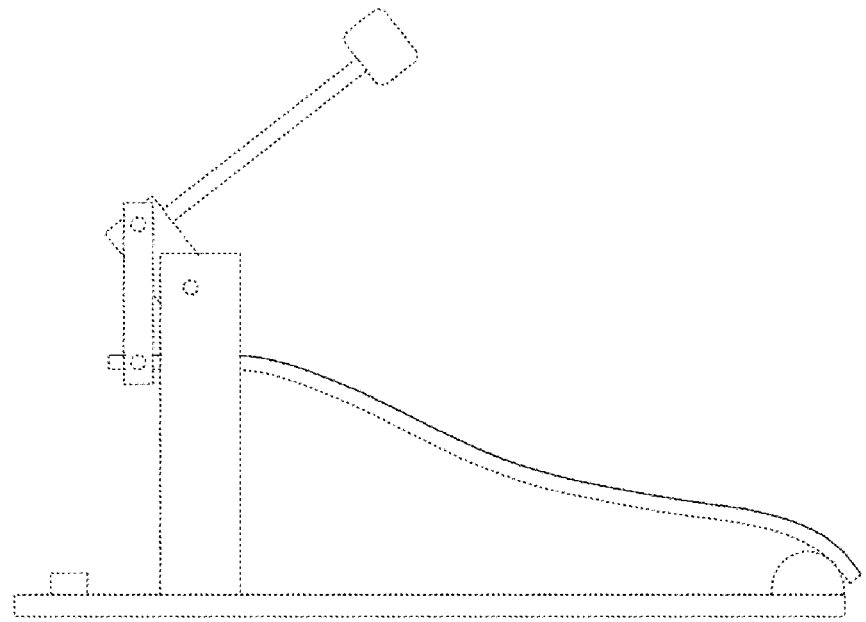
FIG. 31B is a left side view thereof.
Figure 31C:
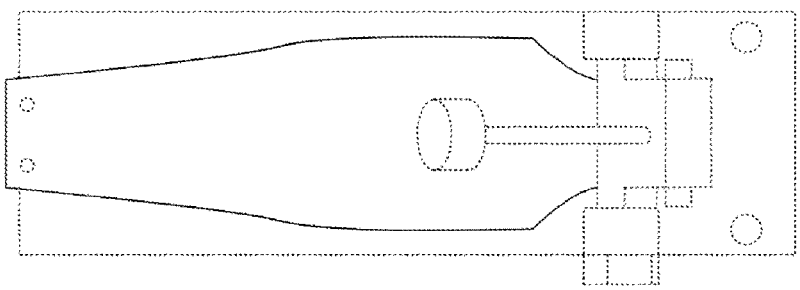
FIG. 31C is a top view thereof.
Figure 31E:
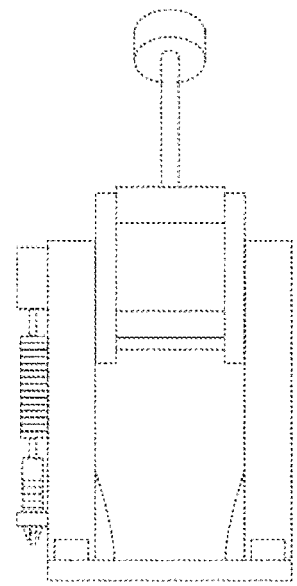
FIG. 31E is a rear view thereof.
Figure 31D:
FIG. 31D is a bottom view thereof.
Figure 31F:
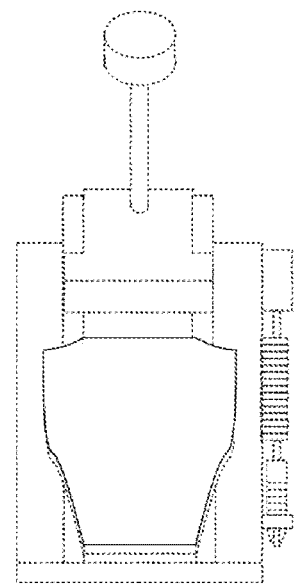
FIG. 31F is a front view thereof.

FIG. 31A is a right side view of a third embodiment of a curved pedal having splayed sides, showing a convex-concave-convex design at a pedal surface, extending to the pedal edges in the length and width directions, in a drum beater assembly; FIG. 31B is a left side view thereof; FIG. 31C is a top view thereof; FIG. 31D is a bottom view thereof; FIG. 31E is a rear view thereof; and FIG. 31F is a front view thereof.

Figure 32A:
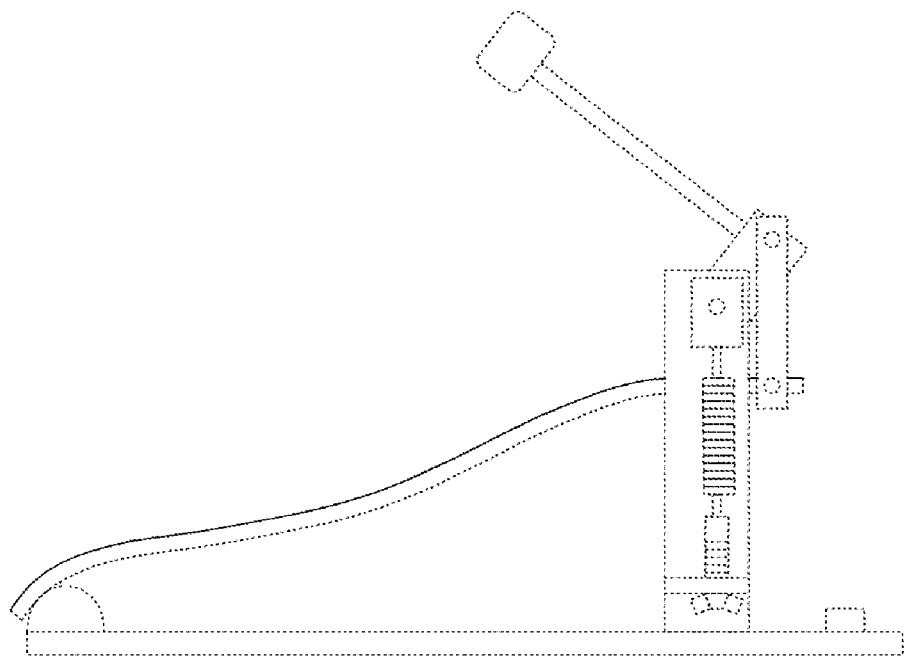
FIG. 32A is a right side view of a fourth embodiment of a curved pedal having parallel sides, showing a convex-concave-convex design at a pedal surface, extending to the pedal edges in the length and width directions, in a drum beater assembly.
Figure 32B:
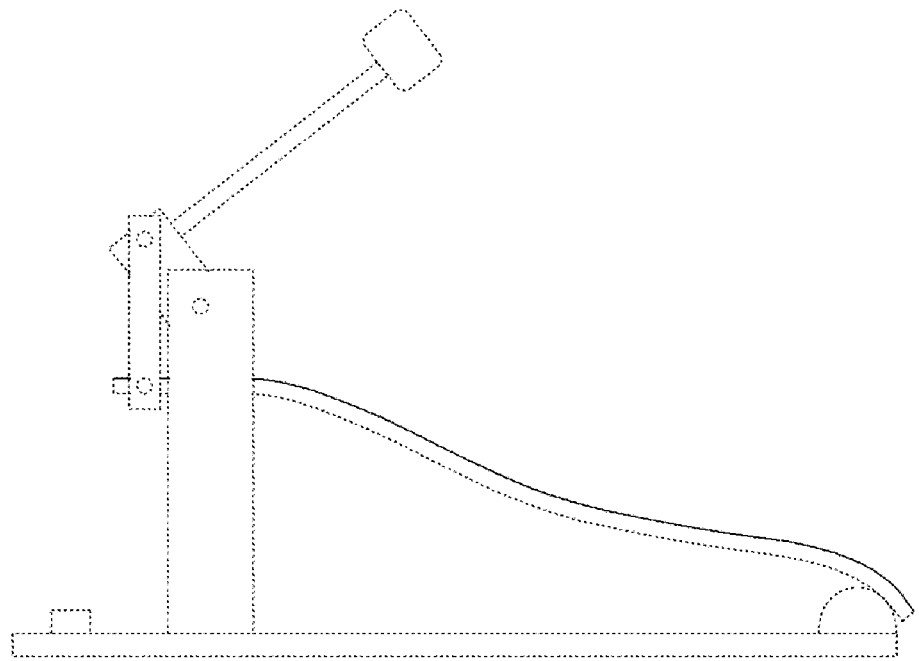
FIG. 32B is a left side view thereof.
Figure 32C:
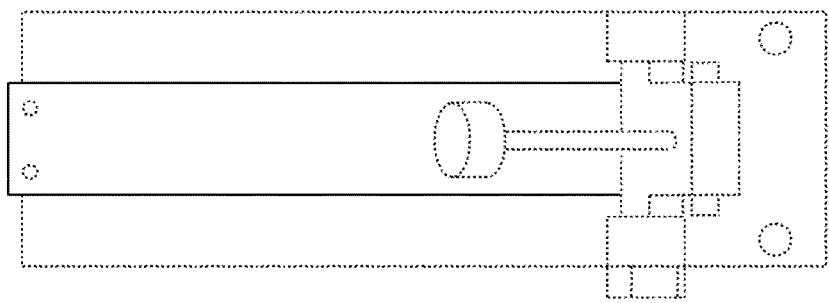
FIG. 32C is a top view thereof.
Figure 32E:
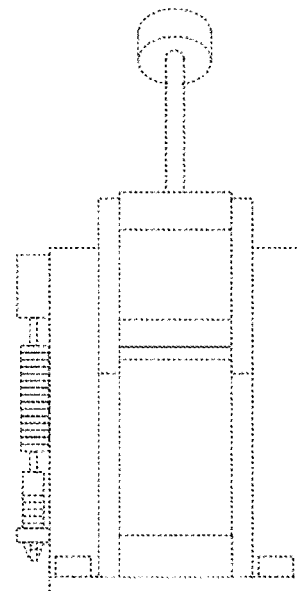
FIG. 32E is a rear view thereof.
Figure 32D:
FIG. 32D is a bottom view thereof.
Figure 32F:
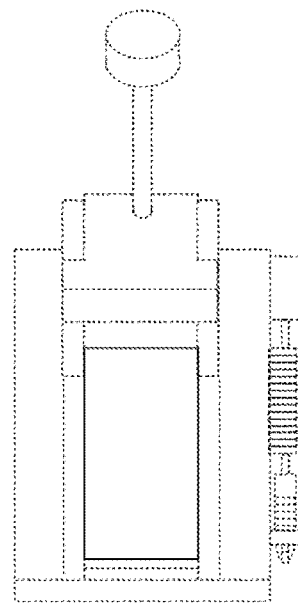
FIG. 32F is a front view thereof.

FIG. 32A is a right side view of a fourth embodiment of a curved pedal having parallel sides, showing a convex-concave-convex design at a pedal surface, extending to the pedal edges in the length and width directions, in a drum beater assembly; FIG. 32B is a left side view thereof; FIG. 32C is a top view thereof; FIG. 32D is a bottom view thereof; FIG. 32E is a rear view thereof; and FIG. 32F is a front view thereof.

Figure 33A:
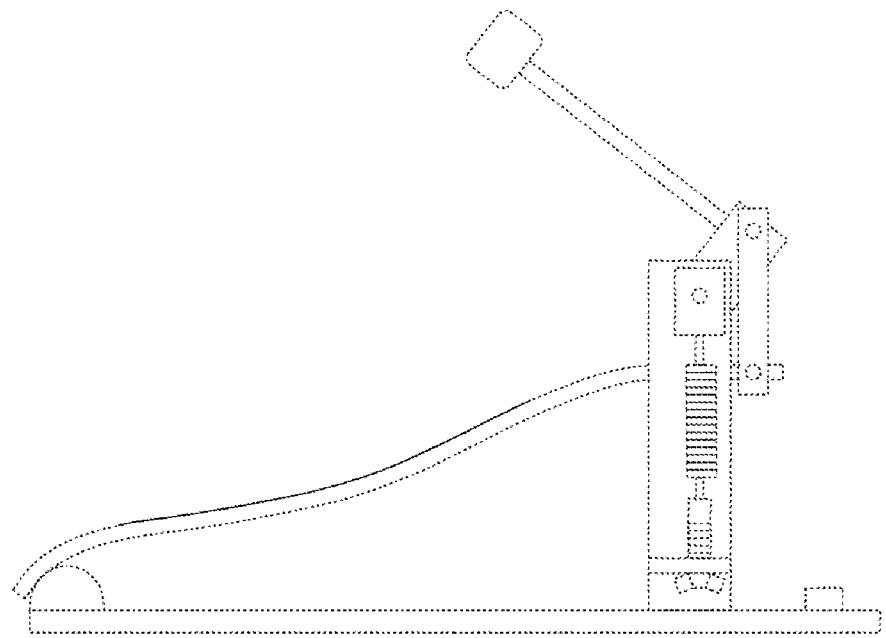
FIG. 33A is a right side view of a fifth embodiment of a curved pedal having splayed sides, showing a central concavity, not extending to the pedal edges in the length direction and not extending to the pedal edges in the width direction, the extent of the design in the length direction being similar to that of the first embodiment, in the context of a convex-concave-convex design at a pedal surface in a drum beater assembly.
Figure 33B:
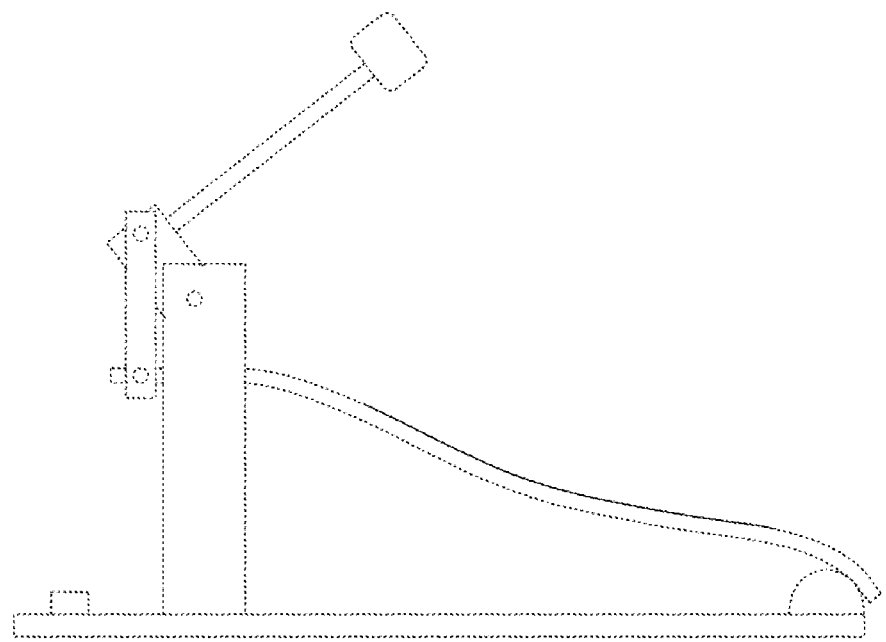
FIG. 33B is a left side view thereof.
Figure 33C:
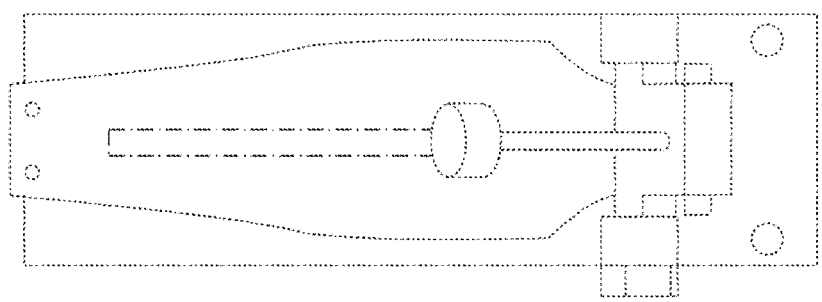
FIG. 33C is a top view thereof.
Figure 33E:
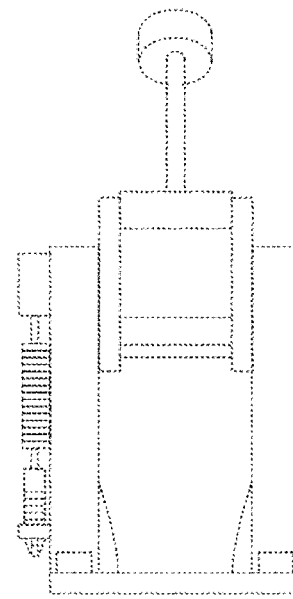
FIG. 33E is a rear view thereof.
Figure 33D:
FIG. 33D is a bottom view thereof.
Figure 33F:
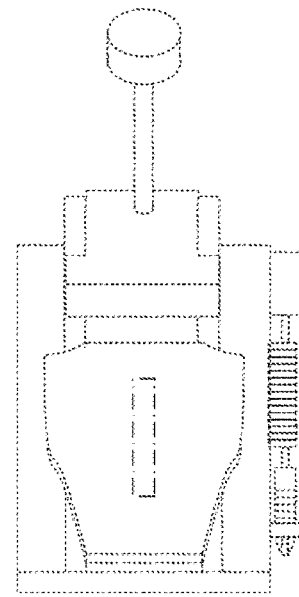
FIG. 33F is a front view thereof.

FIG. 33A is a right side view of a fifth embodiment of a curved pedal having splayed sides, showing a central concavity, not extending to the pedal edges in the length direction and not extending to the pedal edges in the width direction, the extent of the design in the length direction being similar to that of the first embodiment, in the context of a convex-concave-convex design at a pedal surface in a drum beater assembly; FIG. 33B is a left side view thereof; FIG. 33C is a top view thereof; FIG. 33D is a bottom view thereof; FIG. 33E is a rear view thereof; and FIG. 33F is a front view thereof.

Figure 34A:
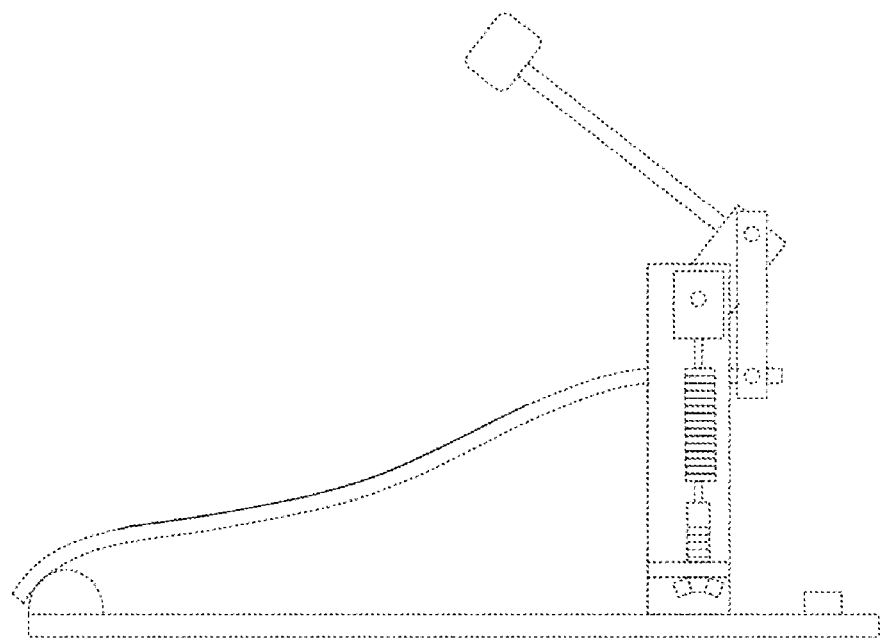
FIG. 34A is a right side view of a sixth embodiment of a curved pedal having parallel sides, showing a central concavity, not extending to the pedal edges in the length direction and not extending to the pedal edges in the width direction, the extent of the design in the length direction being similar to that of the first embodiment, in the context of a convex-concave-convex design at a pedal surface in a drum beater assembly.
Figure 34B:
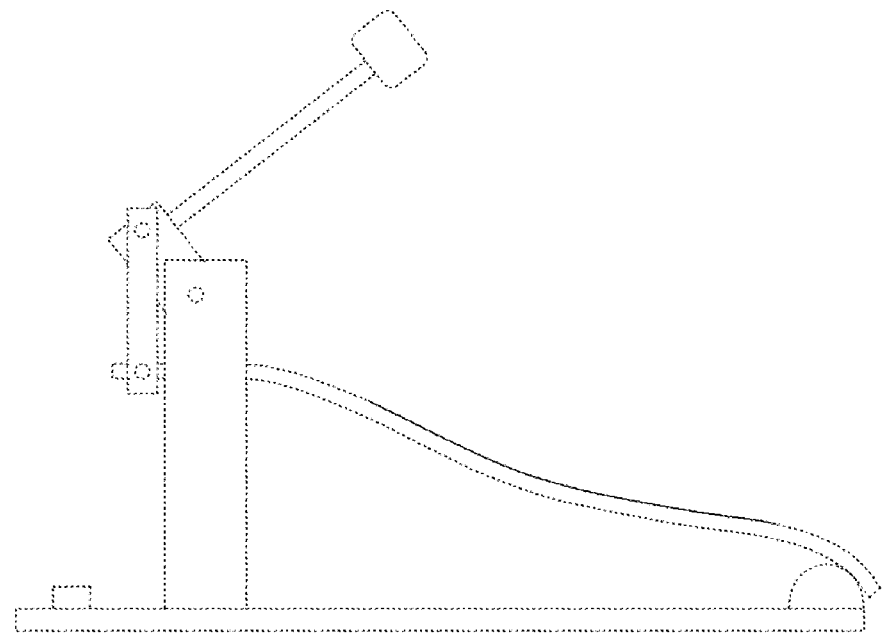
FIG. 34B is a left side view thereof.
Figure 34C:
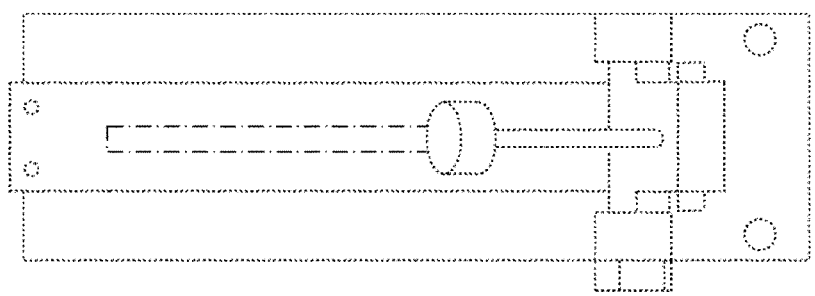
FIG. 34C is a top view thereof.
Figure 34E:
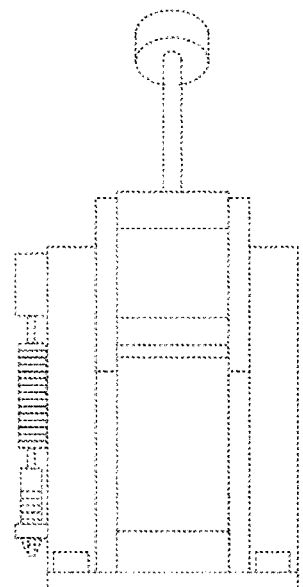
FIG. 34E is a rear view thereof.
Figure 34D:
FIG. 34D is a bottom view thereof.
Figure 34F:
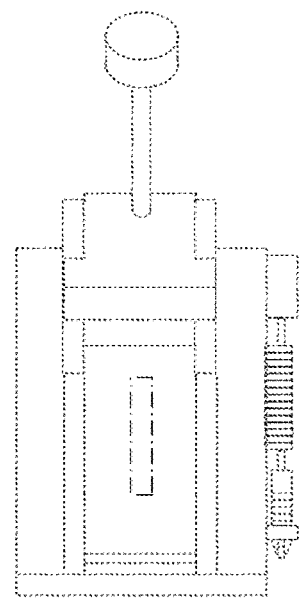
FIG. 34F is a front view thereof.

FIG. 34A is a right side view of a sixth embodiment of a curved pedal having parallel sides, showing a central concavity, not extending to the pedal edges in the length direction and not extending to the pedal edges in the width direction, the extent of the design in the length direction being similar to that of the first embodiment, in the context of a convex-concave-convex design at a pedal surface in a drum beater assembly; FIG. 34B is a left side view thereof; FIG. 34C is a top view thereof; FIG. 34D is a bottom view thereof; FIG. 34E is a rear view thereof; and FIG. 34F is a front view thereof.

Figure 35A:
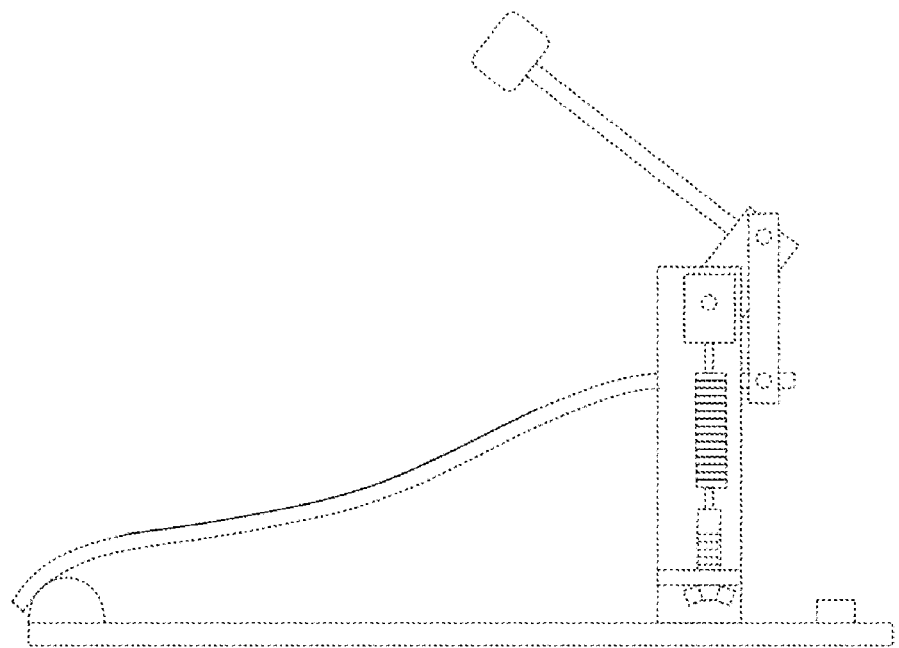
FIG. 35A is a right side view of a seventh embodiment of a curved pedal having splayed sides, showing a central concave curve, the extent of the design in the length direction being similar to that of the first embodiment, in the context of a convex-concave-convex design at a pedal surface in a drum beater assembly.
Figure 35B:
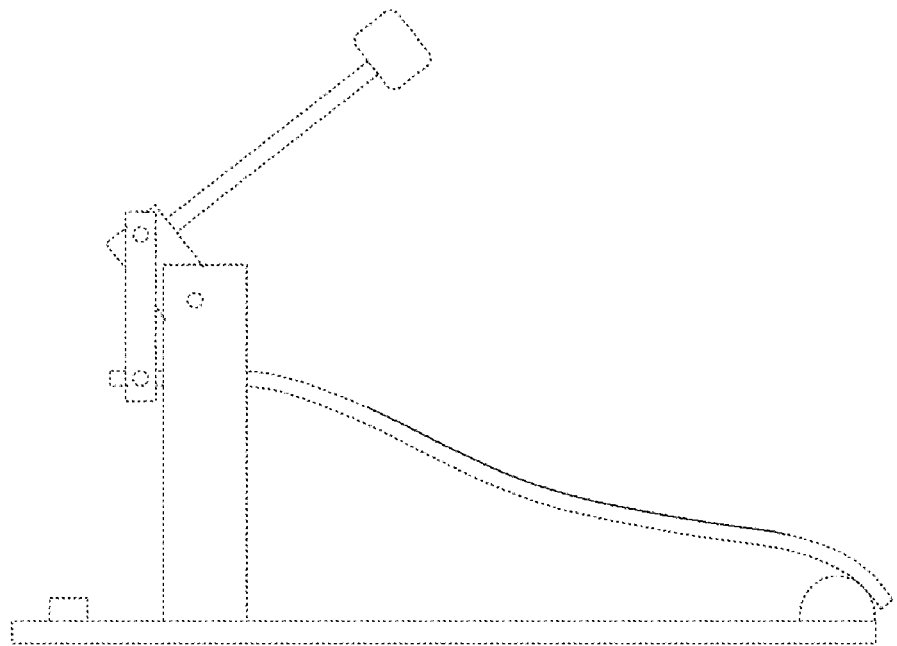
FIG. 35B is a left side view thereof.
Figure 35C:
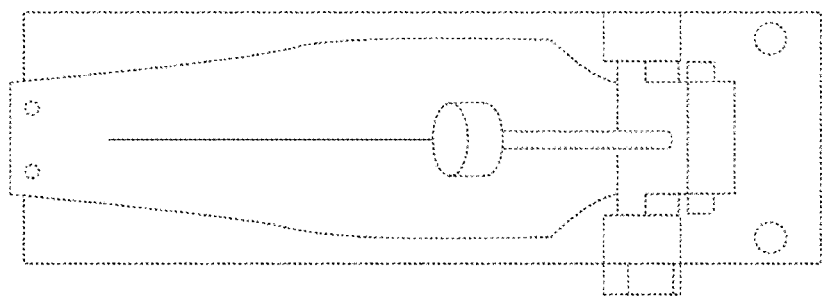
FIG. 35C is a top view thereof.
Figure 35E:
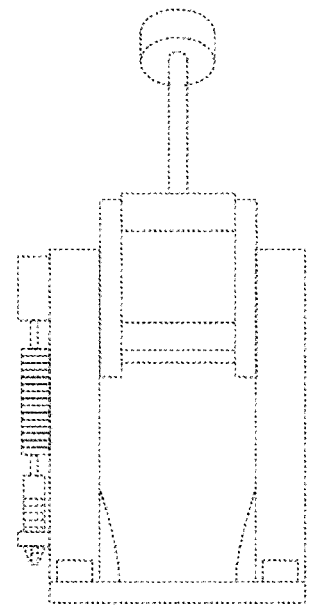
FIG. 35E is a rear view thereof.
Figure 35D:
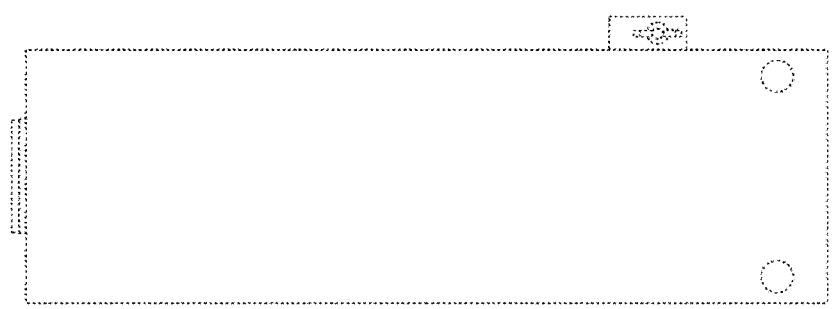
FIG. 35D is a bottom view thereof.
Figure 35F:
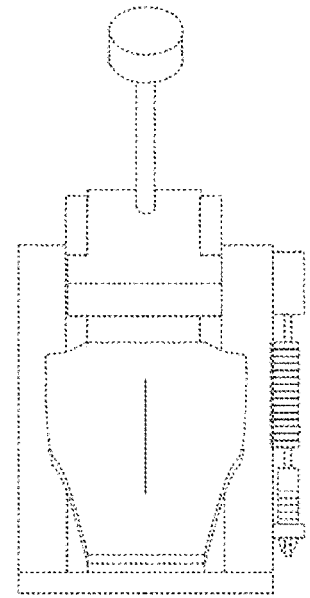
FIG. 35F is a front view thereof.

FIG. 35A is a right side view of a seventh embodiment of a curved pedal having splayed sides, showing a central concave curve, the extent of the design in the length direction being similar to that of the first embodiment, in the context of a convex-concave-convex design at a pedal surface in a drum beater assembly; FIG. 35B is a left side view thereof; FIG. 35C is a top view thereof; FIG. 35D is a bottom view thereof; FIG. 35E is a rear view thereof; and FIG. 35F is a front view thereof.

Figure 36A:
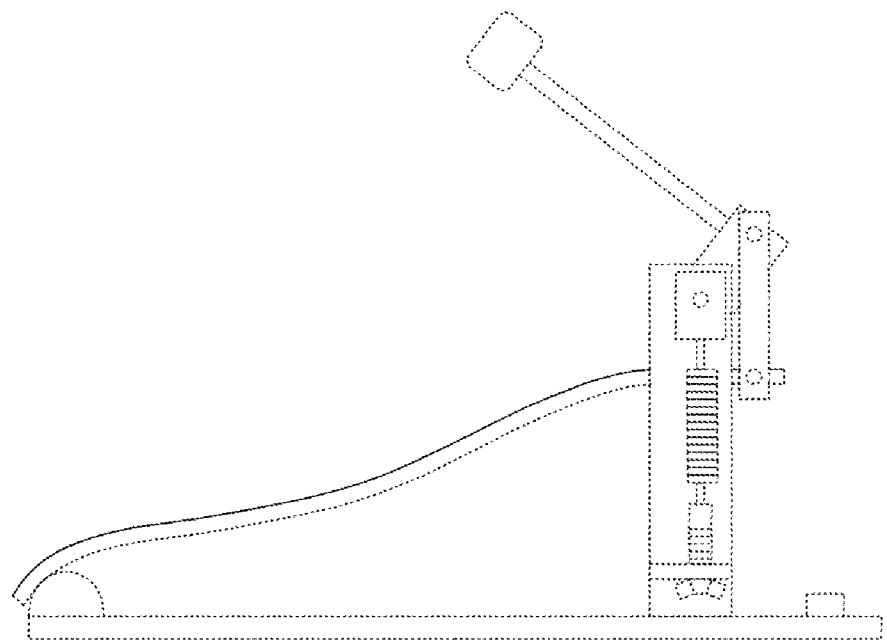
FIG. 36A is a right side view of an eighth embodiment of a curved pedal having splayed sides, showing a central concave curve, extending to the pedal edges in the length direction, in the context of a convex-concave-convex design at a pedal surface in a drum beater assembly.
Figure 36B:
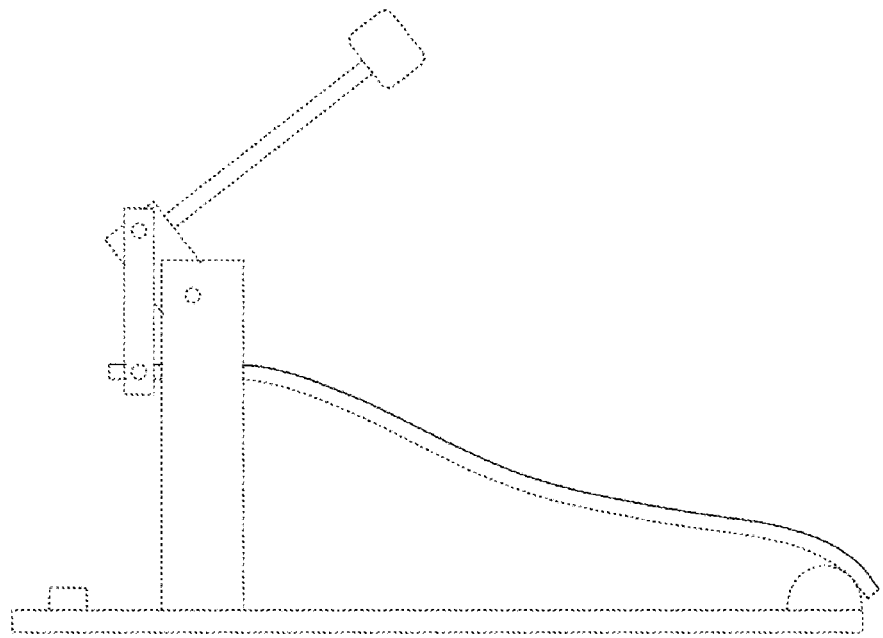
FIG. 36B is a left side view thereof.
Figure 36C:
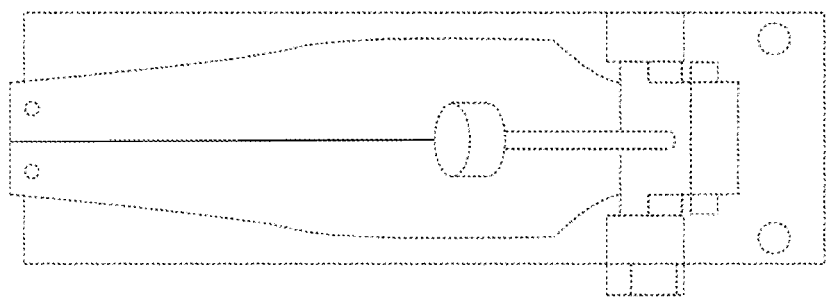
FIG. 36C is a top view thereof.
Figure 36E:
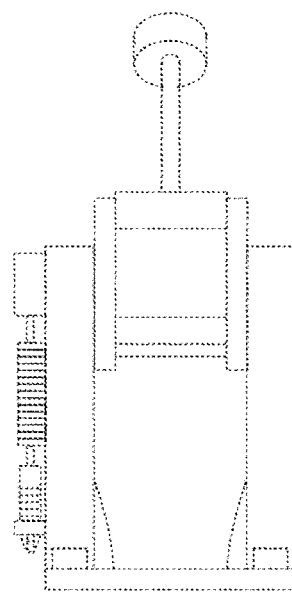
FIG. 36E is a rear view thereof.
Figure 36D:
FIG. 36D is a bottom view thereof.
Figure 36F:
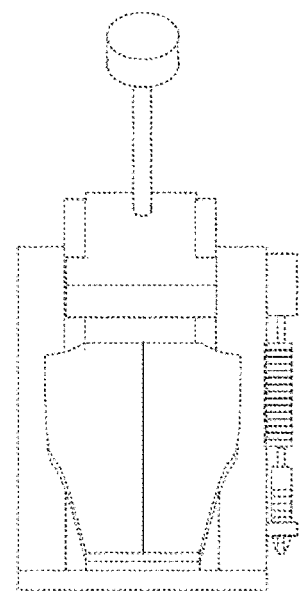
FIG. 36F is a front view thereof.

FIG. 36A is a right side view of an eighth embodiment of a curved pedal having splayed sides, showing a central concave curve, extending to the pedal edges in the length direction, in the context of a convex-concave-convex design at a pedal surface in a drum beater assembly; FIG. 36B is a left side view thereof; FIG. 36C is a top view thereof; FIG. 36D is a bottom view thereof; FIG. 36E is a rear view thereof; and FIG. 36F is a front view thereof.

Figure 37A:
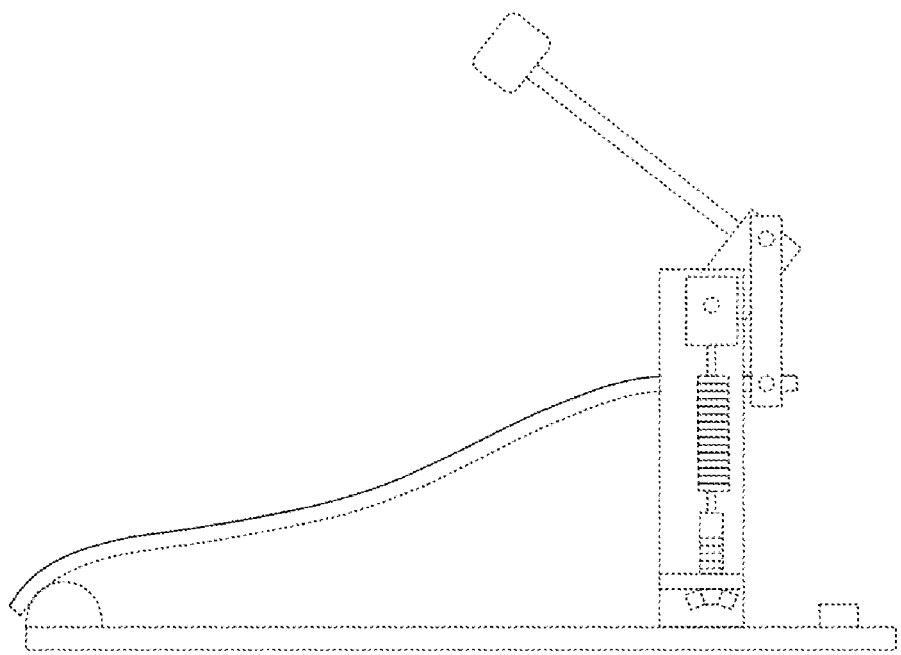
FIG. 37A is a right side view of a ninth embodiment of a curved pedal having splayed sides, showing a central concavity, extending to the pedal edges in the length direction and not extending to the pedal edges in the width direction, the extent of the design in the width direction being similar to that of the fifth embodiment, in the context of a convex-concave-convex design at a pedal surface in a drum beater assembly.
Figure 37B:
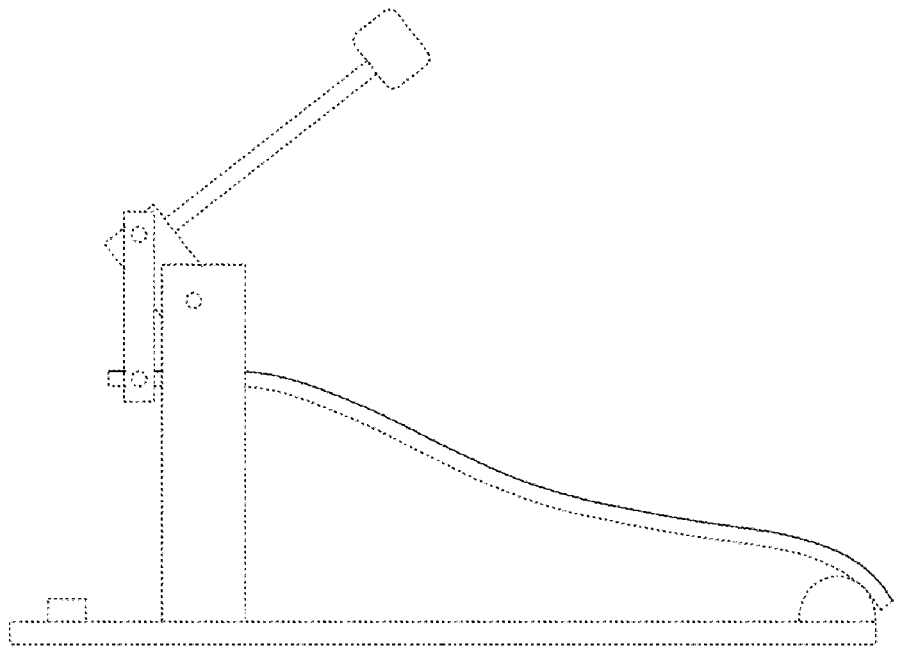
FIG. 37B is a left side view thereof.
Figure 37C:
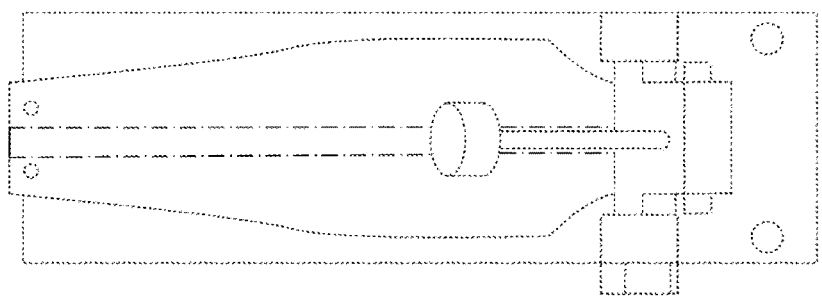
FIG. 37C is a top view thereof.
Figure 37E:
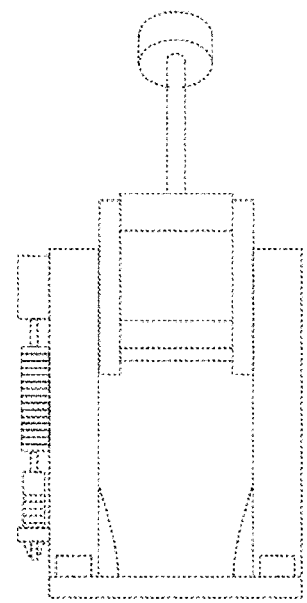
FIG. 37E is a rear view thereof.
Figure 37D:
FIG. 37D is a bottom view thereof.
Figure 37F:
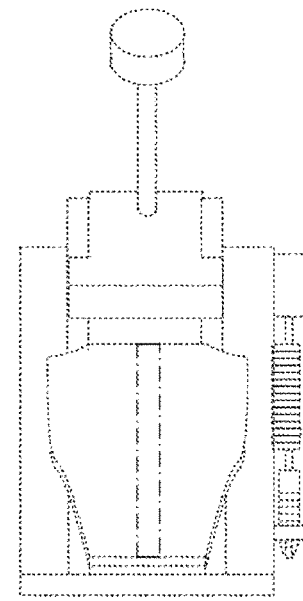
FIG. 37F is a front view thereof.

FIG. 37A is a right side view of a ninth embodiment of a curved pedal having splayed sides, showing a central concavity, extending to the pedal edges in the length direction and not extending to the pedal edges in the width direction, the extent of the design in the width direction being similar to that of the fifth embodiment, in the context of a convex-concave-convex design at a pedal surface in a drum beater assembly; FIG. 37B is a left side view thereof; FIG. 37C is a top view thereof; FIG. 37D is a bottom view thereof; FIG. 37E is a rear view thereof; and FIG. 37F is a front view thereof.

Figure 38A:
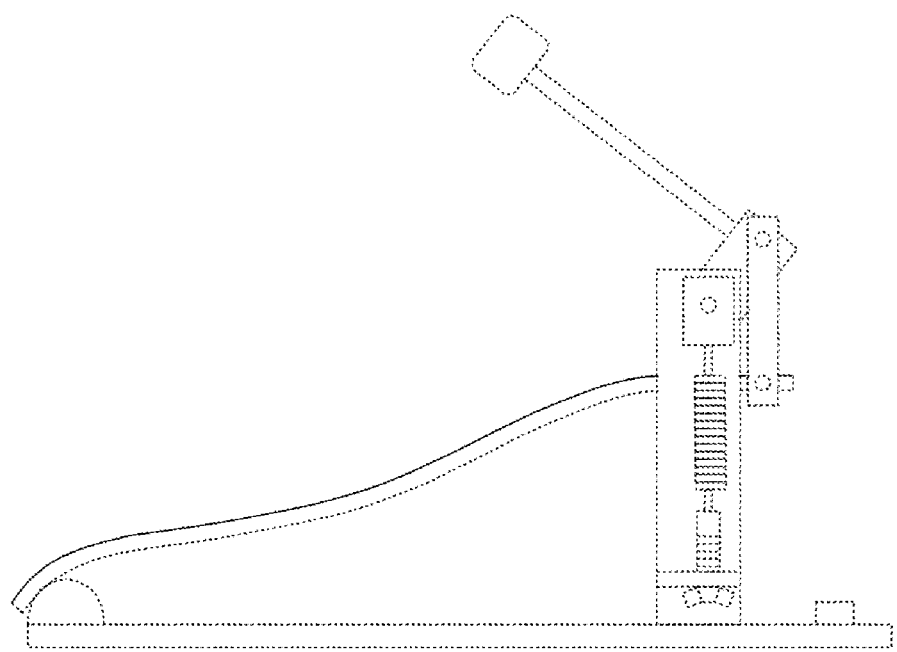
FIG. 38A is a right side view of a tenth embodiment of a curved pedal having parallel sides, showing a central concavity, extending to the pedal edges in the length direction and not extending to the pedal edges in the width direction, the extent of the design in the width direction being similar to that of the fifth embodiment, in the context of a convex-concave-convex design at a pedal surface in a drum beater assembly.
Figure 38B:
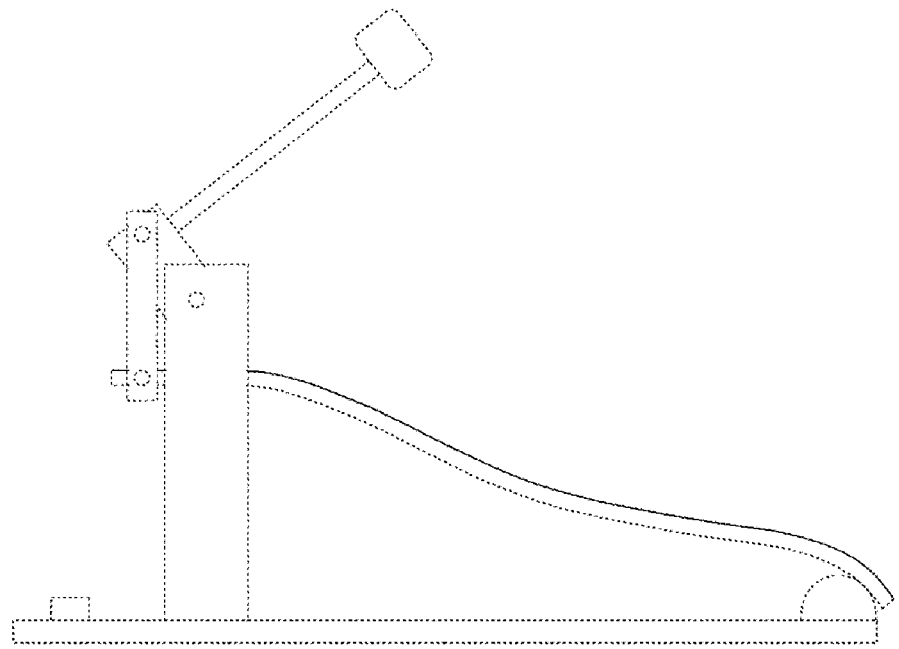
FIG. 38B is a left side view thereof.
Figure 38C:
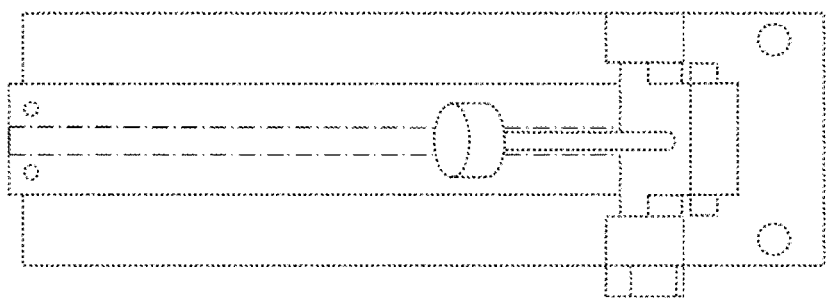
FIG. 38C is a top view thereof.
Figure 38E:
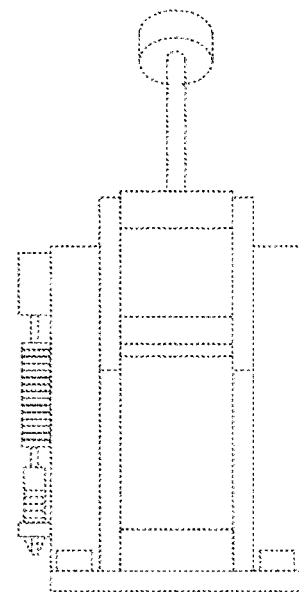
FIG. 38E is a rear view thereof.
Figure 38D:
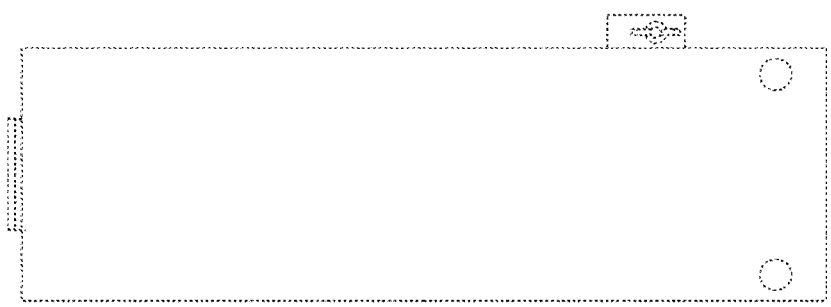
FIG. 38D is a bottom view thereof.
Figure 38F:
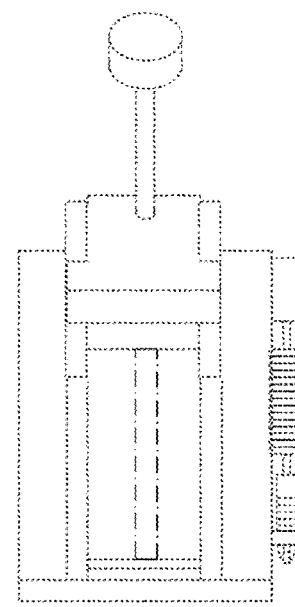
FIG. 38F is a front view thereof.

FIG. 38A is a right side view of a tenth embodiment of a curved pedal having parallel sides, showing a central concavity, extending to the pedal edges in the length direction and not extending to the pedal edges in the width direction, the extent of the design in the width direction being similar to that of the fifth embodiment, in the context of a convex-concave-convex design at a pedal surface in a drum beater assembly; FIG. 38B is a left side view thereof; FIG. 38C is a top view thereof; FIG. 38D is a bottom view thereof; FIG. 38E is a rear view thereof; and FIG. 38F is a front view thereof.

Figure 39A:
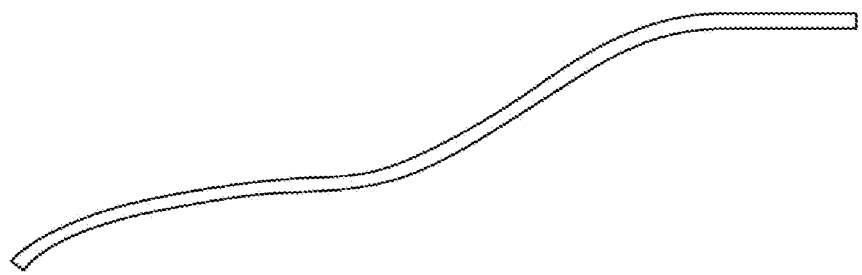
FIG. 39A is a right side view of an eleventh embodiment of a curved pedal in the context of a pedal having a convex-concave-convex top surface, which although shown here as having splayed sides may alternatively have parallel sides, and which although shown here as extending to its edges may also serve as exemplary environment for any of the foregoing embodiments.
Figure 39B:
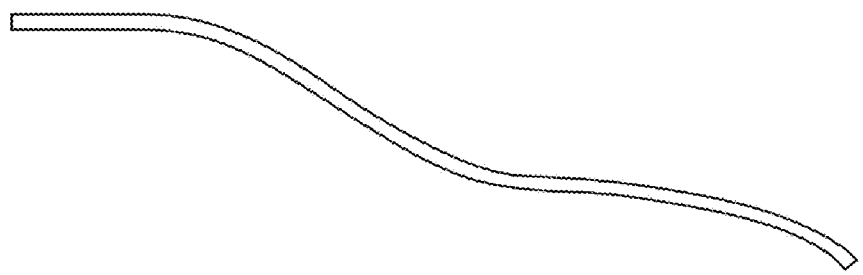
FIG. 39B is a left side view thereof.
Figure 39C:
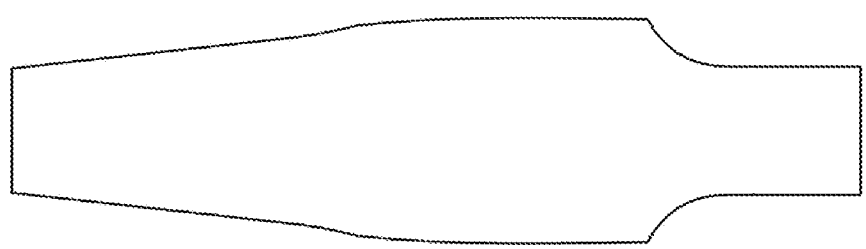
FIG. 39C is a top view thereof.
Figure 39D:
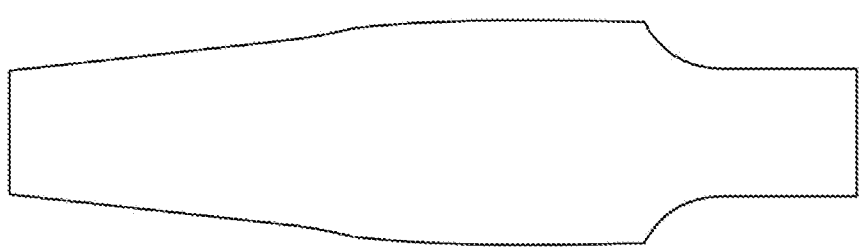
FIG. 39D is a bottom view thereof.
Figure 39E:
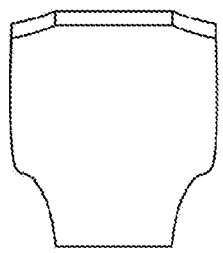
FIG. 39E is a rear view thereof.
Figure 39F:
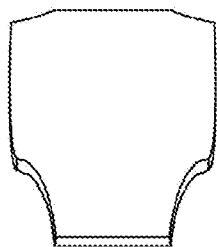
FIG. 39F is a front view thereof.
Figure 39G:
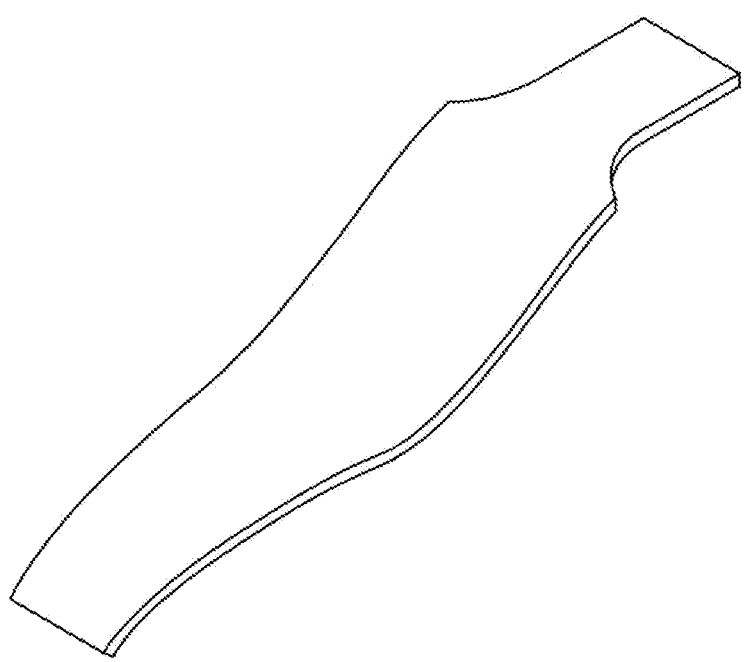
FIG. 39G is a top-front-right side perspective view thereof.

FIG. 39A is a right side view of an eleventh embodiment of a curved pedal in the context of a pedal having a convex-concave-convex top surface, which although shown here as having splayed sides may alternatively have parallel sides, and which although shown here as extending to its edges may also serve as exemplary environment for any of the foregoing embodiments; FIG. 39B is a left side view thereof; FIG. 39C is a top view thereof; FIG. 39D is a bottom view thereof; FIG. 39E is a rear view thereof; FIG. 39F is a front view thereof; and FIG. 39G is a top-front-right side perspective view thereof.

Figure 40A:
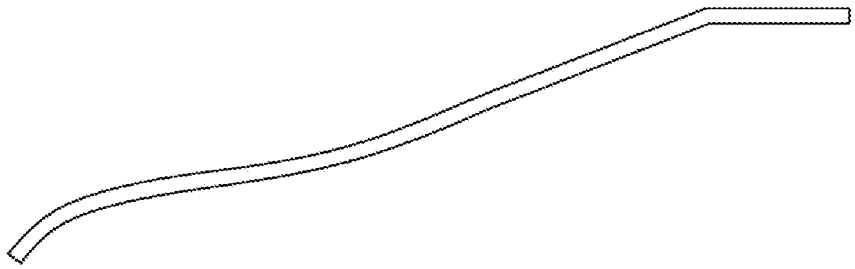
FIG. 40A is a right side view of a twelfth embodiment of a curved pedal having splayed sides in the context of a pedal having a concave-convex-flat top surface, which although shown here as having splayed sides may alternatively have parallel sides, and which although shown here as extending to its edges may also serve as exemplary environment for any of the foregoing embodiments.
Figure 40B:
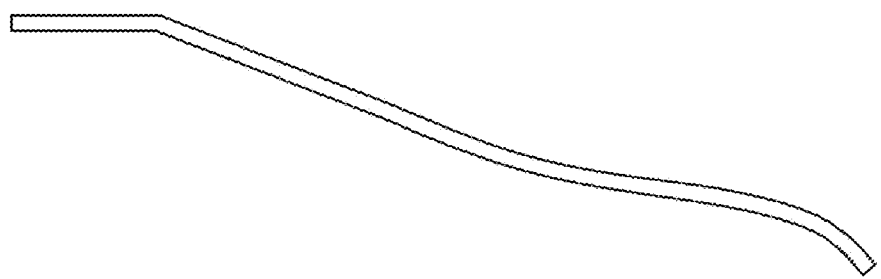
FIG. 40B is a left side view thereof.
Figure 40C:
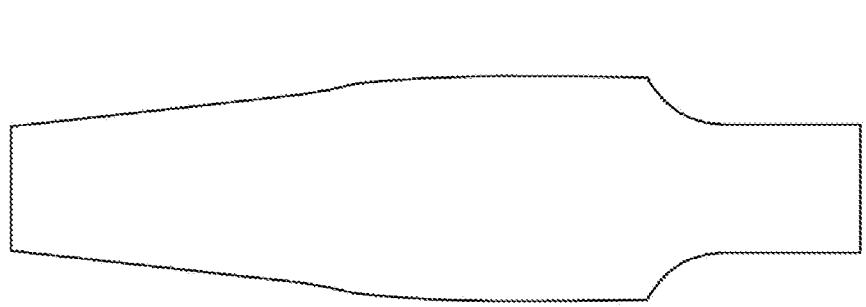
FIG. 40C is a top view thereof.
Figure 40E:
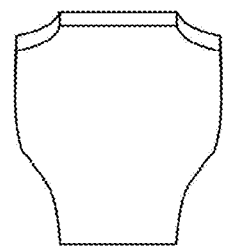
FIG. 40E is a rear view thereof.
Figure 40D:
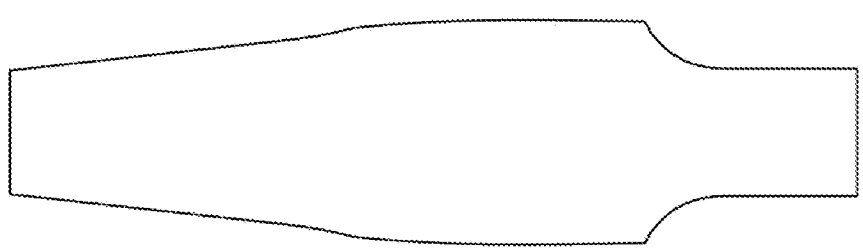
FIG. 40D is a bottom view thereof.
Figure 40F:
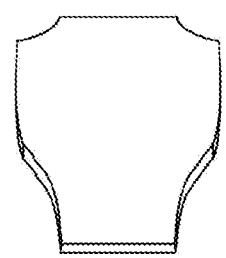
FIG. 40F is a front view thereof.
Figure 40G:
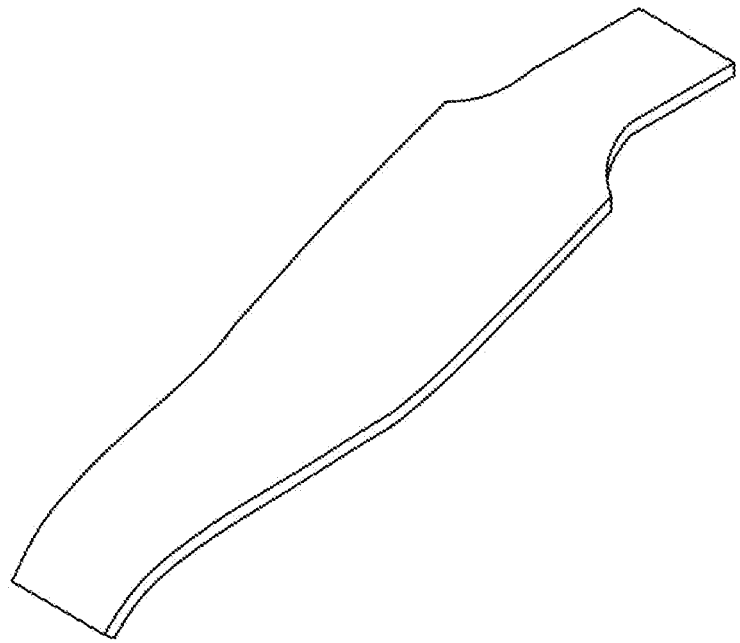
FIG. 40G is a top-front-right side perspective view thereof.

FIG. 40A is a right side view of a twelfth embodiment of a curved pedal having splayed sides in the context of a pedal having a concave-convex-flat top surface, which although shown here as having splayed sides may alternatively have parallel sides, and which although shown here as extending to its edges may also serve as exemplary environment for any of the foregoing embodiments; FIG. 40B is a left side view thereof; FIG. 40C is a top view thereof; FIG. 40D is a bottom view thereof; FIG. 40E is a rear view thereof; FIG. 40F is a front view thereof; and FIG. 40G is a top-front-right side perspective view thereof.

Figure 41A:
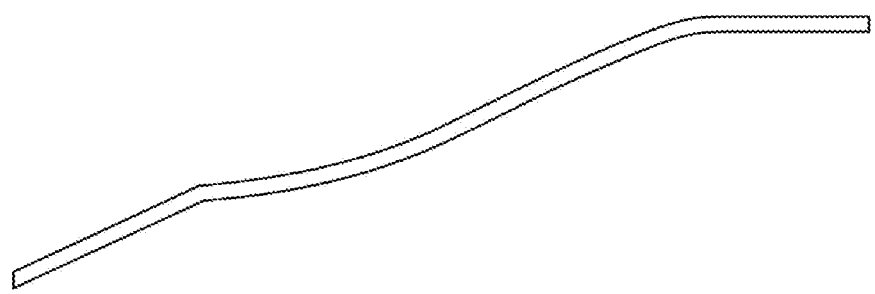
FIG. 41A is a right side view of a thirteenth embodiment of a curved pedal having splayed sides in the context of a pedal having a flat-concave-convex top surface, which although shown here as having splayed sides may alternatively have parallel sides, and which although shown here as extending to its edges may also serve as exemplary environment for any of the foregoing embodiments.
Figure 41B:
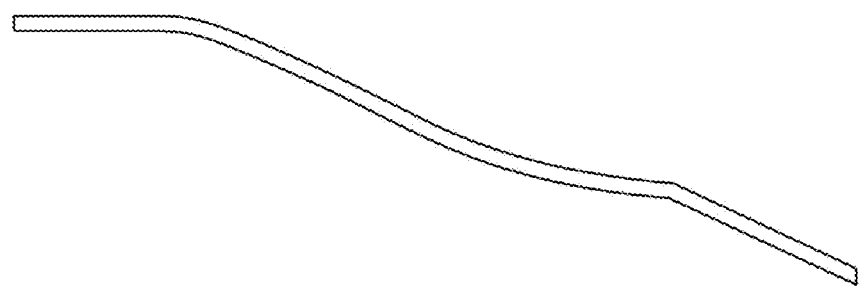
FIG. 41B is a left side view thereof.
Figure 41C:
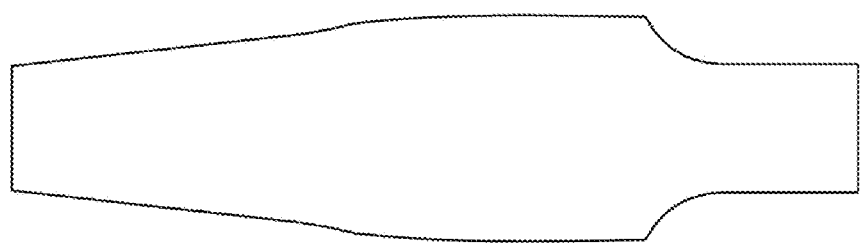
FIG. 41C is a top view thereof.
Figure 41D:
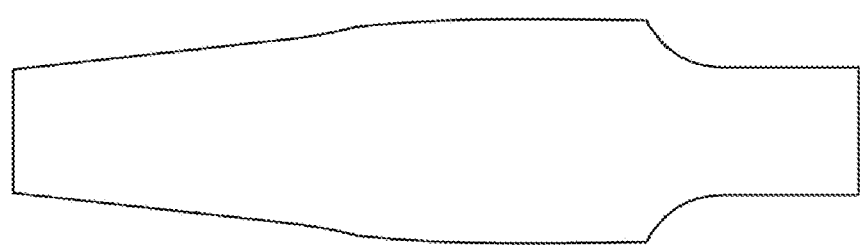
FIG. 41D is a bottom view thereof.
Figure 41E:
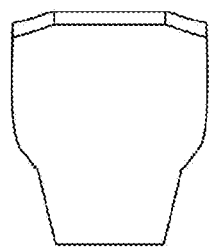
FIG. 41E is a rear view thereof.
Figure 41F:
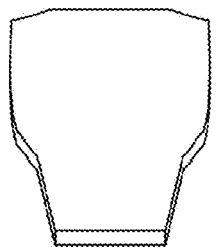
FIG. 41F is a front view thereof.
Figure 41G:
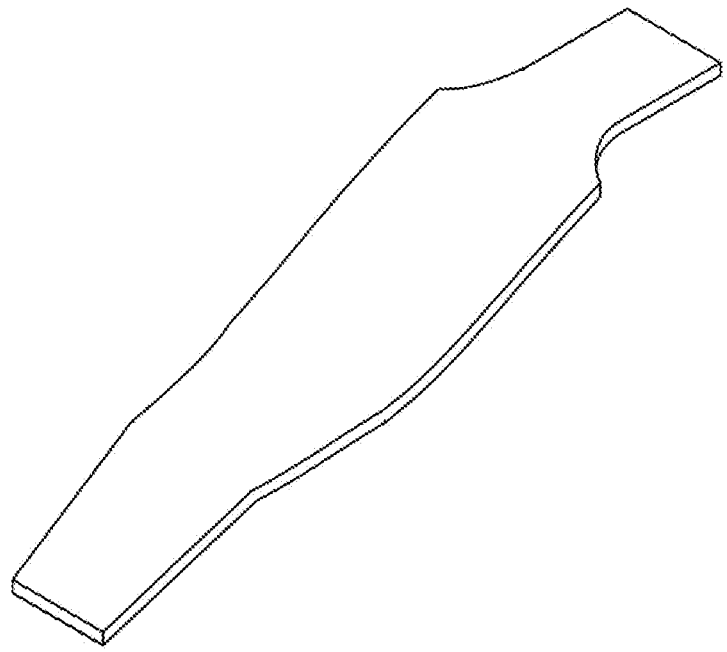
FIG. 41G is a top-front-right side perspective view thereof.

FIG. 41A is a right side view of a thirteenth embodiment of a curved pedal having splayed sides in the context of a pedal having a flat-concave-convex top surface, which although shown here as having splayed sides may alternatively have parallel sides, and which although shown here as extending to its edges may also serve as exemplary environment for any of the foregoing embodiments; FIG. 41B is a left side view thereof; FIG. 41C is a top view thereof; FIG. 41D is a bottom view thereof; FIG. 41E is a rear view thereof; FIG. 41F is a front view thereof; and FIG. 41G is a top-front-right side perspective view thereof.

Note that FIGS. 5A through 5J may also be interpreted as showing various ornamental designs, in which case:

FIG. 5A may be understood to show a top-front-right side perspective of a fourteenth embodiment of a curved pedal having splayed sides in the context of a pedal having a flat-concave-flat top surface, which although shown here as having splayed sides may alternatively have parallel sides, and which although shown here as extending to its edges may also serve as exemplary environment for any of the foregoing embodiments;

FIG. 5B may be understood to show a top-front-right side perspective of a fifteenth embodiment of a curved pedal having splayed sides in the context of a pedal having a concave-convex-flat top surface, which although shown here as having splayed sides may alternatively have parallel sides, and which although shown here as extending to its edges may also serve as exemplary environment for any of the foregoing embodiments;

FIG. 5C may be understood to show a top-front-right side perspective of a sixteenth embodiment of a curved pedal having splayed sides in the context of a pedal having a flat-concave-convex top surface, which although shown here as having splayed sides may alternatively have parallel sides, and which although shown here as extending to its edges may also serve as exemplary environment for any of the foregoing embodiments;

FIG. 5D may be understood to show a top-front-right side perspective of a seventeenth embodiment of a curved pedal having splayed sides in the context of a pedal having a convex-concave-convex top surface, which although shown here as having splayed sides may alternatively have parallel sides, and which although shown here as extending to its edges may also serve as exemplary environment for any of the foregoing embodiments;

FIG. 5E may be understood to show a top-front-right side perspective of an eighteenth embodiment of a curved pedal having splayed sides in the context of a pedal having a concave-flat top surface, which although shown here as having splayed sides may alternatively have parallel sides, and which although shown here as extending to its edges may also serve as exemplary environment for any of the foregoing embodiments;

FIG. 5F may be understood to show a top-front-right side perspective of a nineteenth embodiment of a curved pedal having splayed sides in the context of a pedal having a flat-convex top surface, which although shown here as having splayed sides may alternatively have parallel sides, and which although shown here as extending to its edges may also serve as exemplary environment for any of the foregoing embodiments;

FIG. 5G may be understood to show a top-front-right side perspective of a twentieth embodiment of a curved pedal having splayed sides in the context of a pedal having a convex-flat-convex top surface, which although shown here as having splayed sides may alternatively have parallel sides, and which although shown here as extending to its edges may also serve as exemplary environment for any of the foregoing embodiments;

FIG. 5H may be understood to show a top-front-right side perspective of a twenty-first embodiment of a curved pedal having splayed sides in the context of a pedal having a flat-flat-flat constituting a convex-concave top surface, which although shown here as having splayed sides may alternatively have parallel sides, and which although shown here as extending to its edges may also serve as exemplary environment for any of the foregoing embodiments;

FIG. 5I may be understood to show a top-front-right side perspective of a twenty-second embodiment of a curved pedal having splayed sides in the context of a pedal having a concave-concave constituting a concave-convex-concave top surface, which although shown here as having splayed sides may alternatively have parallel sides, and which although shown here as extending to its edges may also serve as exemplary environment for any of the foregoing embodiments; and FIG. 5J may be understood to show a top-front-right side perspective of a twenty-third embodiment of a curved pedal having splayed sides in the context of a pedal having a flat-flat-convex constituting a convex-concave-convex top surface, which although shown here as having splayed sides may alternatively have parallel sides, and which although shown here as extending to its edges may also serve as exemplary environment for any of the foregoing embodiments.

While embodiments of the present invention have been described above, modes of carrying out the present invention are not limited to the foregoing embodiments, a great many further variations being possible without departing from the gist of the present invention.

What is claimed is:

1. A curved pedal having a pedal reference plane and having a width direction and a length direction, the curved pedal comprising:
    an actuatable region disposed at a top surface of the curved pedal;
    a first concavity in the length direction within the actuatable region; and
    a first convexity in the length direction of the top surface, the first convexity being continuous with the first concavity by way of an intervening first inflection point at a first transition between the first concavity and the first convexity;
    wherein slope of the top surface relative to the pedal reference plane varies smoothly throughout the first transition;
    wherein the curved pedal further comprises a second convexity in the length direction of the top surface, the second convexity being continuous with the first concavity by way of an intervening second inflection point at a second transition between the first concavity and the second convexity; and
    wherein the slope of the top surface relative to the pedal reference plane varies smoothly throughout the second transition.

2. The curved pedal according to claim 1 wherein a second spatial derivative with respect to position in the length direction within the actuatable region is not greater than 30° per inch.

3. The curved pedal according to claim 1 wherein a second spatial derivative with respect to position in the length direction within the actuatable region is 11.25° per inch ±75%.

4. The curved pedal according to claim 1 wherein radius of curvature within the actuatable region is not less than 3".

5. The curved pedal according to claim 1 wherein radius of curvature within the actuatable region is 8"±75%.

6. The curved pedal according to claim 1 wherein the actuatable region comprises at least one curvature profile that is more or less sinusoidal with wavelength 10"±50% and amplitude 0.30"±75%.

7. The curved pedal according to claim 1 wherein the actuatable region comprises at least one curvature profile that is more or less elliptically arcuate with radius of curvature 8"±75% and has an extremum of height 0.30"±75% as measured from the pedal reference plane.

8. The curved pedal according to claim 1 wherein the actuatable region comprises at least one curvature profile that is more or less circularly arcuate with radius of curvature 8"±75% and has an extremum of height 0.30"±75% as measured from the pedal reference plane.

9. The curved pedal according to claim 1 wherein the actuatable region comprises at least one curvature profile that is approximated by a polynomial curve of order not less than three with radius of curvature 8"±75% and has an extremum of height 0.30"±75% as measured from the pedal reference plane.

10. The curved pedal according to claim 1 wherein the first concavity extends for not less than substantially one-third of the actuatable region in the length direction.

11. The curved pedal according to claim 1 wherein the first convexity is substantially a half-lobe that extends peripherally in the length direction by an amount which is not more than 25% of a length in the length direction of the half-lobe exclusive of the peripherally extending portion, past an extremum of the first convexity, the peripheral extension and the length of the half-lobe exclusive of the peripherally extending portion being measured as projected onto the pedal reference plane.

12. The curved pedal according to claim 1 wherein the slope of the top surface relative to the pedal reference plane varies smoothly throughout substantially the entire actuatable region.

13. The curved pedal according to claim 1 wherein the first concavity is disposed centrally in the length direction between the first convexity and the second convexity.

14. The curved pedal according to claim 1 wherein length of the actuatable region in the length direction is not less than 12".

15. The curved pedal according to claim 1 wherein the curved pedal comprises
    a heel end having at least one feature permitting mounting to a heel hinge; and
    a toe end having at least one feature permitting mounting to at least one pivoting linkage arm.

16. The curved pedal according to claim 1 wherein the slope at the top surface relative to the pedal reference plane varies smoothly through an angle of at least 5° within the actuatable region.

17. The curved pedal according to claim 1 wherein the actuatable region further comprises at least one flat portion.

18. The curved pedal according to claim 17 wherein the at least one flat portion extends for not more than substantially one-third of the actuatable region in the length direction.

19. A tensioner mechanism for a return spring that tends to cause a pedal to return to an undepressed state after the pedal has been depressed, the tensioner mechanism comprising:

a screw having an axis that is arranged in parallel but offset fashion with respect to an axis of the spring; and a bracket that has a nut which is threadedly engaged with the screw and that is coupled to the spring in such fashion that movement of the nut on the screw causes displacement of at least a portion of the spring;

wherein the screw has a top end which when turned permits adjustment of tension of the spring.

20. The tensioner mechanism according to claim 19 wherein the screw is supported by a stationary post having at least one first planar post face; and the bracket has at least one first planar bracket face that slidingly engages with the at least one first planar post face when the nut moves on the screw.

21. The tensioner mechanism according to claim 20 wherein the screw extends for substantially the full height of the post.

22. The tensioner mechanism according to claim 19 wherein two planar faces of the bracket intersect to form a first bracket dihedral angle at a first bracket corner;

two planar faces of a stationary post intersect to form a first post dihedral angle at a first post corner;

the first post corner guides movement of the first bracket corner when the nut moves on the screw.

23. The tensioner mechanism according to claim 20 wherein the axis of the screw, the axis of the spring, and the first planar post face are respectively vertically oriented.

24. The tensioner mechanism according to claim 19 wherein an interaxial distance between the axis of the screw and the axis of the spring is not less than 0.375 inch.

25. The tensioner mechanism according to claim 19 wherein the screw is not backdriven by a load exerted thereon by the spring during normal operation of the pedal.

26. The tensioner mechanism according to claim 19 wherein the screw is self-locking, the adjustment of the tension of the spring being maintained following the turning of the top end of the screw despite absence of locking means at the screw.

27. The tensioner mechanism according to claim 19 wherein mechanical efficiency of output movement of the nut on the screw relative to input turning of the top end of the screw is not greater than 50%.

28. The tensioner mechanism according to claim 19 wherein lead angle of threads at the screw is not greater than 5°.

29. The tensioner mechanism according to claim 19 wherein lead of threads at the screw is not greater than 33% of diameter of the screw.

30. The tensioner mechanism according to claim 19 wherein the screw is a lead screw having single-start acme threads.

31. The tensioner mechanism according to claim 20 wherein the screw is substantially housed within the post.

32. A pedal assembly comprising:
a baseboard associated with a baseboard plane and having a heel end and a toe end;
a heel hinge;
a motion transmission linkage; and
the tensioner mechanism according to claim 19;
wherein the pedal is associated with a pedal reference plane and has a heel end and a toe end; and
wherein the heel end of the pedal is pivotably mounted by way of the heel hinge to the heel end of the baseboard so as to permit the toe end of the pedal to operate the motion transmission linkage.

33. A pedal assembly comprising:
a curved pedal associated with a pedal reference plane and having a heel end and a toe end;
a baseboard associated with a baseboard plane and having a heel end and a toe end;
a heel hinge;
a motion transmission linkage; and
a tensioner mechanism for a return spring that tends to cause the curved pedal to return to an undepressed state after the curved pedal has been depressed;
wherein the heel end of the curved pedal is pivotably mounted by way of the heel hinge to the heel end of the baseboard so as to permit the toe end of the curved pedal to operate the motion transmission linkage;
wherein a top surface of the curved pedal comprises a first convexity, a first concavity, and a second convexity in the length direction;
wherein the first convexity is continuous with the first concavity by way of an intervening first inflection point at a first transition between the first concavity and the first convexity
wherein slope of the top surface relative to the pedal reference plane varies smoothly throughout the first transition;
wherein the second convexity is continuous with the first concavity by way of an intervening second inflection point at a second transition between the first concavity and the second convexity; and
wherein the slope of the top surface relative to the pedal reference plane varies smoothly throughout the second transition.

34. A drum set comprising at least one percussion instrument actuated by a pedal assembly comprising:
a curved pedal associated with a pedal reference plane and having a heel end and a toe end; and
a tensioner mechanism for a return spring that tends to cause the curved pedal to return to an undepressed state after the curved pedal has been depressed;
wherein the tensioner mechanism comprises a screw having an axis that is arranged in parallel but offset fashion with respect to an axis of the spring, and a bracket that has a nut which is threadedly engaged with the screw and that is coupled to the spring in such fashion that movement of the nut on the screw causes displacement of at least a portion of the spring; and
wherein the screw has a top end which when turned permits adjustment of tension of the spring.

* * * * *